United States Patent

Ohmura et al.

[11] Patent Number: 5,815,280
[45] Date of Patent: Sep. 29, 1998

[54] IMAGE RECORDING APPARATUS WITH PRIORITIZATION OF INPUT

[75] Inventors: Hiroshi Ohmura, Inagi; Yoshinobu Aiba, Yokohama; Masanori Sakai, Yokohama; Hideto Kohtani, Yokohama; Keizo Isemura, Kokubunji; Kouichi Unno; Hirohiko Itoh, both of Kawasaki; Takehito Utsunomiya, Yokohama; Makoto Kikugawa; Hideyuki Makitani, both of Fuchu, all of Japan

[73] Assignee: Canon Kabushiki Kaisha, Tokyo, Japan

[21] Appl. No.: 596,539

[22] Filed: Feb. 5, 1996

Related U.S. Application Data

[63] Continuation of Ser. No. 957,092, Oct. 6, 1992, abandoned.

[30] Foreign Application Priority Data

Oct. 9, 1991 [JP] Japan .................................. 3-260918
Oct. 31, 1991 [JP] Japan .................................. 3-285948
Nov. 11, 1991 [JP] Japan .................................. 3-294363

[51] Int. Cl.$^6$ .............................. H04N 1/21; H04N 1/32
[52] U.S. Cl. ...................... 358/296; 358/437; 358/468; 358/404; 399/3
[58] Field of Search ................................ 358/404, 437, 358/468, 296; 395/131; 399/3, 4

[56] References Cited

U.S. PATENT DOCUMENTS

| | | | |
|---|---|---|---|
| 4,705,393 | 11/1987 | Ito | 355/319 |
| 4,881,101 | 11/1989 | Sumida | 355/204 |
| 4,975,738 | 12/1990 | Senma et al. | 355/319 X |
| 4,990,941 | 2/1991 | Kawai | 355/319 X |
| 5,200,830 | 4/1993 | Imaizumi et al. | 358/296 |
| 5,206,735 | 4/1993 | Gauronski et al. | 358/296 |
| 5,262,851 | 11/1993 | Nakatani et al. | 358/500 |
| 5,270,775 | 12/1993 | Suzuki | 355/204 |
| 5,377,016 | 12/1994 | Kashiwagi et al. | 358/403 |

FOREIGN PATENT DOCUMENTS

| | | |
|---|---|---|
| 56-164673 | 12/1981 | Japan . |
| 59-223463 | 12/1984 | Japan . |
| 3-19075 | 2/1991 | Japan . |

*Primary Examiner*—Hezron E. Williams
*Assistant Examiner*—Randy W. Gibson
*Attorney, Agent, or Firm*—Fitzpatrick, Cella, Harper & Scinto

[57] ABSTRACT

An image recording apparatus comprising: a plurality of input devices for inputting image information; a selection device for selecting image information input by a plurality of the input devices; a recording device for recording image information selected by the selection device on a recording member; a setting device for setting the priority order of image information selected by the selection device; and a control device for causing the setting device to set the priority order when image information has been input from a plurality of the input devices.

36 Claims, 44 Drawing Sheets

FIG. 21
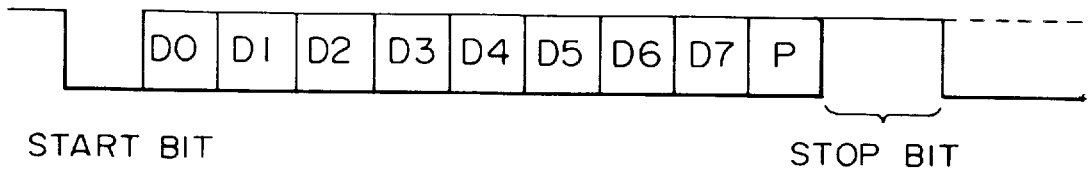
START BIT · STOP BIT
FIG. 22
COMMAND
03H: PRIORITY ORDER SETTING COMMAND
FIG. 23
PARAMETER
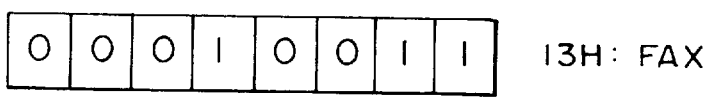
13H: FAX
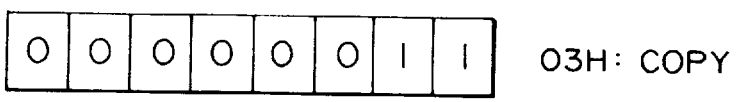
03H: COPY
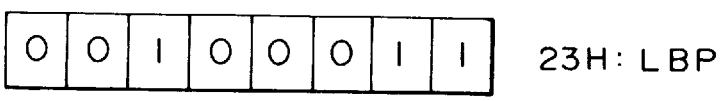
23H: LBP
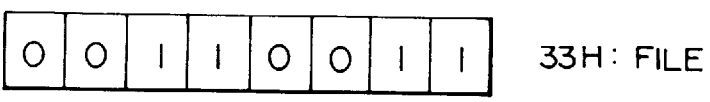
33H: FILE

IMAGE RECORDING APPARATUS WITH PRIORITIZATION OF INPUT

TITLE OF THE INVENTION

This application is a continuation of application Ser. No. 07/957,092, filed Oct. 6, 1992, now abandoned.

BACKGROUND OF THE INVENTION

1. Field of the Invention

The present invention relates to an image recording apparatus for recording image information transmitted from a plurality of image information output devices.

2. Description of the Related Art

Hitherto, an apparatus disclosed in Japanese Patent Laid-Open No. 56-164673 has been known, the apparatus being so arranged that when a facsimile is received during an operation of copy-recording an original document, the copy-recording operation is interrupted and facsimile receipt recording is performed.

Another recording apparatus disclosed in Japanese Patent Laid-Open No. 59-223463 has been known which is arranged in such a manner that the priority order of a plurality of recording modes can be set.

There are also known multi-function image recording apparatus so arranged that the facsimile, a printer for printing output data transmitted from a computer or a word processor, or an image file device capable of storing image data to a recording medium such as a magnetic disk or an optomagnetic disk, is added to a copying machine.

However, the aforesaid conventional image recording apparatuses encounter a problem in that copied paper sheets and facsimile-received recording paper sheets are undesirably mixed together. If a facsimile is received, for example, during a copying operation, the copying operation is automatically and temporarily interrupted, the facsimile-received image data is printed, and the recording paper sheets of the received data are discharged to a paper-discharge tray for discharging the copied paper sheets.

When the printing of the facsimile receipt is not performed during the copying operation, the image recording apparatus encounters a problem in that the prints of facsimile-received image data cannot be immediately examined. Further, when the recording apparatus is arranged in such a manner that the copying operation is inhibited during the receipt of facsimile data, the interruption will slow the copying process.

The aforesaid problems also apply to the printer function and the filing function as well as the copying machine function and the facsimile function. For example, an image processing apparatus, which does not receive a new function requirement if it is made during a period in which a certain function is being used, raises a necessity of storing the contents of the receipt until the copying operation is completed. If a facsimile communication is received during an operation of copying or an output demand is made by a computer, a great quantity of data items must be stored. What is worse, there is a probability of an overflow of the buffer memory. Furthermore, an image processing apparatus for outputting data in accordance with a demand of using an interruption function must assort the mixed output paper sheets at the paper discharge portion. A method for overcoming the aforesaid problem by employing an arrangement made in such a manner that the discharge potion is divided into two sections raises the cost of the aforesaid arrangement and makes the structure too complicated.

Another problem arises in that the printed sheets cannot be discriminated to be those obtained by recording the facsimile-received data, those obtained by copying an original document or those obtained by recording an output from the filing portion.

SUMMARY OF THE INVENTION

An object of the present invention is to provide an image recording apparatus capable of overcoming the aforesaid problems.

Another object of the present invention is to provide an improved image recording apparatus.

Another object of the present invention is to provide an image recording apparatus capable of efficiently performing the recording operation in such a manner that assorting can be easily performed, even if a plurality of image information generating means arbitrarily generate image information.

Another object of the present invention is to provide an image recording apparatus that does not require a user to wait for the use of the apparatus.

In an embodiment of the present invention, an image recording apparatus comprises a plurality of input means for inputting image information, each of the input means inputting a different type of image information, setting means for setting an order of priority among the input means based on the type of image information, control means for instructing the setting means to set the order of priority when the image information is input to more than one of the plurality of the input means, selection means for selecting image information of a type with a highest priority for input when the setting means has set the order of priority, and recording means for recording on a recording member the type of image information selected by the selection means.

In another embodiment of the present invention, an image recording apparatus comprises a plurality of input means for inputting image information, each of the input means inputting a different type of image information, selection means for selecting the type of image information input by the plurality of the input means in accordance with a predetermined order of priority, recording means for recording the type of image information selected by the selection means on a recording member, and changing means for changing the predetermined order of priority of the selection means during a recording operation performed by the recording means.

In yet another embodiment of the present invention, an image recording apparatus comprises a plurality of input means for inputting image information, each of the input means inputting different type of image information, selection means for selecting type of image information input by the plurality of the input means in accordance with a predetermined order of priority, recording means for recording the type of image information selected by the selection means on a recording member, and changing means for changing the predetermined order of priority of the selection means in accordance with time and day.

In another embodiment of the present invention, an image recording apparatus comprises input means for inputting a plurality of image information items, recording means capable of both recording in a plurality of colors and recording the image information items input by the input means to the recording means on a recording member, and control means for changing the color for each of the image information items to be recorded by the recording means.

In another embodiment of the present invention, an image recording apparatus comprises a plurality of input means for inputting image information, each of the input means inputting a different type of image information, recording means for selecting the type of image information input by the plurality of the input means to the recording means and recording the selected type of image information on a recording member, storing means for temporarily storing the recording member recorded by the recording means so as to again convey the recording member to the recording means, a discharge portion for discharging the recording member recorded by the recording means from the image recording apparatus, conveyance means for conveying the recording member to one of the storing means and the discharge portion, and control means for conveying the recording member, on which is recorded the type of image information input to the recording means by the input means, to the storing means and the discharge portion, wherein recording of the type of image information supplied from one of the input means is performed in parallel during the recording of the type of image information input by another of the input means.

In yet another embodiment of the present invention, an image recording apparatus comprises a plurality of input means for inputting image information, each of the input means inputting a different type of image information supplied from a plurality of image information generating devices, identifying means for identifying the image information generating device, and recording means for recording the type of image information supplied from the information generating device, identified by the identifying means, on a recording member.

Other and further objects, features and advantages of the invention will be appear more fully from the following description.

BRIEF DESCRIPTION OF THE DRAWINGS

FIG. 21 illustrates the constitution of a command and a parameter for use to set the priority order;

FIG. 22 illustrates the priority order setting command;

FIG. 23 illustrates the priority order setting parameter;

DETAILED DESCRIPTION OF THE INVENTION

Figure 1:
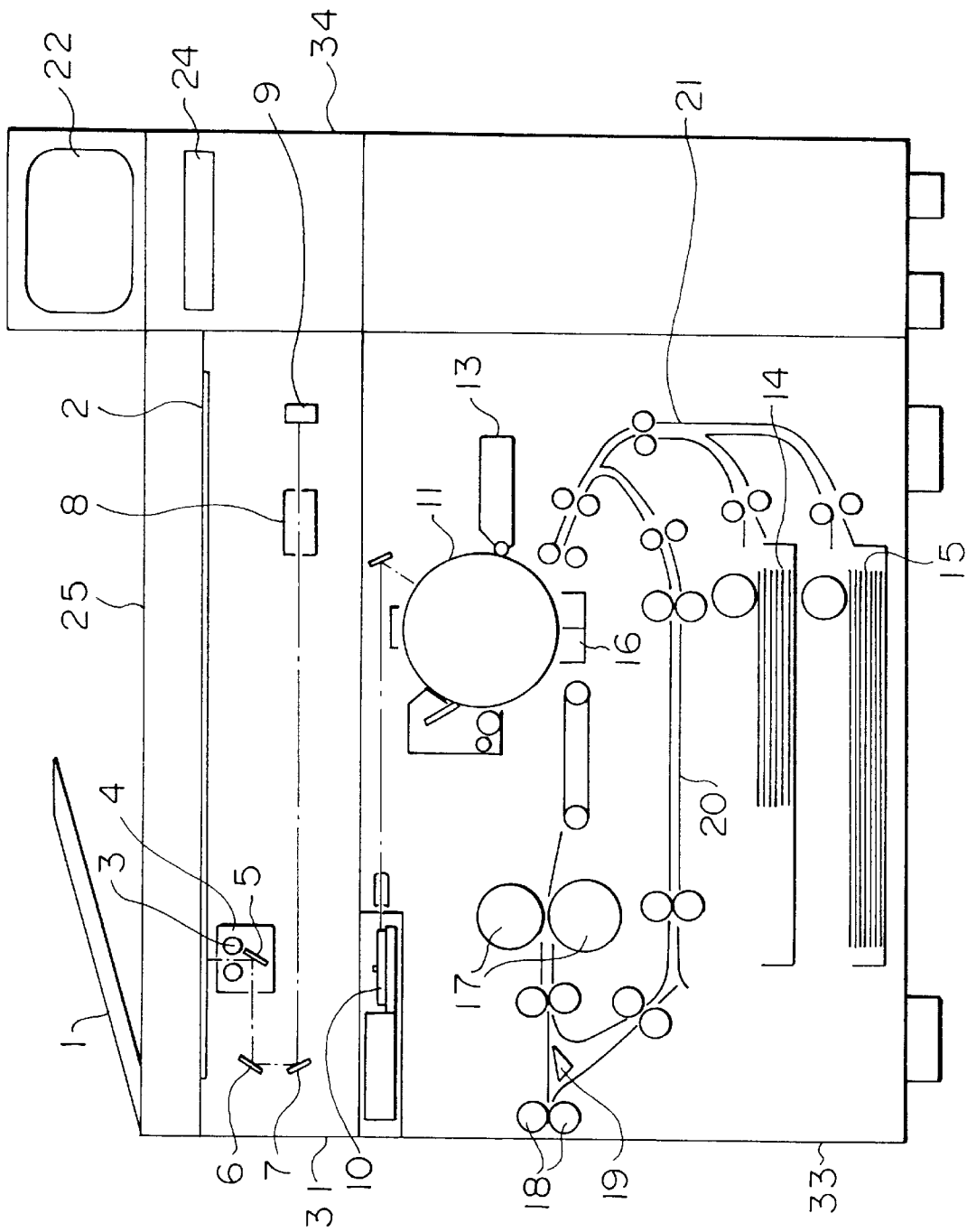
FIG. 1 is a cross sectional view which illustrates an embodiment of an image processing apparatus.

Preferred embodiments of the present invention will now be described with reference to the drawings.

Reference numeral 2 represents an original-document retaining glass, 1 represents an original-document stacking portion, and 25 represents an original-document supply device for supplying the original documents held in the original-document stacking portion 1. Reference numeral 31 represents a reader for reading the original document, 4 represents a scanner unit for irradiating the image of the original document placed on the original-document retaining glass 2 with light while moving the position thereof, 3 represents a lamp disposed in the scanner unit 4 and arranged to irradiate the original document with light, 5 represents a mirror disposed in the scanner unit 4 and acting to introduce the image, 6 and 7 represent mirrors for introducing the image, 8 represents a lens, and 9 represents an image sensor for converting the image of the original document into an electric signal. The original document is irradiated with light from the lamp 3 and introduced by the mirrors 5, 6 and 7 via the lens 8.

Reference numeral 33 represents a printer for printing the image, 10 represents a light generating portion for converting the electric signal of the image into an optical signal so as to emit light, which corresponds to the image signal, and 11 represents a photosensitive member for forming an electrical latent image which corresponds to light emitted from the light generating portion 10. Reference numeral 13 represents a developing device for developing a latent image formed on the photosensitive member 11. Reference numerals 14 and 15 represent transference-paper stacking portions, and 21 represents a conveyance passage through which the transfer paper sheets stacked in the transference-paper stacking portions 14 and 15 are conveyed. Reference numeral 16 represents a transference portion for transferring an image developed on the photosensitive member 11 onto the transference paper, and 17 represents a fixing device for fixing the image transferred onto the transference paper by the transference portion 16. Reference numeral 18 represents a discharge portion for discharging the transference paper, 19 represents a change-over portion for changing over the conveyance passage through which the transference paper is conveyed, and 20 represents a paper re-supply portion for again conveying the transference paper, onto which the image has been transferred, to the transference portion 16.

Figure 2:
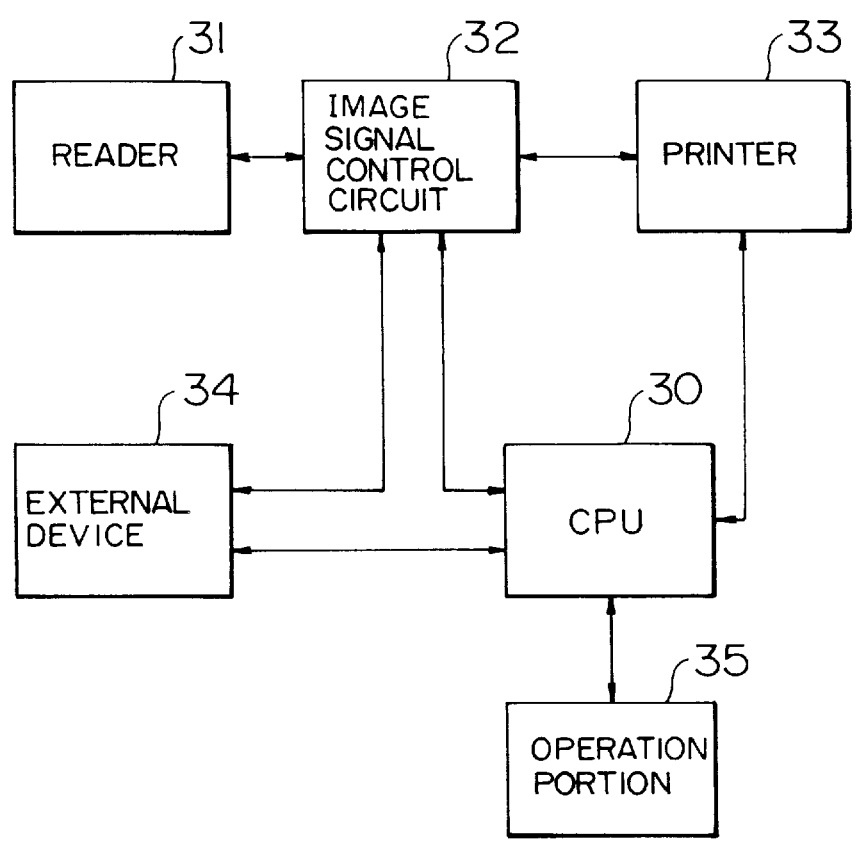
FIG. 2 is a block diagram of the image processing apparatus.

FIG. 2 is a block diagram which illustrates the image processing apparatus according to this embodiment. Reference numeral 31 represents a reader, 34 represents an external device for outwards transmitting image data, 32 represents an image signal control circuit for controlling an image signal transmitted from the external device 34. Reference numeral 33 represents a printer for printing an image signal transmitted from the image signal control circuit 32, and 30 represents a CPU for controlling the external device 34, as well as the image signal control circuit 32 and the printer 33 in accordance with an input made with the control portion 35.

The basic copying operation to be performed by the aforesaid structure will now be described. The original document sheets stacked on the original-document stacking portion 1 on the original-document supply device 25 are sequentially conveyed onto the original-document retaining glass 2, one by one. When the original document sheet is set on the original-document retaining glass 2, the lamp 3 of the scanner unit 4 is turned on. Further, the scanner unit 4 is moved, so that the original document is irradiated with light. Light reflected from the image of the original document image passes through the lens 8 via the mirrors 5, 6 and 7 before it is received by the image sensor portion 9. In the image sensor portion 9, the image is converted into an electric signal. Then, the image signal is transmitted from the reader 31, shown in FIG. 2, and is processed by the image signal control circuit 32 before it reaches the printer portion 33. The image signal supplied to the printer 33 is converted into an optical signal by the light generating portion 10 so that light is emitted. Hence, the photosensitive member 11 is irradiated with light which corresponds to the image signal. A latent image formed on the photosensitive member 11 by the irradiation light is developed by the developing device 13. The transference paper is conveyed by the transference paper stacking portion 14 or 15. The image developed on the photosensitive member 11 is transferred to the transference paper in the transference portion 16. The stacking portion arranges the timing with the latent image formed on the photosensitive member 11. The image thus transferred is fixed to the transference paper in the fixing portion 17 before it is discharged to the outside the printer 33.

A method of outputting the images to be sequentially read to the two sides of one transference paper sheet will now be described. The transference paper fixed at the fixing portion 17 is temporarily conveyed to the discharge portion 18, and then the conveyance direction is reversed so that the it is introduced into the re-supply transference paper stacking portion 20 by the change-over portion 19. When the next original document has been prepared, the image of this original document is read similarly to the aforesaid process, the transference paper is supplied from the re-supply transference paper stacking portion 20, the image is transferred in the transference portion 16, the image is fixed in the fixing portion 17, and then it is discharged. As a result, the images of the two original document sheets can be output to the two sides of one transference paper sheet.

A description will be made about an operation to be performed when the image of an original document is contracted before it is output onto the transference paper. According to this embodiment, the timing at which the image signal is read from the reader 31 is made to be constant. Accordingly, the image signal can be contracted in a direction (in the sub-scanning direction) in which the paper is conveyed because image information, which can be supplied to the reader 31 in unit time, can be increased by raising the movable speed of the scanner unit 4, which irradiates the original document with light. As for the direction (in the main scanning direction) perpendicular to the aforesaid direction, the image signal can be enlarged/contracted by controlling the input/output of the image signal via the image signal control circuit 32 shown in FIG. 2.

Figure 3:
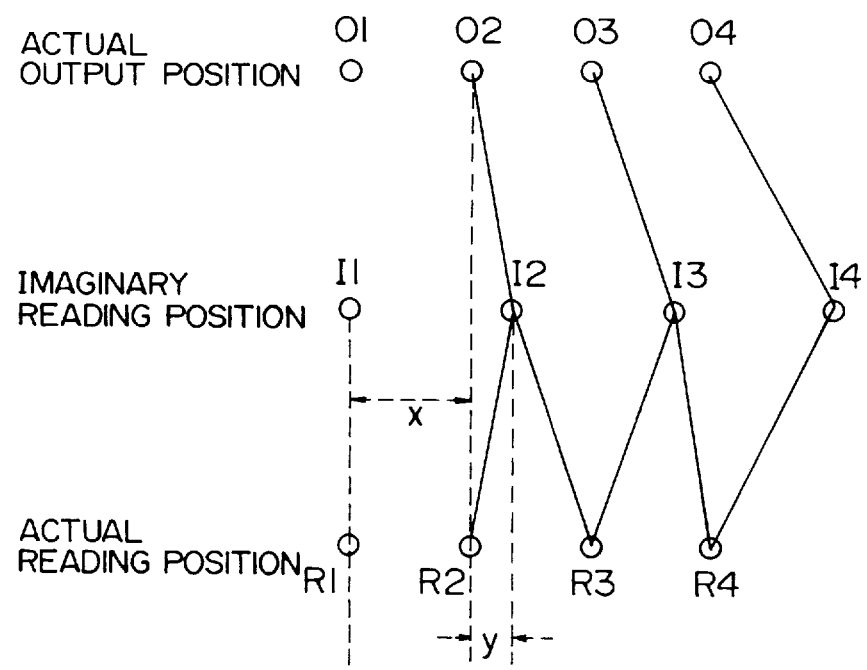
FIG. 3 illustrates the calculations required to perform image contraction.

A description will be made about a case in which the image signal is contracted to x/(x+y)% with reference to FIG. 3. In a case where equal-magnification output is performed, the actual output position and the actual reading position shown in FIG. 3 correspond to each other. In the case of a contraction, the image signal is received at an imaginary reading position. The image can be contracted by outputting the image data read at the aforesaid position to the actual output position. Then, the image density at the imaginary reading position is interpolated/predicted from the density value of the image signal received at the actual reading position in accordance with the following equation:

$$Q2=\{R3 \cdot y+R2\cdot(x-y)\}/x$$

Furthermore, an external device 34 is connected to the image forming apparatus according to this embodiment. Referring to FIG. 1, reference numeral 24 represents a data input/output device comprising a detachable recording medium such as an optomagnetic disk arranged to convert the image signal supplied to the image sensor portion 9 into a structure adapted to the format of the optomagnetic disk, so as to record and read the image signal. The external device 34 shown in the block diagram of FIG. 2 includes a facsimile communication device, which uses the aforesaid data input/output device, and a communication line and a printer interface device for transmitting data from the printer portion 33 in accordance with the command supplied from a computer. Reference numeral 22 represents a display portion for making a display when desired image data is retrieved from image data recorded on the recording medium currently attached to the data input/output device 24.

Figure 4:
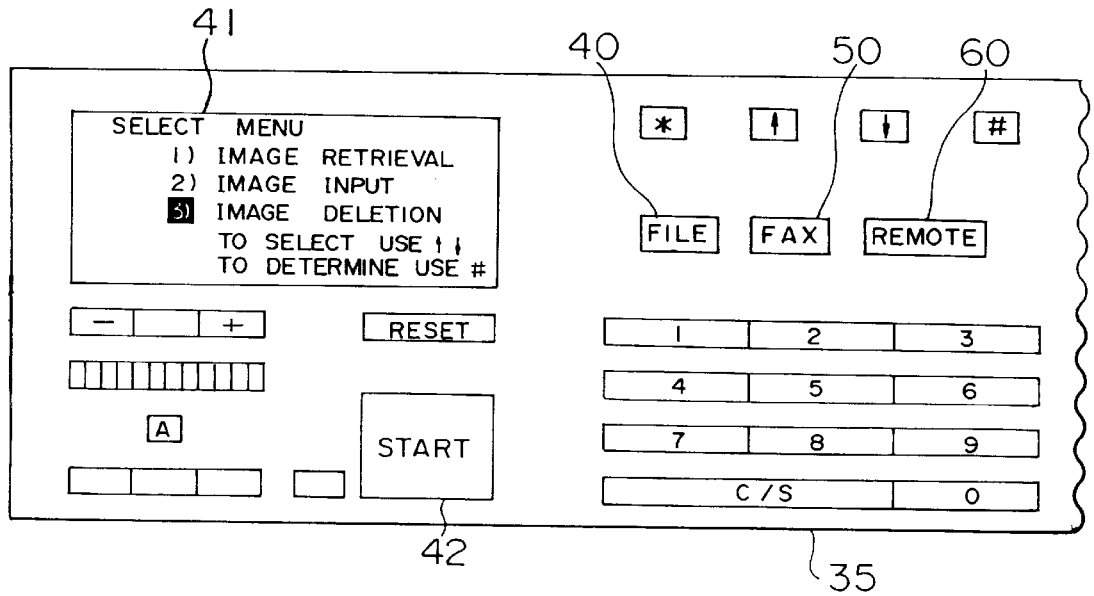
FIG. 4 illustrates a portion of an operation portion 35 of the image processing apparatus.

FIG. 4 illustrates the shape of the operation portion 35 of the body of the image forming apparatus. Reference numeral 41 represents a display portion for displaying the operation guide, 42 represents a start key for starting the copying operation or the facsimile transmission, 40 represents a file key for selecting an image filing mode, 50 represents a facsimile key for selecting a facsimile mode, and 60 represents a remote key for selecting a mode in which data is transmitted/received to and from the computer connected to an external device.

An example of the operation of the external device 34 of the image forming apparatus, according to this embodiment, will now be described.

Figure 5:
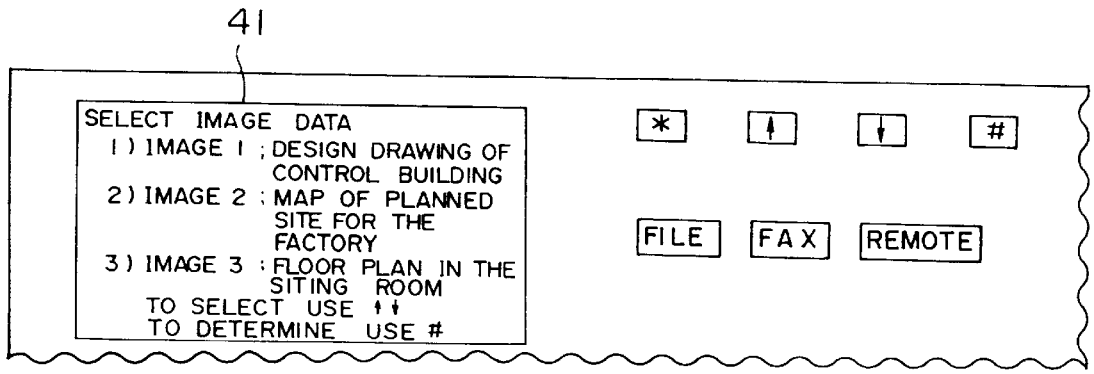
FIG. 5 illustrates a display made on the operation portion 35.

First, an operation of storing an image to the detachable recording medium or retrieving the same will now be described. When the file key is depressed for the purpose of instructing the aforesaid mode, an image shown in FIG. 4 is displayed on the display portion 41. A user selects a desired process from a group consisting of (1) image retrieval, (2) image input and (3) image deletion in accordance with an instruction shown on the display. In the case where (1) image retrieval is selected, filed image titles are displayed as shown in FIG. 5. Incidentally, a structure may be employed in which a key word, which has been previously added to each image data, is simultaneously displayed and a key word retrieval is enabled so as to assist the user to select the process. Referring to FIG. 5, when the user selects a desired image from the displayed title list, the selected image is displayed on the display portion 22. When the user depresses the start key 42 after a confirmation of the displayed image has been made, selected image data is printed out from the printer 33.

Figure 6:
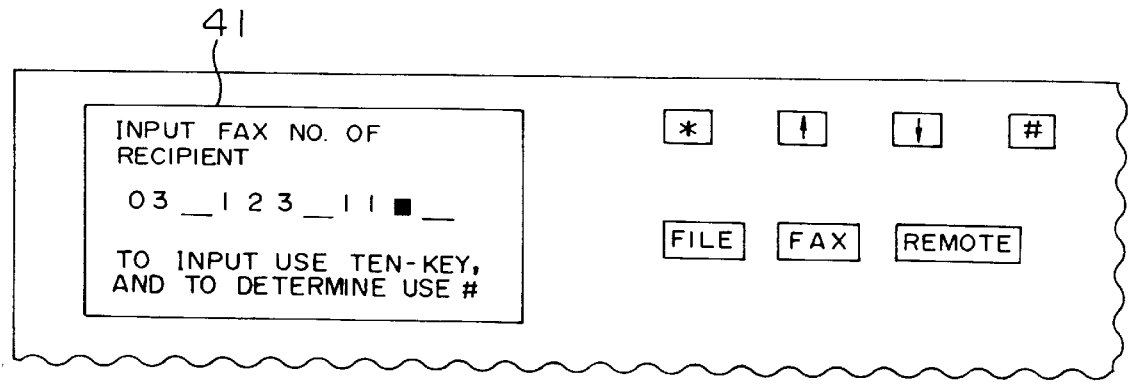
FIG. 6 illustrates a display made on the operation portion 35.
Figure 7:
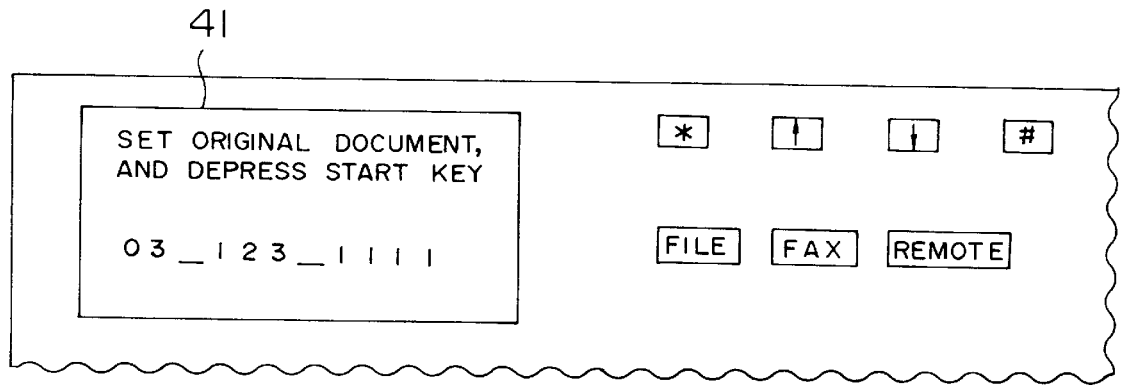
FIG. 7 illustrates a display made on the operation portion 35.

The operation of the facsimile communication device of the external device 34, will now be described. When the facsimile communication device is used, the facsimile key 50 shown in FIG. 4 is depressed. As a result, a display for inputting the facsimile No. of the receiver is made as shown in FIG. 6. The user inputs the telephone No. of the receiver by using the ten keys located on the operation portion 35 in accordance with an instruction made on the display. When the operation is determined by using the "#" key after the telephone No. has been inputted, a guiding remark is displayed on the screen as shown in FIG. 7. The user places an original document to be transmitted on the original-document retaining glass 2 of the body of the image forming apparatus before the start key 42 is depressed. As a result, the original document is read by the reader 31, and the read image data is transmitted to the instructed receiver via the communication line.

Figure 8:
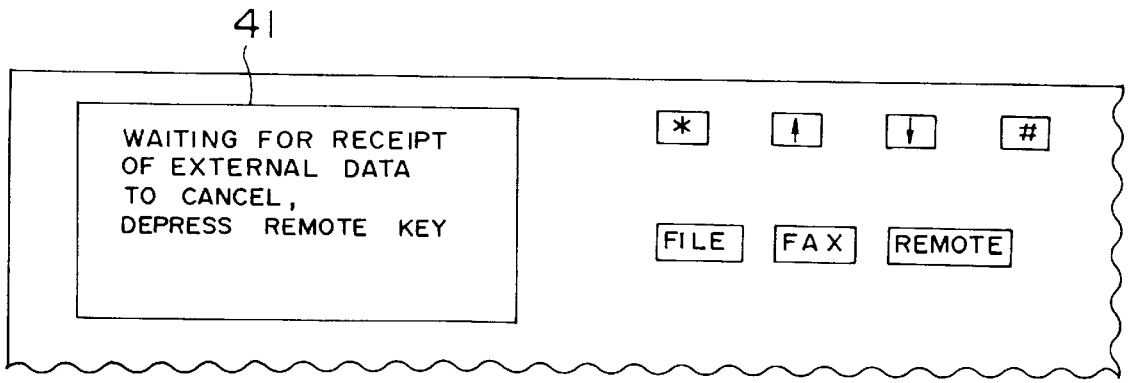
FIG. 8 illustrates a display made on the operation portion 35.

The operation of printing out data transmitted from the computer will now be described. When the remote key 60 is depressed, a waiting mode is started for receiving data inputted from an outside source. At this time, a guiding remark is displayed on the display portion 41 on the operation portion as shown in FIG. 8. When output data has been transmitted from the computer as described later, output data is printed by the printer 33.

Figure 9:
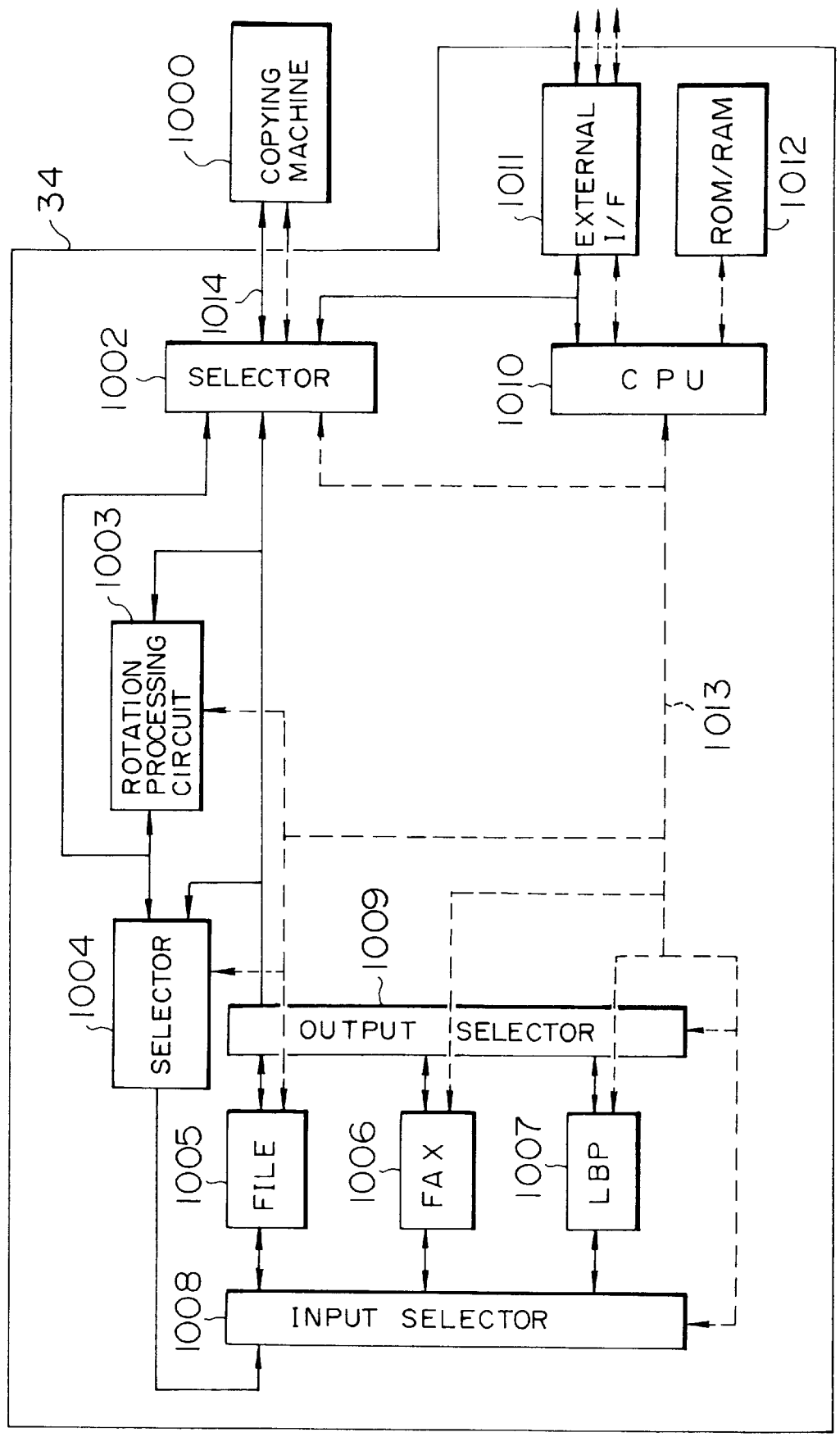
FIG. 9 is a block diagram which illustrates an external device 34 of the image processing apparatus.

FIG. 9 illustrates the detailed structure of the external device 34. Reference numeral 1002 represents a selector for selecting either an operation of causing the external device 34 to receive image data transmitted from the reader 31 or an operation of transmitting the image data transmitted from the external device 34 to the printer 33. Reference numeral 1003 represents a rotation processing circuit for rotation-processing the image data to be transmitted to the copying machine 1000 having the printer 33, or the image data transmitted from the copying machine 1000 having the reader 31. Reference numeral 1004 represents a selector for selecting an operation of outputting image data transmitted from the rotation processing circuit 1003, or an operation of outputting image data which does not pass through the rotation processing circuit 1003, or an operation where no image data is output. Reference numeral 1008 represents an input selector for selecting an input of the image data transmitted from the selector 1004 to a file circuit portion 1005, or a facsimile circuit portion 1006 or an LBP circuit portion 1007 or a plurality of the aforesaid circuit portions. Reference numeral 1005 represents the file circuit portion for filing the image data transmitted from the input selector 1008 or transmitting the filed image data to an output selector 1009. The file circuit portion 1005 includes the extended display portion 22 as well as the data input/output device 24, which comprises the recording medium. Reference numeral 1006 represents a facsimile circuit portion for transmitting the image data received from the input selector 1008 as well as transmitting the received image data to an output selector 1009. Reference numeral 1007 represents an LBP circuit portion for developing image data supplied from the input selector 1008 and transmitting the developed image data to the output selector 1009. Reference numeral 1009 represents the output selector for transmitting the image data supplied from the file circuit 1005, or the image data supplied from the facsimile circuit 1006, or the image data supplied from the LBP circuit 1007 to any one of the selector 1004, the rotation processing circuit 1003, or the selector 1002. Reference numeral 1010 represents a CPU for controlling all of the functions of the external device 34 by controlling the reader 31, the printer 33, the file circuit portion 1005, the facsimile circuit portion 1006, the LBP circuit portion 1007, the selector 1002, the selector 1004, the input selector 1008 and the output selector 1009. The CPU also communicates with an external device (omitted from illustration) via the external interface circuit 1011. Reference numeral 1012 represents a ROM/RAM which stores a control program performed by the CPU 1010 and a work memory. A dashed line 1013 designates a CPU bus, and a solid line 1014 designated an image data line.

The operation of the external device 34 shown in FIG. 9 will now be described.

First, a case where an original document is filed will now be described. In this case, the file key 40 in the operation portion 35 is depressed so as to set various factors before a desired original document is placed on the original-document retaining glass 2. When the start key 42 is then depressed, the various factors, which have been set, are transmitted to the CPU 1010 via the communication line 1013. The data about the set factors are transmitted from the CPU 1010 to the file circuit portion 1005 via the communication line 1013. The file circuit portion 1005 performs setting in accordance with the supplied data about setting and transmits a signal denoting that preparation has been completed to the CPU 1010. The CPU 1010, which has received the signal denoting the completion of the preparation, controls the selector 1002 so as to cause the image data to pass from the reader 31 to the rotation processing circuit 1003. Furthermore, the CPU 1010 controls the selector 1004 and the input selector 1008 causing the image data to pass from the rotation processing circuit 1003 to the file circuit portion 1005 via the selector 1004 and the input selector 1005. Thus, a sequential route through which the image data passes is determined. Then, the CPU 1010 transmits a signal denoting the completion of the preparation for the image receipt to the reader 31. The reader 31, which has received the signal denoting the completion of the preparation for the image receipt, turns on the lamp 3 of the scanner unit 4 as described above, as well as moves the scanner unit 4 to start irradiating the entire surface of the original document. An input signal supplied from the reader 31 is processed by the CPU 30 before it is received by the selector 1002 via the image data line 1014. Then, it is supplied to the file circuit portion 1005 via the rotation processing circuit 1003, the selector 1004 and the input selector 1008. In a case where a rotation of the overall body of the image data is required at the time of the image input, the rotation processing circuit 1003 controls the rotation. In a case where the rotation is not required, no process is performed by the rotation processing circuit 1003 before the image data is transmitted. In the file circuit portion 1005, the structure of the image data is converted into a form which coincides with the format of the optomagnetic disk before it is recorded on the optomagnetic disk. When the image data has been read, a signal denoting the completion of reading is transmitted from the file circuit portion 1005 to the CPU 1010. The CPU 1010, upon receiving the signal denoting the completion of reading, causes the selector 1002 to disconnect the image data line connected to the reader 31. Then, the CPU 1010 transmits a reading completion signal to the reader 31 so that the reader 31 is restored to its original state.

In the case where the image of the original document is facsimile-transmitted, the operations are similarly performed except for the fact that image data is supplied to the facsimile circuit portion 1006 in place of the file circuit portion 1005.

A case where the filed original document is printed will now be described. The user depresses the file key 40, in the operation portion 35, to set the printing mode. When the start key 42 is depressed, the setting of the printing mode is transmitted to the CPU 1010 via the communication line 1013. The data about the fact that the printing mode has been selected is transmitted from the CPU 1010 to the file circuit portion 1005 via the communication line 1013. The file circuit portion 1005 sets up corresponding to the supplied print setting data, and then it transmits a signal denoting the completion of preparation to the CPU 1010. The CPU 1010, which has received the completion of the preparation, controls the output selector 1009 causing the image data to be passed from the file circuit portion 1005 to the rotation processing circuit 1003. Furthermore, the CPU 1010 shuts the selector 1004 and controls the selector 1002 so as to cause the image data to pass from the rotation processing circuit 1003 to the printer 33 via the selector 1002. Thus, a sequential route through which the image data passes is determined. Then, the CPU 1010 transmits a signal denoting the completion of the preparation for outputting the image to the printer 33. The printer 33, upon receiving the signal denoting the completion of the preparation for the image output, starts the printing of the image data to be supplied from the file circuit portion 1005. The image data is supplied to the image signal control circuit 22 shown in FIG. 2. The signal supplied to the printer 33 is printed as described above. In a case where a rotation of the overall body of the image data is required at this time, the rotation processing circuit 1003 controls the rotation. In a case where the rotation is not required, no process is performed by the rotation processing circuit 1003 before the image data is transmitted. When the printing operation has been completed, the printer 33 transmits a signal denoting the completion of the printing operation to the CPU 1010. The CPU 1010, upon receiving the signal denoting the completion of the printing operation, causes the selector 1002 to disconnect the image data line connected to the printer 33. Then, the CPU 1010 transmits a printing completion signal to the file circuit portion 1005 so that the file circuit portion 1005 is restored to the original state.

Where the image data received from the line is printed, or where data received from a computer is printed, are both operations to where the output is made from the file circuit portion 1005, except for the arrangement in which the image data is transmitted from the facsimile circuit portion 1006 or the LBP circuit portion 1007 in place of the file circuit portion 1005.

A case where a filed original document is transmitted will now be described. In this case, the user depresses the file key 40 and the facsimile key 50 so as to set factors required to perform the filing and facsimile transmission. When the start key 42 is then depressed, the fact that the filing and the facsimile transmission have been set is transmitted to the CPU 1010 via the communication line 1013. The data about the result of setting is transmitted from the CPU 1010 to the file circuit portion 1005 and the facsimile circuit portion 1006 via the communication line 1013. In the file circuit portion 1005 and the facsimile circuit portion 1006, setting is performed in accordance with the transmitted data about the setting and transmits a signal denoting the completion of the preparation to the CPU 1010. The CPU 1010, upon receiving the signal denoting the completion of the preparation, controls the output selector 1009 to cause image data to be passed from the file circuit portion 1005 to the rotation processing circuit 1003. Furthermore, the CPU 1010 controls the selector 1004 and the input selector 1008 to cause the image data to be passed from the rotation processing circuit 1003 to the facsimile circuit portion 1006 via the selector 1004. Thus, a sequential route through which the image data passes is determined. Then, the CPU 1010 transmits a signal denoting the completion of the preparation for outputting the image to the file circuit portion 1005. The CPU 1010, upon receiving the signal denoting the completion of the preparation for the image output, starts transmitting the image data. At this time, in a case where the image data must be rotated, the rotation processing portion 1003 controls the rotation. If the rotation is not required, no process is performed by the rotation processing circuit portion 1003 before the image data is transmitted. When the transmission has been completed, a signal denoting the completion of the transmission is transmitted from the file circuit Portion 1005 to the CPU 1010. The CPU 1010, upon receiving the signal denoting the completion of the transmission, causes the output selector 1009 to disconnect the image data line. Then, the CPU 1010 transmits a signal denoting the completion of the transmission to the facsimile circuit portion 1006 so that the facsimile circuit portion 1006 is restored to its original state.

Also, where the image data is received from a line, where data received from a computer is filed, and where data received from the computer is transmitted, all require the same operations to be performed as in the case where the filed original document is transmitted, except for the flow of the image data.

Figure 10:
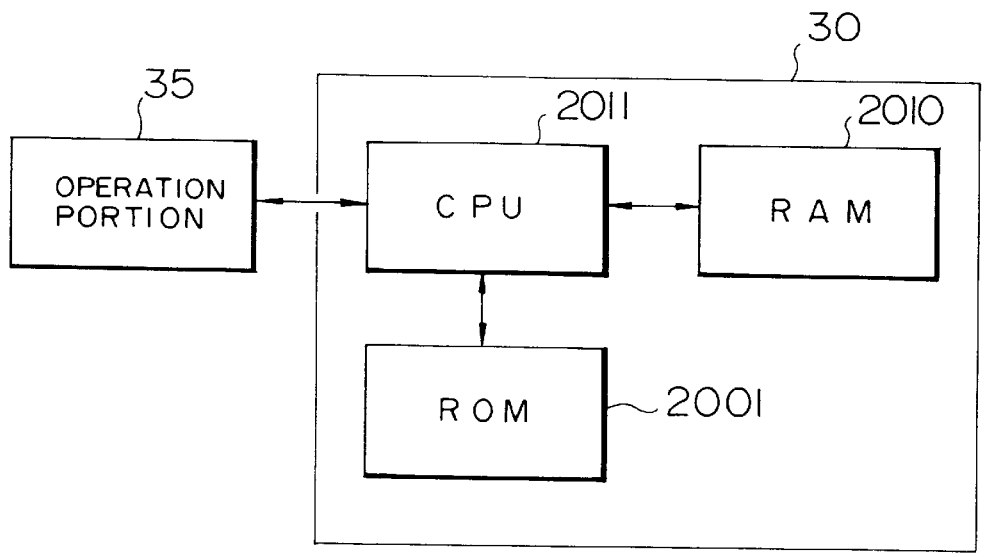
FIG. 10 is a block diagram of a CPU 30.

FIG. 10 is a block diagram which illustrates the detailed structure of the CPU 30 shown in FIG. 2. Referring to FIG. 10, reference numeral 35 represents the operation portion capable of setting a priority order of a plurality of functions. Reference numeral 2001 represents a ROM, which stores a program for executing the functions in accordance with the priority order set by the operation portion 35. Reference numeral 2010 represents a RAM for storing the priority order and the like set by the operation portion 35. Reference numeral 2011 represents a CPU for controlling the storage operation of the RAM 2010 in accordance with the program stored in the ROM 2001.

Figure 11:
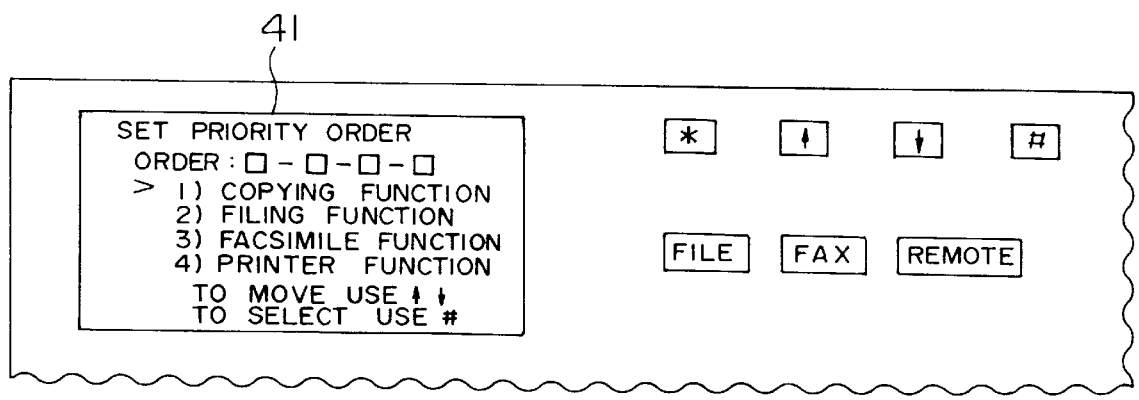
FIG. 11 illustrates a display made on the operation portion 35.
Figure 12:
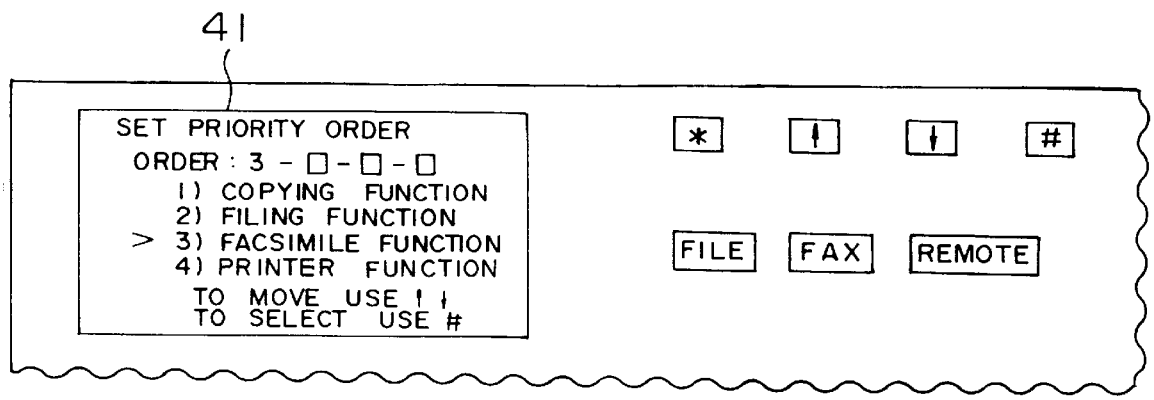
FIG. 12 illustrates a display made on the operation portion 35.
Figure 13:
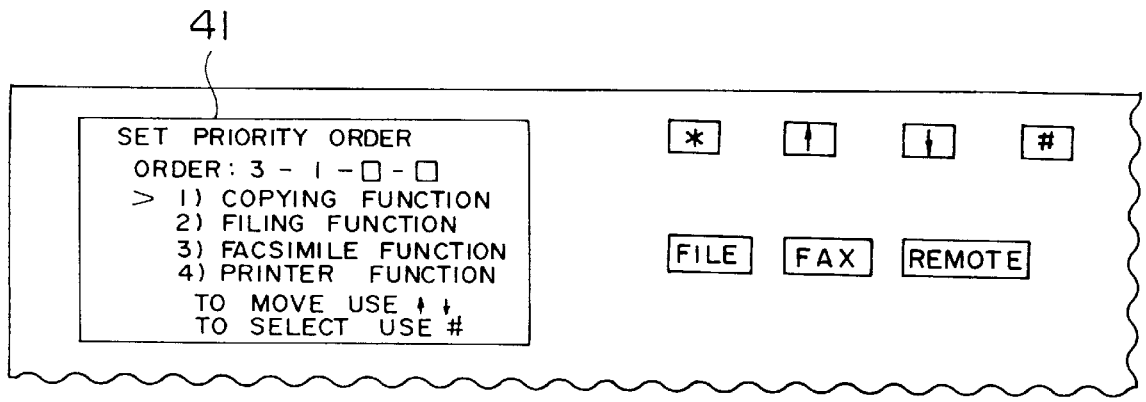
FIG. 13 illustrates a display made on the operation portion 35.
Figure 14:
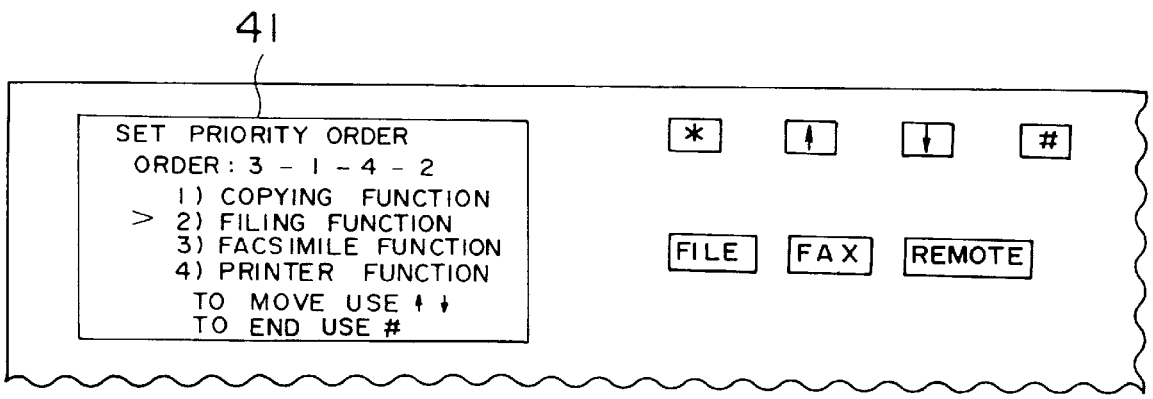
FIG. 14 illustrates a display made on the operation portion 35.
Figure 15:
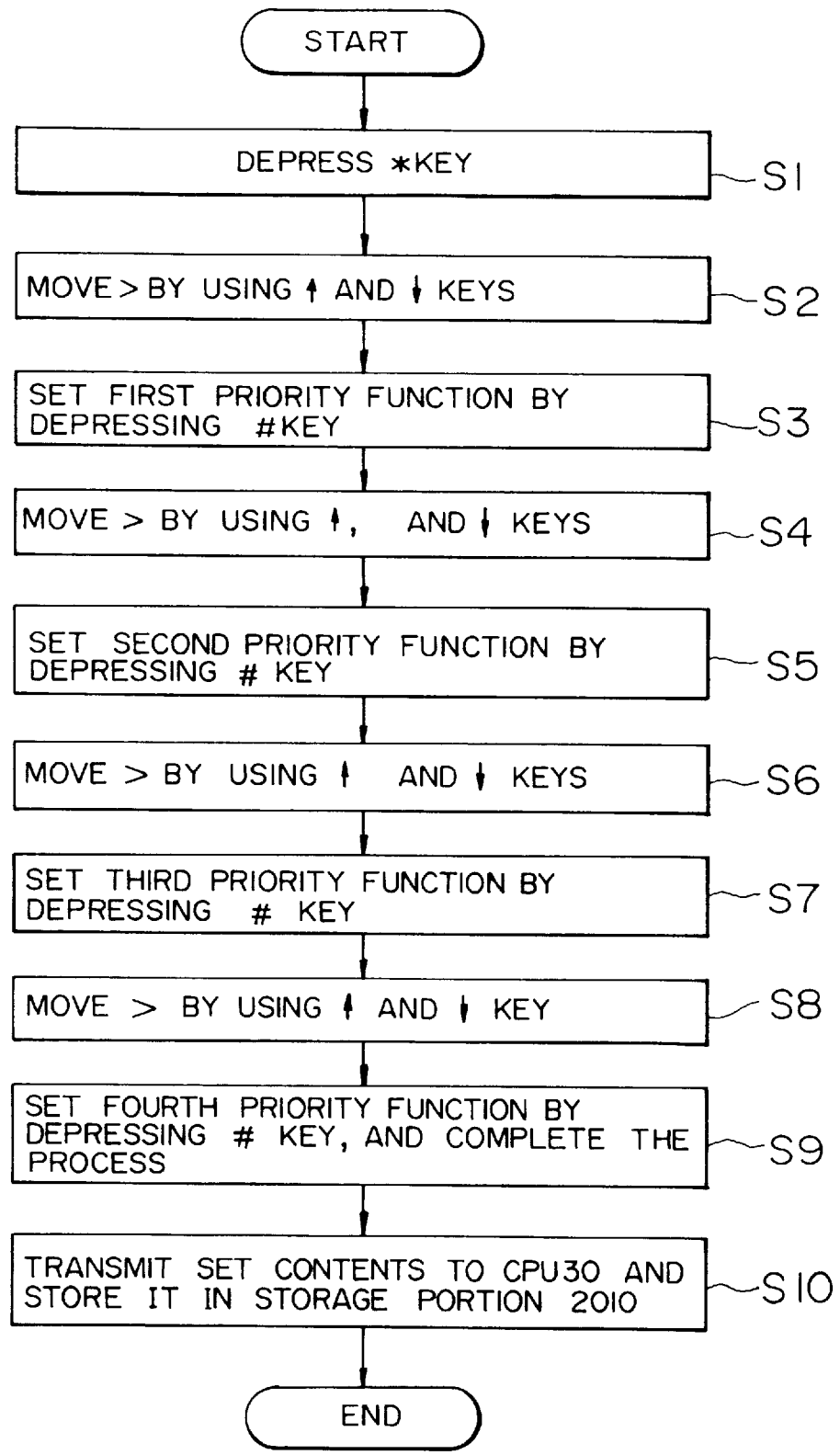
FIG. 15 is a flow chart for setting the priority order.

A method of setting the priority order of a plurality of functions adapted to the image processing apparatus according to this embodiment is now shown. FIG. 15 is a flow chart which shows the flow for setting the priority order of a plurality of functions. When a *-key of the operation portion 35 is depressed, a display is made on the display portion 41 as shown in FIG. 11, see also (S1) of FIG. 15. The display shows that four functions are possessed by the image processing apparatus according to this embodiment. When keys ⇓ and ⇑ are used at this time to move the mark > in the display to the No. of the function, which is to have the first priority, see (S2) of FIG. 15. The #-key is depressed, then a display showing that the facsimile function is set to have the first priority is made as shown in FIG. 12, see also (S3) of FIG. 15. Then, the second priority is set in such a manner that the mark > is moved to the No. of the function which is required to have the second priority by using the keys ⇓ and ⇑, see also (S4) of FIG. 15. The key-# is depressed, so that a display showing that the copying function has been given the second priority is made, as shown in FIG. 13, see also (S5) of FIG. 15. Then, the third and the fourth priorities are set by using the keys ⇓ and ⇑ to move the mark > to the No. of the functions, which are set to have the third and the fourth priorities (S6). By depressing the #-key, a display showing the printer function and the file function which have been given the third and the four priorities is made as shown in FIG. 14 see also (S7 and S8) of FIG. 15. To store the setting order, the #-key is depressed (S9) of FIG. 15, so that the order is transmitted from the operation portion 35 to the CPU 2011 before it is stored in the RAM 2010 (S10).

Figure 20:
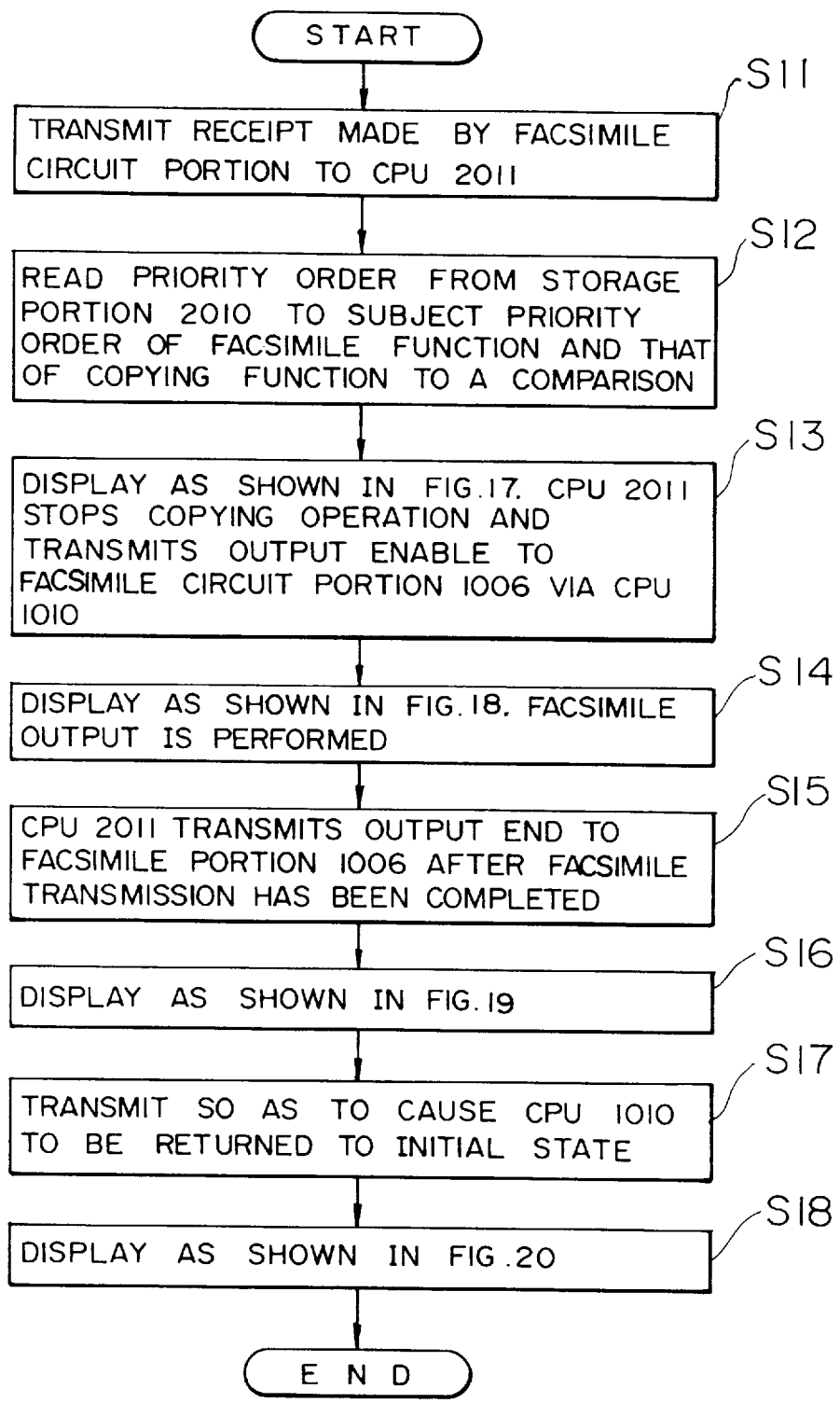
FIG. 20 is a flow chart of an operation to be performed when a facsimile transmission is received.

An operation to be performed in accordance with the program stored in the ROM 2001 will now be described. Referring to a flow chart shown in FIG. 20, the description will be made about a case where a facsimile transmission is received during the copying operation.

Figure 16:
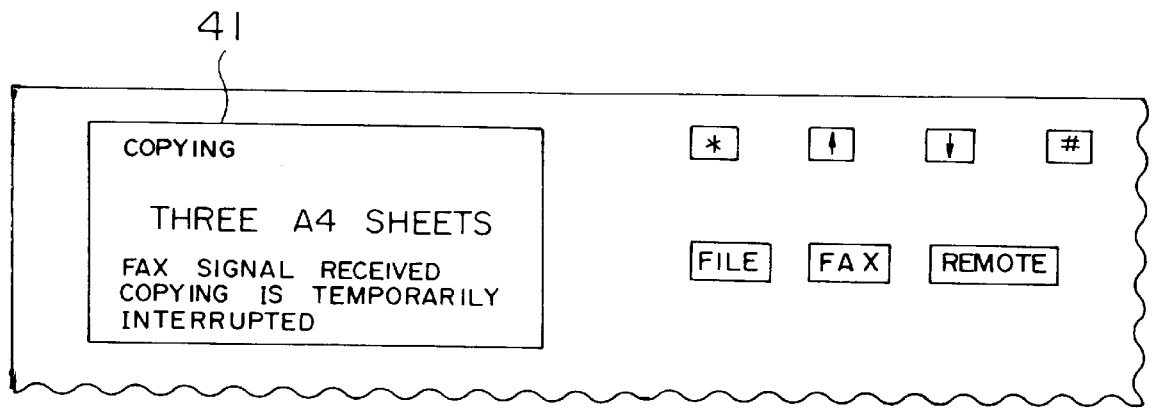
FIG. 16 illustrates a display made on the operation portion 35.
Figure 17:
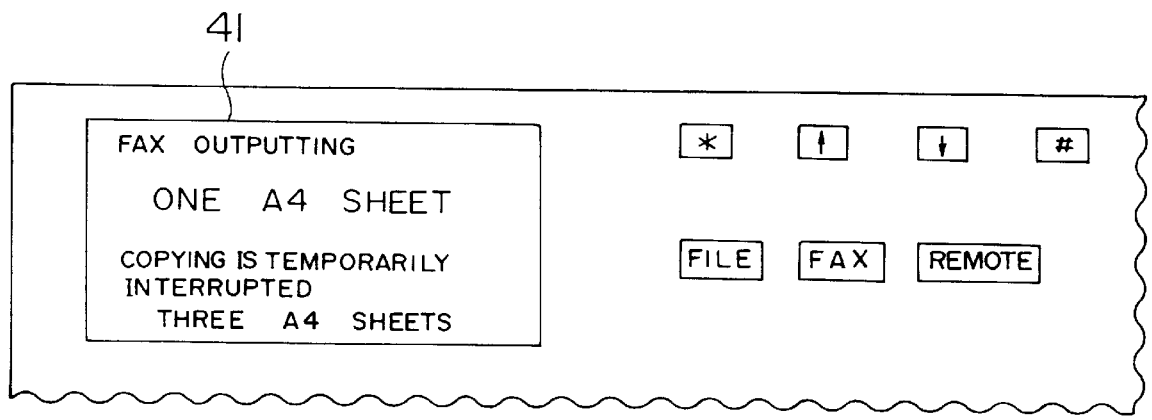
FIG. 17 illustrates a display made on the operation portion 35.
Figure 18:
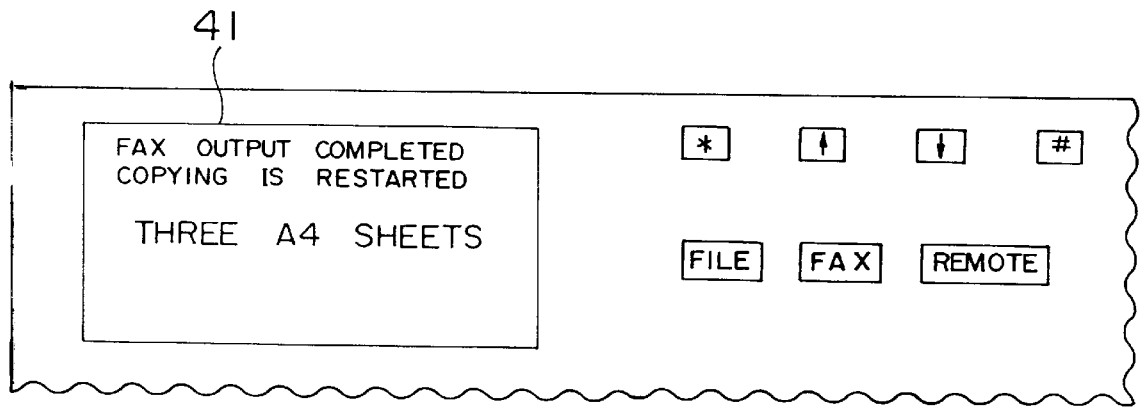
FIG. 18 illustrates a display made on the operation portion 35.
Figure 19:
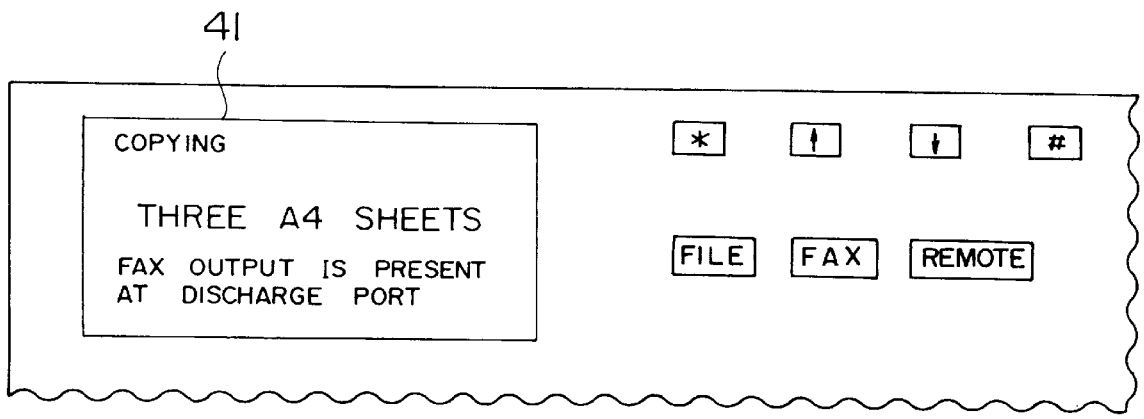
FIG. 19 illustrates a display made on the operation portion 35.

When the copying operation is performed by the reader 31 and the printer 33, the fact that the copying operation is being performed is transmitted to the CPU 1010 through the communication line 1013. When a facsimile transmission is received to the facsimile circuit portion 1006 from a telephone line (omitted from illustration), the fact that the facsimile transmission has been received is transmitted to the CPU 30, that is, the CPU 2011 through the communication line 1013 via the CPU of the external device 1010 (S11). The CPU 2011 reads the priority order stored in the RAM 2010 so as to make a comparison and determine whether the copying function or the facsimile function that has the higher priority order. If the facsimile function has a higher priority order, the copying operation is temporarily interrupted the fact of which is displayed in the operation portion 35 as shown in FIG. 16. Further, data supplied from the facsimile circuit portion 1006 is transmitted to the printer 33 along the aforesaid flow of the image data. At this time, a display is made as shown in FIG. 17. When the output of the received facsimile transmission has been completed, a display is made as shown in FIG. 18. A signal denoting that the facsimile output has been completed is transmitted to the facsimile circuit portion 1006 via the CPU 1010. As a result, the CPU 2011 confirms that the overall body of the system has been restored to its original state, and then it makes the display as shown in FIG. 19 before the interrupted copying operation is restarted.

In addition to the aforesaid operation of setting the priority order by actuating the operation portion 35, the priority order can be set from a computer (omitted from illustration) connected to the external interface 1011 shown in FIG. 9, or an external facsimile device for performing a communication with the facsimile circuit portion 1006.

Figure 24:
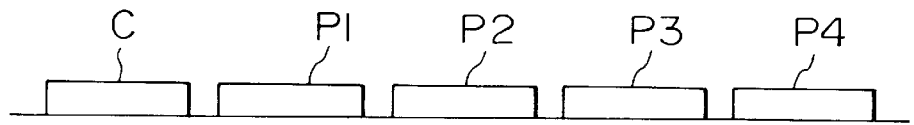
FIG. 24 illustrates a data transmission form from a computer to be employed when the priority order is set.

A method of setting the priority order of the functions of the image processing apparatus from a computer (omitted from illustration) connected to the external interface 1011 with reference to FIGS. 21 and 24 is now shown. A command and a parameter are supplied to the external interface 1011 via an RS232C (omitted from illustration) by using an asynchronous half-duplex system. The command and the parameter to be transmitted from the computer (omitted from illustration) are structured as shown in FIG. 21. The transmission speed is 9600 baud, the data length is 8 bits, the parity is an odd number, and the stop bit is 2 bits. First, command C, (see FIG. 22) showing that the priority order is set, is transmitted as shown in FIG. 24. Then, parameter P1 of the first priority, parameter P2 of the second priority, parameter P3 of the third priority, and parameter P4 of the fourth priority are transmitted. FIG. 23 illustrates the parameters of the functions. In a case where the priority order of the facsimile, copying, LBP and filing operations is set, the transmission may be performed while making C to be 03H, P1 to be 13H, P2 to be 03H, P3 to be 23H and P4 to be 33H. The command and the parameter transmitted from the computer (omitted from illustration) are supplied to the CPU 1010 via the external interface 1011. The aforesaid command and the parameter are also supplied to the CPU 2011 via the communication line 1013. The CPU 2011 discriminates the priority order in accordance with the supplied command and the parameter so as to store the priority order in the RAM 2010. The ensuing operations are performed similarly to the case where the priority order is set from the operation portion 35.

As described above, the priority order of the functions is set by the user, and when a facsimile transmission is received during the copying operation for example, received facsimile-transmission image data is printed in a case where the facsimile function has a higher priority order than that of the copying function, and then the copying operation is restarted after the received facsimile-transmission data has been printed. However, where the facsimile function has a lower priority order than that of the copying function, the received facsimile transmission image data is automatically printed after the copying operation has been performed. As a result, the user is able to immediately look at a print of the received facsimile transmission image data while preventing the mixing of the copying output with the facsimile print output.

Figure 25:
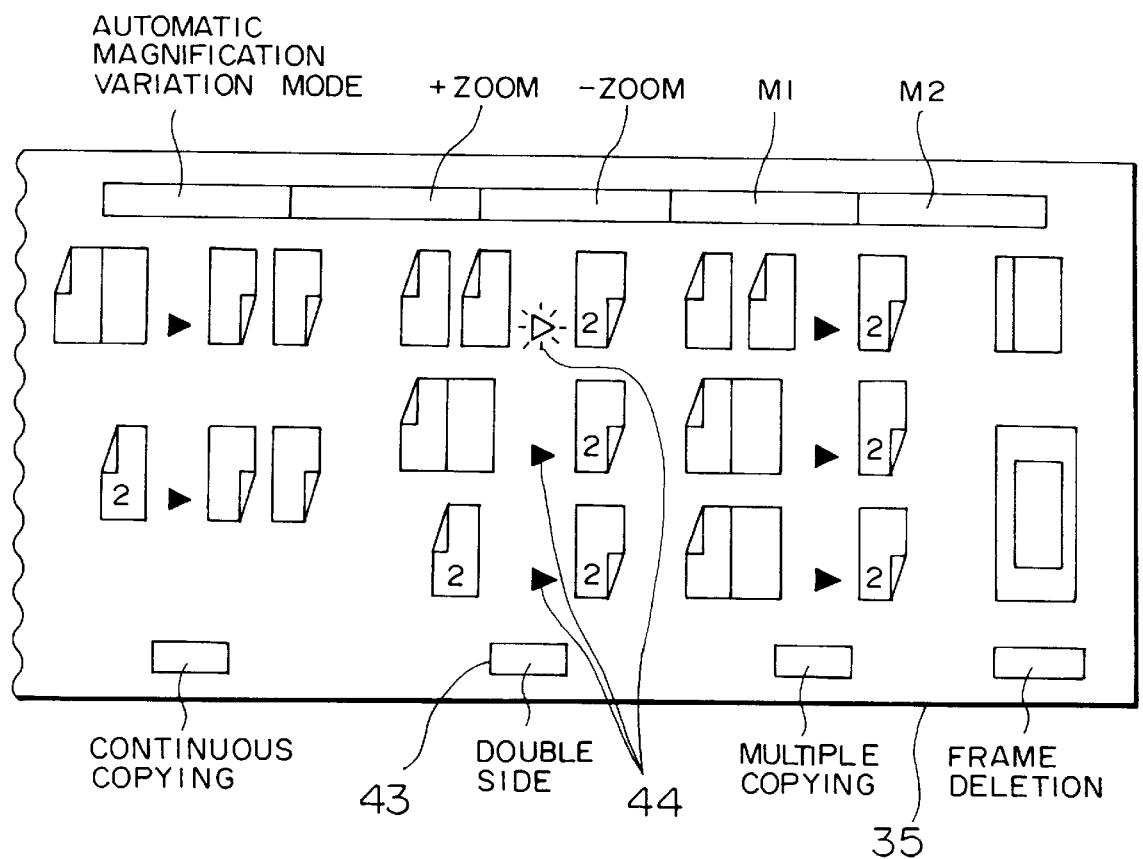
FIG. 25 illustrates a portion of the operation portion 35 of the image processing apparatus.

FIG. 25 illustrates the continuation of the operation portion 35 of the body of the image forming apparatus shown in FIG. 4. When the double-side mode instruction key 43 is depressed, a required double-side mode can be selected. Whenever the double-side mode instruction key 43 is depressed, LEDs 44, indicating the selected mode, are sequentially turned on. FIG. 25 shows a state where the LED 44, corresponding to the mode in which two single-side original documents are output onto one double-side paper sheet, is turned on.

As described above, the double-side mode can be set. Where the double-side mode has been set, the images are formed on the two sides of the transference paper sheet by the aforesaid method.

Figure 26:
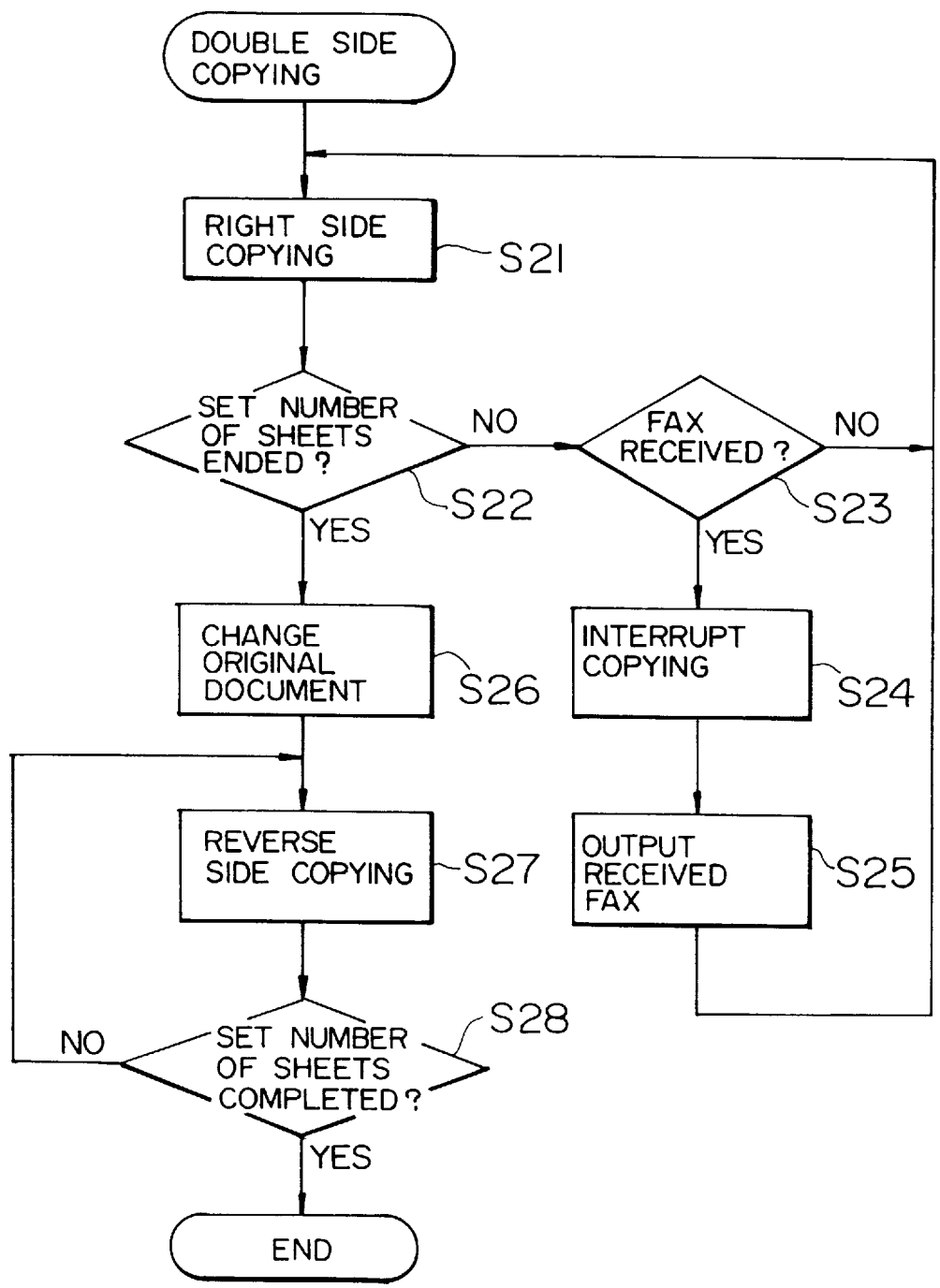
FIG. 26 is a flow chart of an image forming operation to be performed in a double-side copying operation mode.

FIG. 26 is a flow chart, which illustrates an operation of forming images in case of the double side copying operation. When the start key 42 is depressed and the original document is set in the original-document supply device 25, in the double-side mode, the steps shown in FIG. 26 are executed. The original-document supply device 25 is used to supply the original document sheets onto the original-document retaining glass 2 so as to sequentially copy the upper surfaces (S21). Then, a discrimination is made as to whether the number of the upper surfaces of the paper sheets, which have been subjected to upper surface copying, have reached a predetermined number (S22). If it has not reached a predetermined number, a discrimination is made as to whether or not there is a receipt made by the facsimile circuit portion 1006 (S23). If a discrimination is made in step S23 that there is a receipt by the facsimile circuit portion 1006, the copying operation is temporarily interrupted while remaining in a state where the transference paper sheets, the upper surfaces of which have been subjected to the upper surface copying, are stacked on the re-supply portion 20 (S24), and data received by the facsimile circuit portion 1006 is printed (S25). When the received data has been printed, the flow returns to step S21 where the upper surface copying operation, in the double-side copying operation, is restarted. If a discrimination is made in step S23 that no receipt by the facsimile circuit portion 1006 has been made, then the flow proceeds to step S21.

When the number of the sheets, which have been subjected to the upper surface copying operation, have reached a predetermined number in step S22, the original document is changed by the original document supply device 25 (S26) so as to subject the transference paper sheets supplied from the re-supply portion 20 to the reverse side copying (S27). Then, a discrimination is made as to whether or not the number of sheets, which have been subjected to the reverse side copying operation, has reached a predetermined number (S28), if not, the flow proceeds to step S27. If the number of the sheets has reached a predetermined number, the double side copying operation is completed.

The aforesaid interruption operation can be adapted to a case where the priority order has been set as described above and the interruption function has a high priority order. The reason why the aforesaid interruption operation is arranged so that the upper surface copying operation is stopped temporarily and the interruption is inhibited at the time of the reverse side copying operation, lies in that the undesirable mixture of the copied transference sheets and the transference sheets on which received facsimile-transmission data has been recorded.

As a result, even if the discharge end cannot be assorted, the transference paper sheets, on which the received facsimile-transmission data has been recorded, and the transference paper sheets, which have been subjected to the double side copying operation, can be stacked while being divided depending upon the function. Therefore, the necessity for the user to perform complicated sorting work can be eliminated. Furthermore, an arrangement so made that the facsimile receipt is made to have the first priority will eliminate the need for a large receiving buffer. Therefore, the generation of overflow experienced with the receiving buffer at the time of the facsimile data receipt process can be prevented.

Figure 27:
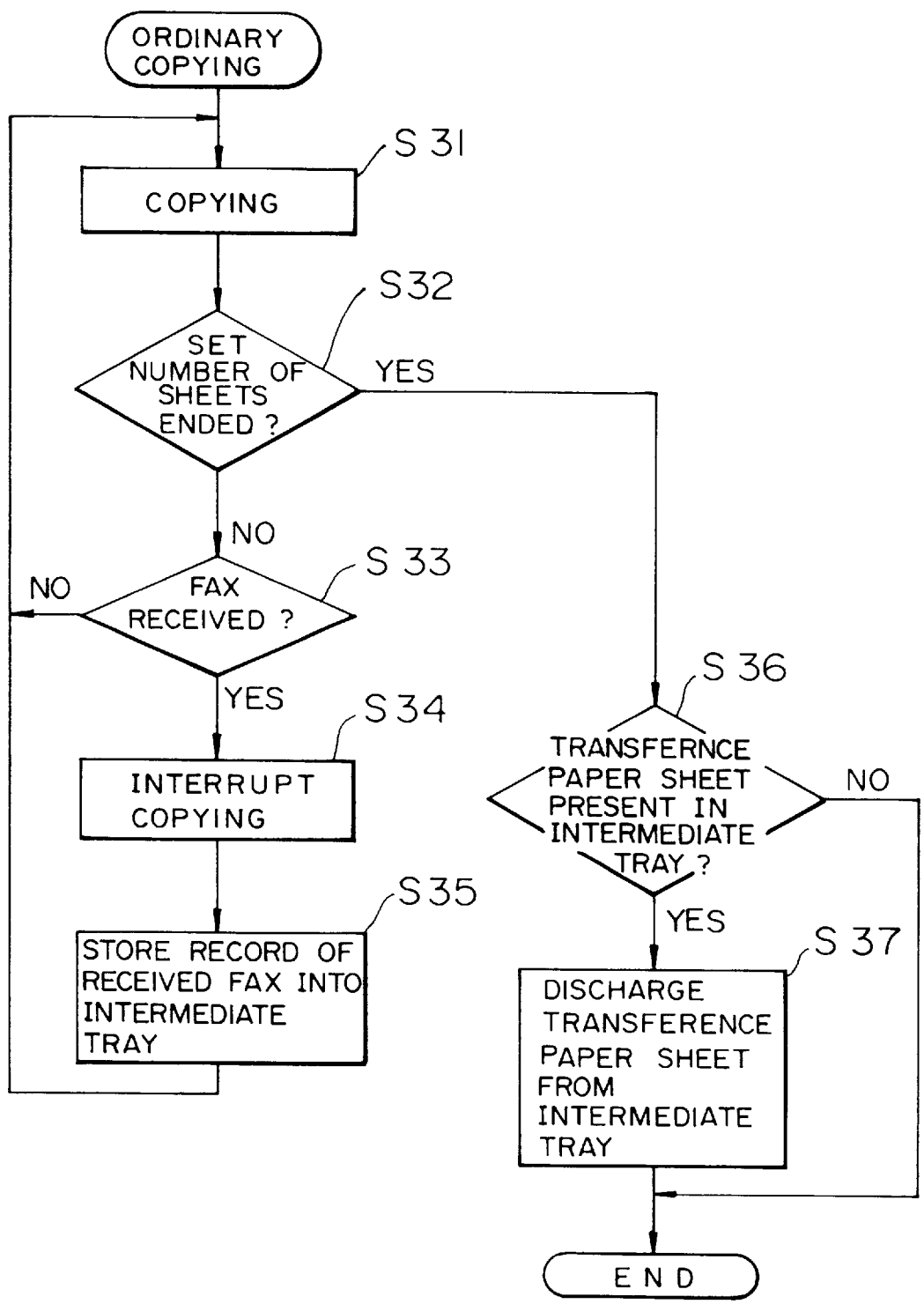
FIG. 27 is a flow chart of an image forming operation to be performed in an ordinary copying operation mode.

FIG. 27 is a flow chart of an operation of forming an image in the ordinary copying operation. When the start key 42 is depressed in the ordinary copying mode in a state where the original document is set to the original-document supply device 25, the steps shown in FIG. 27 are executed. The original-document supply device 25 acts to supply the original document onto the original document retaining glass 2 so that the original document is copied (S31). Then, a discrimination is made as to whether or not the number of the copied sheets has reached a predetermined number (S32). If the number has not reached a predetermined number, a discrimination is made as to whether there is a receipt made in the facsimile circuit portion 1006 (S33). If a discrimination is made in step S33 that there is a receipt, the copying operation is temporarily interrupted (S34) and the received data is printed and temporarily stored in the re-supply portion 20 by the change-over portion 19 (S35). When the received data has been printed, the flow returns to step S31 in which the copying operation is restarted. If a discrimination is made in step S33 that there is no receipt, the flow proceeds to step S31.

If a discrimination has been made in step S32 that the number of copied sheet has reached a predetermined number, a discrimination is made on whether facsimile receipt recording paper sheets were stored in step S35 (S36). If there are, the recording sheets are discharged from the re-supply portion 20 to the discharge portion 18 and the copying operation is completed (S37). If a discrimination is made in step S36 that no transference paper sheet is stored in the re-supply portion 20, the copying operation is completed here.

As described above, even if the discharge end cannot be sorted, the transference paper sheets on which the received facsimile-transmission data have been recorded and the transference paper sheets which have been subjected to the copying operation can be stacked while being divided depending upon the function. Therefore, the necessity for the user to perform the complicated assorting work can be eliminated. Furthermore, an arrangement where the facsimile receipt is made to have the first priority will eliminate the need for a large receiving buffer. Therefore, the generation of overflow experienced with the receiving buffer at the time of the facsimile data receipt process can be prevented.

Figure 28:
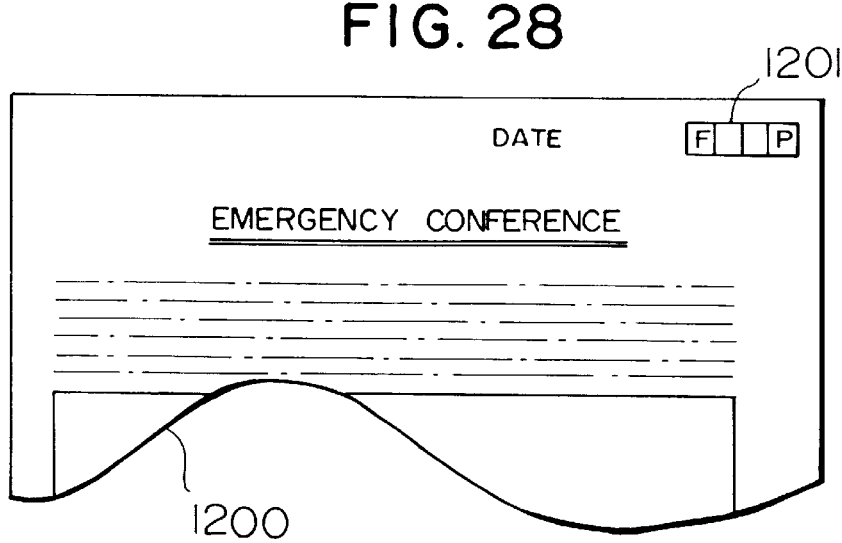
FIG. 28 illustrates a state where an image received from a facsimile circuit portion 1006 has been printed by a printer 33.
Figure 30:
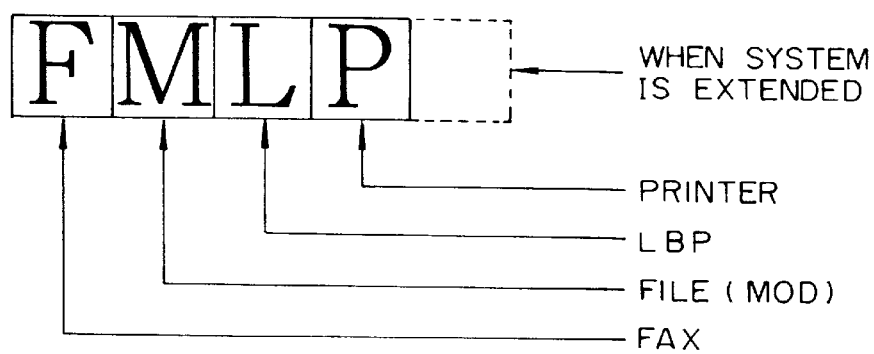
FIG. 30 illustrates marks which illustrate the devices are being used.

In the aforesaid structure shown in FIGS. 2 and 9, image data supplied from any one of the reader, 31, the file circuit portion 1005, the facsimile circuit portion 1006 and the LBP circuit portion 1007 can be printed by the printer 33. When each image data is printed, the CPU 30 causes a mark in the upper right portion of the transference paper sheet indicating the selected function with which printing has been performed, or the state of the image processing apparatus. FIG. 28 illustrates a state where an image received from the facsimile circuit portion 1006 is printed by the printer 33. Referring to FIG. 28, reference numeral 1200 represents a transference paper sheet and 1201 represents a mark indicating that the image was received from the facsimile circuit portion 1006 and was printed by the printer 33. As shown in FIG. 30, the following indications are made: an indication "P" showing printing out was made from the printer 33; an indication "L" showing that data was supplied from the LBP circuit portion 1007; an indication "M" showing that data was supplied from the optomagnetic disk (MOD), which is the recording medium of the file circuit portion 1005; and an indication "F" showing data was supplied from the facsimile circuit portion 1006.

Figure 29:
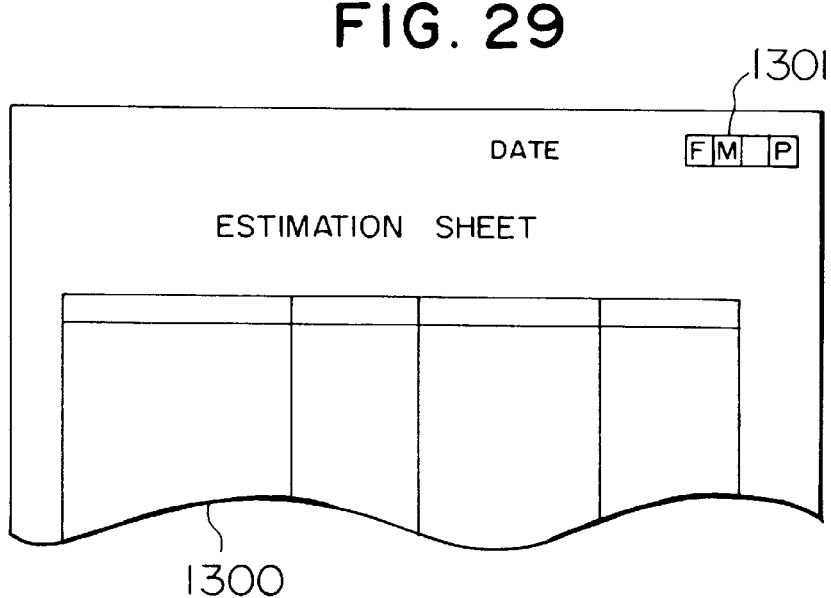
FIG. 29 illustrates a state where an image received from a facsimile circuit portion 1006 has been printed by a printer 33 and it has been recorded to a file circuit portion 1005.

FIG. 29 illustrates a state where an image received from the facsimile circuit portion 1006 is printed by the printer 33 and the same is recorded to the file circuit portion 1005. Referring to FIG. 29, reference numeral 1300 represents a transference paper sheet, and 1301 represents a mark showing that an image received from the facsimile circuit portion 1006 was printed by the printer 33 and the same was recorded to the file circuit portion 1005.

As described above, the original document such as the facsimile sentence can be distinguished, a portion of the system in which the output sentence is stored and a route through which the same has been transmitted can be controlled.

Figure 31:
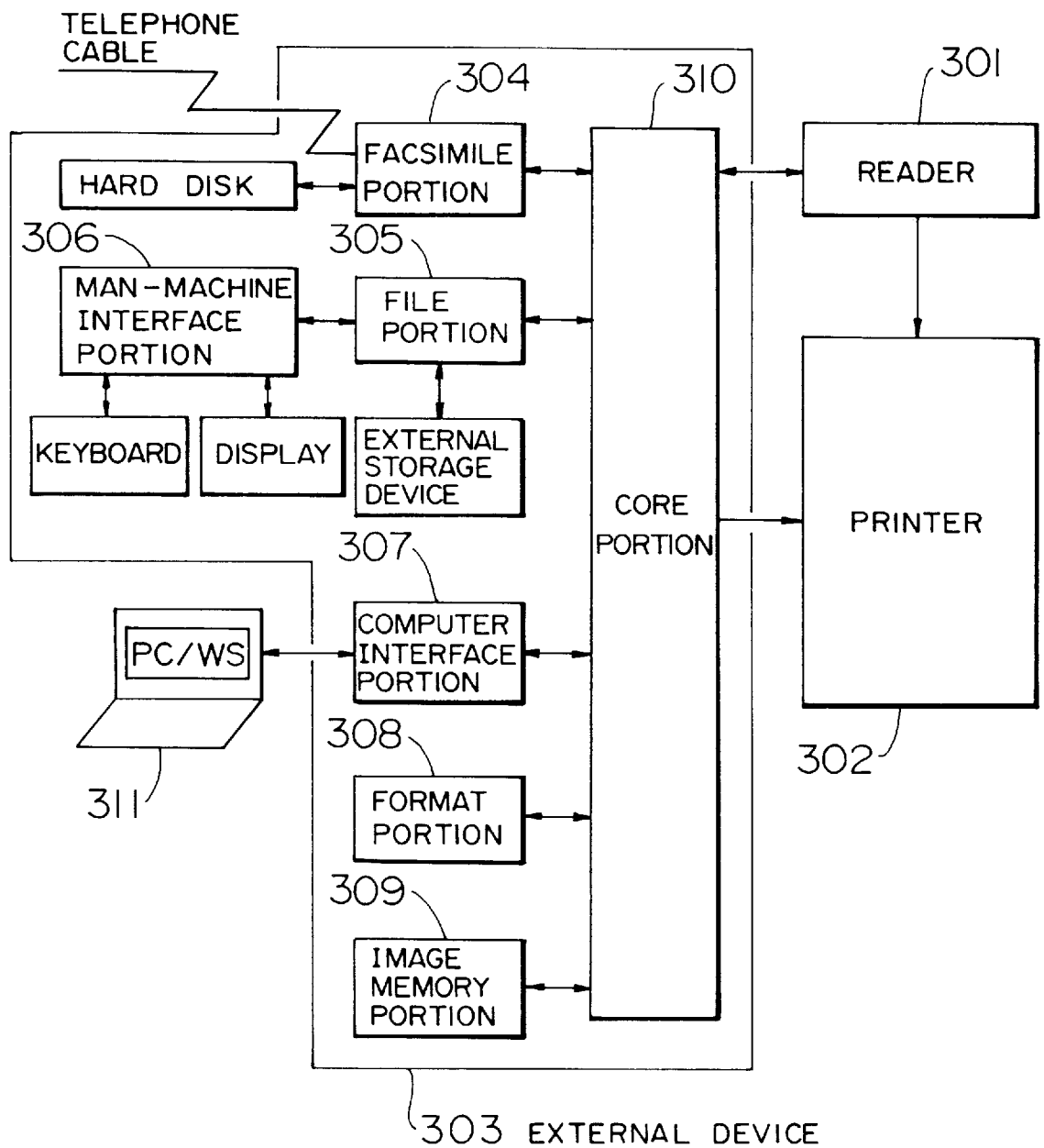
FIG. 31 is a block diagram which illustrates an embodiment of an image processing apparatus.

An image processing apparatus according to another embodiment of the present invention will now be described. FIG. 31 is a block diagram which illustrates an image processing apparatus. Reference numeral 301 represents a reader for converting the image of the original document into image data, and 302 represents a printer for printing image data as a visible image onto a transference paper sheet supplied from any one of a variety of transference paper cassettes in accordance with a print command. Reference numeral 303 represents an external device, which is electrically connected to the reader 301. The external device has a variety of functions. The external device 303 comprises a facsimile portion 304 for transmitting/receiving image data, a file portion 305 for storing image data, a man-machine interface portion 306 connected to the file portion 305, a computer interface portion 307 to establish a connection with an external computer (Personal Computer (PC) or a Work Station (WS)) 311, a format portion 308 for making information supplied from the computer 311 a visible image, an image memory portion 309 for storing information supplied from the reader 301 as well as temporarily storing information supplied from the computer 311, and a core portion 310 for controlling each of the aforesaid functions.

The aforesaid functions will now be described in detail.

Figure 32:
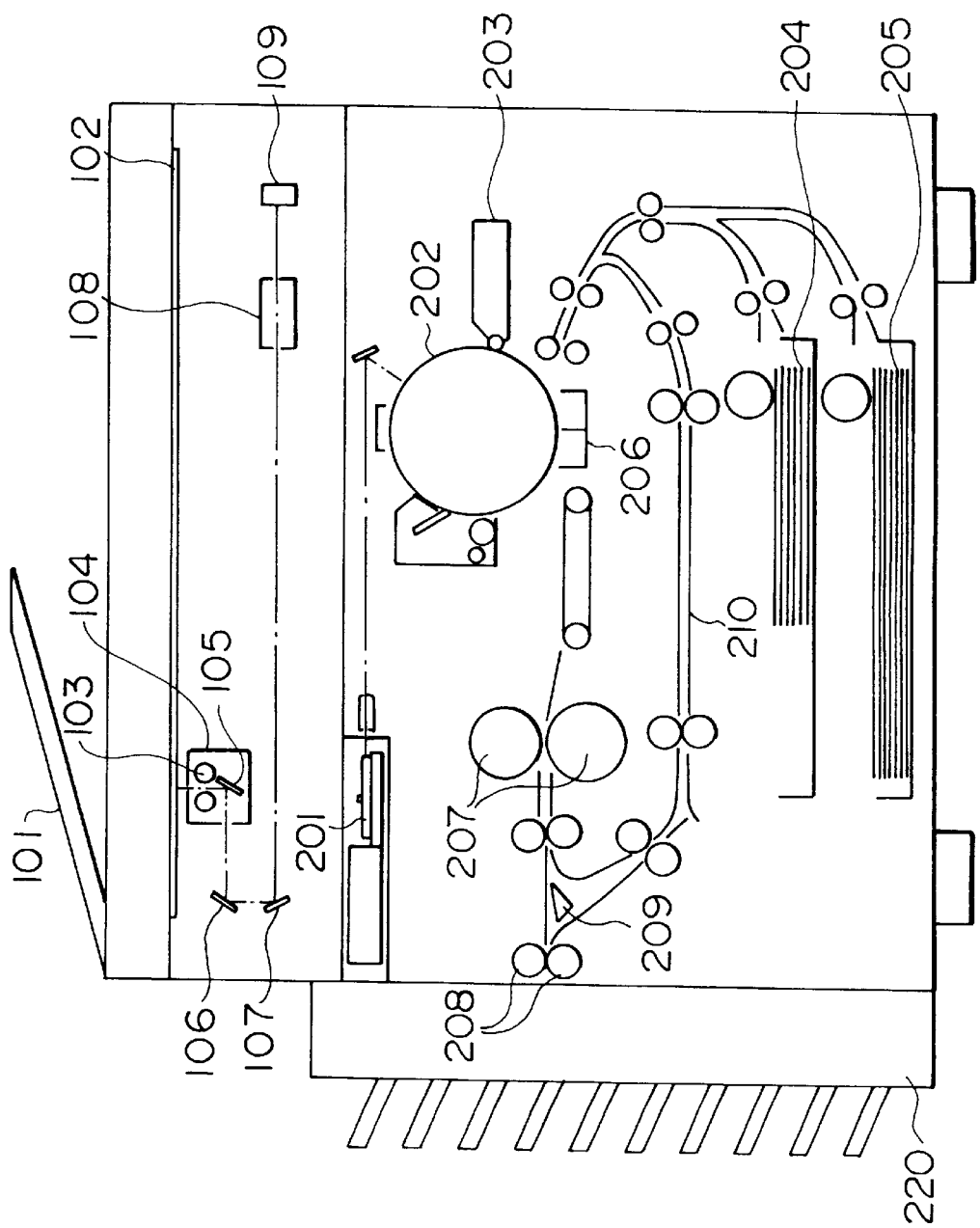
FIG. 32 illustrates the overall structure of the image forming apparatus.

The reader 301 will now be described with reference to FIGS. 32 and 33. FIG. 32 is a cross sectional view, which illustrates the image processing apparatus according to this embodiment. The original document sheets stacked on the original document supply device 101 are, one by one, conveyed sequentially to the upper surface of the original document retaining glass surface 102. When the original document has been conveyed, the lamp 103 of the scanner portion 104 is turned on. Further, the scanner unit 104 is moved to irradiate the original document with light. Light reflected from the original document is supplied to a CCD image sensor portion 109 (hereinafter called a "CCD") via the mirrors 105, 106 and 107 and the lens 108.

Figure 33:
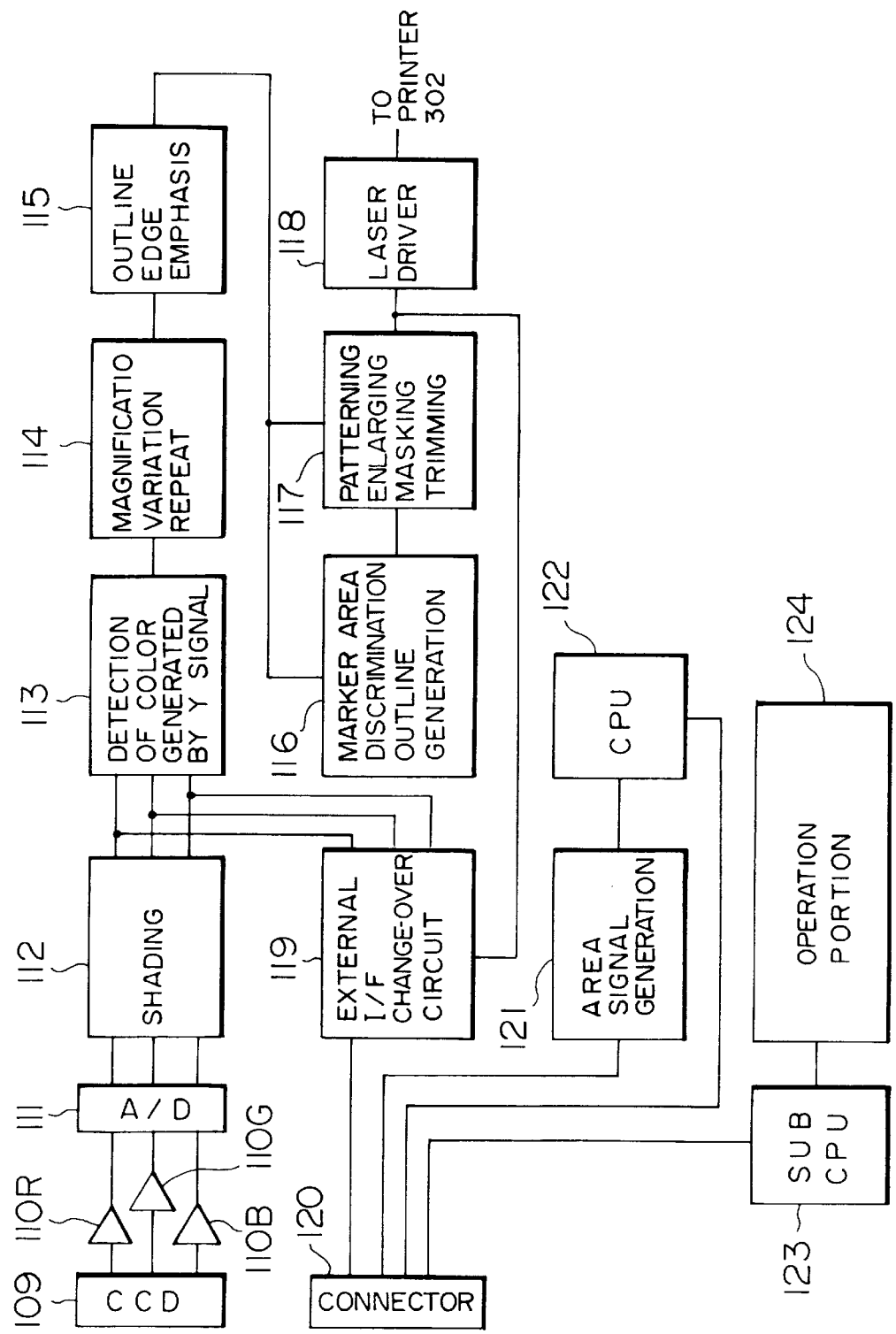
FIG. 33 is a block diagram of an image processing portion disposed in a reader portion 301.

FIG. 33 is a block diagram, which illustrates the reader 301. Image information supplied to the CCD 109 is photoelectrically converted into an electric signal. Color information supplied from the CCD 109 is amplified by amplifiers 110R, 110G and 110B to coincide with the level of the signal supplied to an A/D converter 111. An output signal from the A/D converter 111 is supplied to a shading circuit 112 in which the irregular light distribution of the lamp 103 and the non-uniform sensitivity of the CCD are corrected. A signal transmitted from the shading circuit 112 is supplied to a Y-signal color detection circuit 113 and an external I/F change-over circuit 119.

The Y-signal generation and color detection circuit 113 calculates the signal supplied from the shading circuit 112 so that a Y-signal is obtained using the following formula:

$$Y = 0.3R + 0.6G + 0.1B$$

Then, separation of the R, G and B signals into seven colors is performed and signals corresponding to the seven colors are transmitted. An output signal from the Y-signal generation and color detection circuit 113 is supplied to a magnification-variation and repeat circuit 114. The sub-scanning directional magnification variation is performed in accordance with the scanning speed of the scanner unit 104 and the main scanning directional magnification variation is performed by the magnification-variation circuit 114. Furthermore, a plurality of the same images can be output by the repeat circuit 114. An outline and edge exaggerating circuit 115 exaggerates the high frequency component of the signal supplied from the magnification-variation and repeat circuit 114 so that edge exaggeration and outline information is obtained. A signal supplied from the outline and edge exaggerating circuit 115 is supplied to a marker area discrimination and outline generating circuit 116 and a patterning, enlarging, masking and triming circuit 117.

The marker area discrimination and outline generating circuit 116 reads a portion of the original document written with a marker pen of an instructed color so as to generate the outline information of the marker. Then, the ensuing patterning, enlarging, masking and triming circuit 117 performs enlarging, masking and triming in accordance with the aforesaid outline information. Furthermore, a color detection signal transmitted from the Y-signal generation and color detection circuit 113 is used to perform patterning.

An output signal transmitted from the patterning, enlarging, masking and trimming circuit 117 is supplied to a laser driver circuit 118 so that the signal, which has been subjected to a variety of processes, is converted into a signal for driving the laser beam emitter. A signal transmitted from the laser driver is supplied to the printer 302 so that a visible image is formed.

The external I/F change-over circuit 119 for establishing I/F with an external device will now be described. The external I/F change-over circuit image information is supplied from the patterning, enlarging, masking and triming circuit 117 to a connector 120 in a case where image information is transmitted from the reader 301 to the external device 303. Where image information supplied from the external device 303 is received by the reader 301, the external change-over circuit 119 supplies image information supplied from the connector 120 to the Y-signal generation and color detection circuit 113.

The aforesaid image processing operations are performed in accordance with an instruction issued from the CPU 122. Furthermore, an area generation circuit 121 generates a variety of timing signals required to perform the aforesaid image processing operations in accordance with the value set by the CPU 122. In addition, communication with the external device 303 is performed by using the communication function including the CPU 122. The SUB CPU 123 controls the operation portion 124 and communicates with the external device 303 by using the communication function including the SUB CPU 123.

Then, the printer 302 will now be described with reference to FIG. 32. A signal supplied to the printer 302 is converted into an optical signal by the exposure control portion 201 so that the photosensitive member 202 is irradiated with light in accordance with the image signal. A latent image formed on the photosensitive member 202 by the irradiation light is developed by the developer 203. While making coincidence with the timing of the aforesaid latent image, the transference paper sheet is conveyed by the transference paper stacking portion 204 or 205, so that the aforesaid developed image is transferred in the transference portion 206. The transferred image is fixed to the transference paper in the fixing portion 207 before it is discharged by the discharge portion 208. The transference paper, discharged from the discharge portion 208, is discharged to each bin when the sorting function is actuated in the sorter 220, while the same is discharged to the uppermost bin when the sorting function is not actuated.

A method of recording images, which have been sequentially read, on the two sides of one transference paper sheet will now be described. The transference paper, fixed in the fixed portion 207, is temporarily conveyed to the discharge portion 208, and then the direction of the paper sheet is reversed before it is conveyed to the re-supply portion 210 via a conveyance direction change-over member 209. When the next original document is prepared, the image of the original document is read similarly to the aforesaid process and the transference paper is supplied from the re-supply portion 210. Therefore, the images of the two original document sheets are recorded on both the upper and the reverse sides of one transference paper sheet.

The external device 303 is connected to the reader 301 by means of a cable so that the signal control and function controls are performed by the core portion 310, which is included in the external device 303. The external device 303 includes a facsimile portion 304 for transmitting/receiving facsimile data, a file portion 305 for converting information about each original document into an electric signal and storing the electric signal, a formatter portion 308 for developing code information supplied from the computer 311 into image information, a computer interface portion 307 for establishing an interface with the computer 311, an image memory portion 309 for storing information supplied from the reader 301 as well as temporarily storing information supplied from the computer 311, and a core portion 310 for controlling each function.

Each of the functions of the core portion 310 will now be described in detail.

Figure 34:
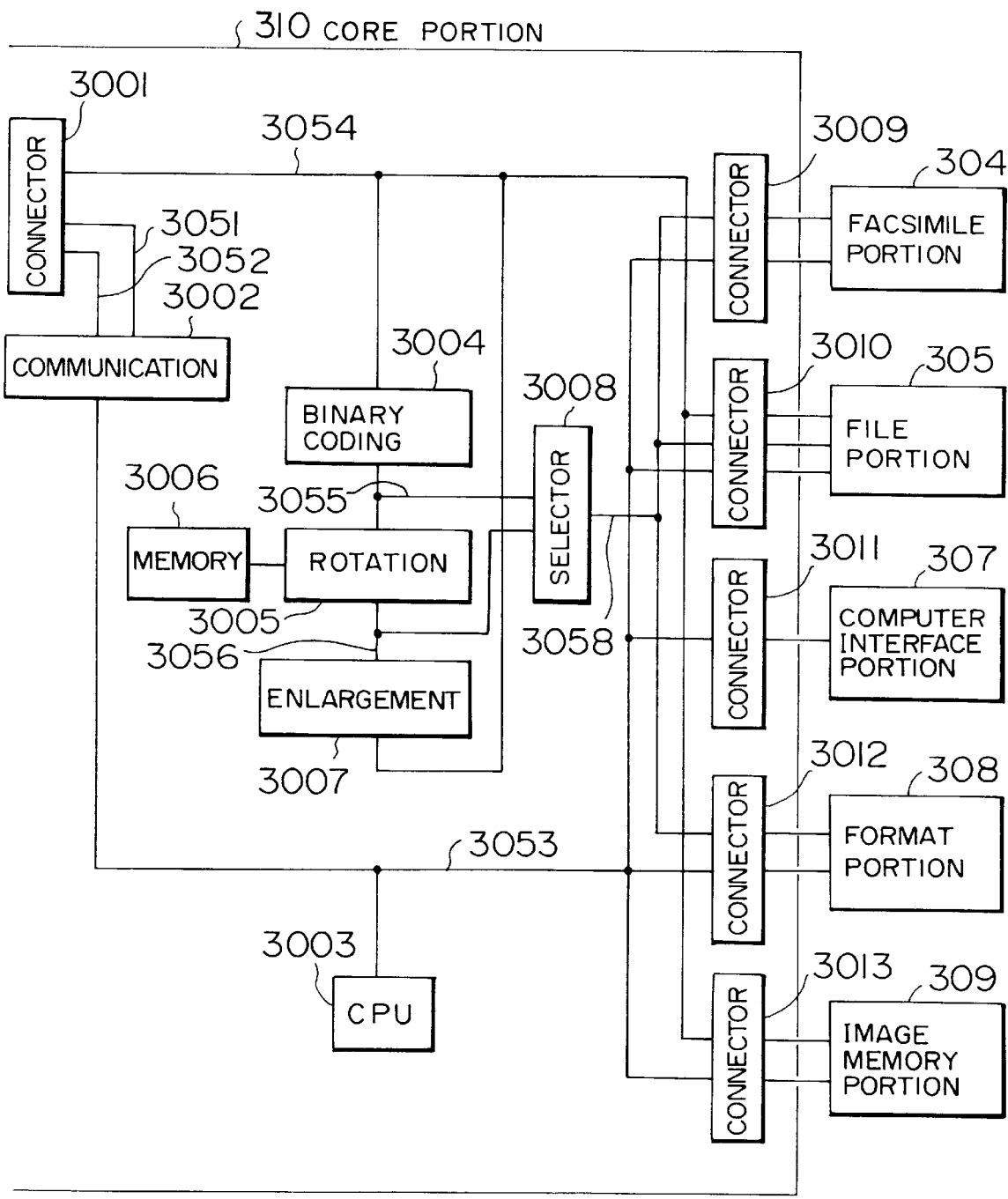
FIG. 34 is a block diagram of a core portion 310.

The core portion 310 will now be described with reference to FIG. 34. A connector 3001 of the core portion 310 is connected to the connector 120 of the reader 301 by means of a cable.

The connector 3001 includes three types of signals, a signal 3054, which is an 8-bit multi-value video signal as well as a video control signal. A signal 3051 performs communication with the CPU 122 included in the reader 301. A signal 3052 performs communication with the SUB CPU 123 included in the reader 301. Signals 3052 and 3053 are subjected to a communication protocol process in a communication IC 3002 so as to transmit communication information to the CPU 3003 via a CPU bus 3053.

The signal 3054 is a bi-directional signal line capable of causing the core portion 310 to receive information supplied from the reader 301 as well as transmitting information supplied from the core portion 310 to the reader 301. The signal 3054 is connected to a binary coding circuit 3004, a connector 3010, and a connector 3013. The connector 3010 is connected to the file portion 305, while the connector 3013 is connected to the image memory portion 309.

The binary coding circuit 3004 has a function of converting the 8-bit multi-value signal of the signal 3054 into a binary signal. The binary coding circuit 3004 has a simple binary coding function for binary-coding the multi-value signal 3054 at a fixed slice level, a binary function having a variable slice level so arranged that the slice level is varied in accordance with the values of pixels surrounding the subject pixel, and a binary coding function adapted to the error diffusion method. An output signal from the binary coding circuit 3004 is supplied to a rotation circuit 3005 and a selector 3008.

The rotation circuit 3005 acts together with a memory 3006 in such a manner that information transmitted from the reader 301 is converted into a binary signal by the binary-coding circuit 3004 via the connector 3001 and then information supplied from the reader 301 is stored in the memory 3006 under the control of the rotation circuit 3005. Then, the rotation circuit 3005 reads information from the memory 3006 while rotating it in accordance with an instruction issued from the CPU 3003. The output signal 3056 transmitted from the rotation circuit 3005 is supplied to an enlargement circuit 3007.

The enlargement circuit 3007 first converts a binary signal of the signal 3056 into a multi-value signal. When the signal 3056 is 0, the signal is converted into 00hex. When the signal 3056 is 1, the signal is converted into FFhex. The enlargement circuit 3007 is able to individually set the enlargement magnification in the direction X and Y in accordance with an instruction issued from the CPU 3003. The enlargement method uses a primary linear interpolation method. The output signal 3054 from the enlargement circuit 3007 is supplied to the connector 3010 or the connector 3013 in accordance with an instruction issued from the CPU 3003.

The output signal 3055 from the binary-coding circuit 3004 and the output signal 3056 from the rotation circuit 3005 are supplied to a selector 3008 so as to be selected in accordance with an instruction issued from the CPU 3003. An output signal 3058 from the selector 3008 is connected to the connector 3009, the connector 3010 and the connector 3012.

A CPU bus 3053 is connected to the CPU 3003, the communication IC 3002, the connectors 3009, 3010, 3011, 3012, and 3013. The CPU 3003 performs communication with the reader 301 via the communication IC 3002. The CPU 3003 communicates with the facsimile portion 304 via the connector 3009. Similarly, the CPU 3003 communicates with the file portion 305 via the connector 3010, with the computer interface portion 307 via the connector 3011, with the formatter portion 308 via the connector 3012, and with the image memory portion 309 via the connector 3013.

The flow of the signal from the core portion to each portion will now be described.

First, a case where the core portion 310 transmits information to the facsimile portion 304 will now be described. The CPU 3003 performs communication with the CPU 122 of the reader 301 via the communication IC 3002 so as to issue an original document scan command. When the scanner unit 104 scans the original document in accordance with the aforesaid command, the reader 301 transmits image information to the connector 120. Since the reader 301 and the external device 303 are connected to each other by means of a cable, information supplied from the reader 301 is supplied to the connector 3001 of the core portion 310. Image information supplied to the connector 3001 is supplied to the binary-coding circuit 3004 via the multi-value 8-bit signal line 3054. The binary circuit 3004 converts the 8-bit multi-value signal on the signal line 3054 into a binary signal before it is transmitted to the signal line 3055. The binary signal on the signal line 3055 is supplied to the selector 3008 or the rotation circuit 3005. The output signal from the rotation circuit 3005 is supplied to the selector 3008 via the signal line 3056. The selector 3008 selects the signal on the signal line 3055 or 3056. The aforesaid signal selection is determined by the communication performed by the CPU 3003 with the facsimile portion 304 via the data bus 3053. The binary signal on the signal line 3058 selected by the selector 3008 is supplied to the facsimile portion 304 via the connector 3009.

A case where the core portion 310 receives information from the facsimile portion 304 will now be described. The binary image signal supplied from the facsimile portion 304 is transmitted to a signal line 3058 via the connector 3009. The selector 3008 transmits the supplied signal to the signal line 3055 or the signal line 3056 in accordance with an instruction issued from the CPU 3003. If the signal line 3055 is selected, the binary signal supplied from the facsimile portion 304 is subjected to a rotation process in the rotation circuit 3005 before it is supplied to the ensuing enlargement circuit 3007. If the signal line 3056 is selected, the binary signal is not subjected to the rotation process but is directly supplied to the enlargement circuit 3007. The enlargement circuit 3007 converts the binary signal into an 8-bit multi-value signal and then it is subjected to an enlargement process by the primary linear interpolating method. The 8-bit multi-value signal supplied from the enlargement circuit 3007 is transmitted to the reader 301 via the connector 3001. The reader 301 causes the aforesaid signal to be received by the external I/F change-over circuit 119 via the connector 120. The external I/F change-over circuit 119 causes the signal transmitted from the facsimile portion 304 to be supplied to the Y-signal generation and color detection circuit 113. The output signal transmitted from the Y-signal generation and color detection circuit 113 is subjected, as described before, then it is transmitted to the printer 302, so that an image is formed on the surface of the output paper sheet.

A case where information is transmitted from the core portion 310 to the file portion 305 will now be described. The CPU 3003 performs communication with the CPU 122 of the reader 301 via the communication IC 3002 so as to issue an original scan command. When the scanner unit 104 scans the original document in accordance with the aforesaid command, the reader 301 transmits image information to the connector 120. Since the reader 301 and the external device 303 are connected to each other by means of a cable, information supplied from the reader 301 is supplied to the connector 3001 of the core portion 310. Image information supplied to the connector 3001 passes through the multi-value 8-bit signal line 3054 before it is received by the connector 3010 or the binary-coding circuit 3004. In a case where the file portion 305 compresses and files the 8-bit multi-value information, information on the signal line 3054 is transmitted to the file portion 305 via the connector 3010. In a case where the file portion 305 compresses and files the binary information, the binary coding operation is performed by the binary-coding circuit 3004. The binary-coding process and the rotation process are performed similarly to the aforesaid case of the facsimile operation. The binary signal supplied from the selector 3008 is transmitted to the file portion 305 via the connector 3010.

A case where the core portion 310 receives information from the file portion 305 will now be described. Image information supplied from the file portion 305 is transmitted to the multi-valve 8-bit signal line 3054 via the connector 3010. Where the signal is a binary signal, it is transmitted to the signal line 3058. The signal on the signal line 3054 is transmitted to the reader 301 via the connector 3001. The signal 3058 is supplied to the selector 3008. The selector 3008 transmits the signal on the signal line 3058 to the signal line 3055 or the signal line 3056 in accordance with an instruction issued from the CPU 3003. In a case where the signal line 3055 is selected, the signal is subjected to the rotation process before it is supplied to the ensuing enlargement circuit 3007. In a case where the signal line 3056 is selected, the signal is not subjected to the rotation process but it is directly supplied to the enlargement circuit 3007. The 8-bit multi-value signal supplied from the enlargement circuit 3007 is transmitted to the reader 301 via the connector 3001. Information transmitted from the file portion to the reader 301 is transmitted to the printer 302 similarly to the aforesaid case of the facsimile operation, so that an image is formed on the output paper sheet.

The computer interface portion 307 establishes an interface with the computer 311 connected to the external device 303. As the computer interface, SCSI, RS232C and Centronics interfaces are provided. The computer interface portion 307 has the aforesaid three types of interfaces and information from each interface is transmitted to the CPU 3003 via the connector 3011 and the data bus 3053. The CPU 3003 performs a variety of control operations in accordance with the supplied contents.

The formatter portion 308 has a function of developing command data such as a document file transmitted from the aforesaid computer interface portion 307 into image data. When the CPU 3003 discriminates that data transmitted through the computer interface portion 307 via the data bus 3053 relates to the formatter portion, the CPU 3003 transmits it to the formatter portion 308 via the connector 3012. The formatter portion 308 develops the transferred data in the memory as a visible image. Then, a process of forming an image of information, supplied from the formatter portion 308, on the output paper sheet. Image information supplied from the formatter portion 308 is transmitted to the signal line 3058 as a binary signal via the connector 3012. The signal 3058 is supplied to the selector 3008. The selector 3008 transmits the signal on the signal line 3058 to the signal line 3055 or the signal line 3056 in accordance with an instruction issued from the CPU 3003. In a case where the signal line 3055 is selected, the signal is subjected to the rotation process before it is supplied to the ensuing enlargement circuit 3007. In a case where the signal line 3056 is selected, it is not subjected to the rotation process but it is directly supplied to the enlargement circuit 3007. The 8-bit multi-value signal supplied from the enlargement circuit 3007 is transmitted to the reader 301 via the connector 3001. Information supplied from the formatter portion 308 to the reader 301 is transmitted to the printer 302 similarly to the aforesaid case of the facsimile operation, so that an image is formed on the output paper sheet.

A case where the core portion 310 transmits information to the image memory portion 309 will now be described. The CPU 3003 performs communication with the CPU 122 of the reader 301 via the communication IC 3002 so that it issues an original document scan command. In accordance with the aforesaid command, the scanner unit 104 scans the original document, and it transmits image information to the connector 120. Information transmitted from the reader 301 is supplied to the connector 3001 of the core portion 310. Image information supplied to the connector 3001 is transmitted to the image memory portion 309 via the multi-value 8-bit signal line 3054 and the connector 3013. Image information stored in the image memory portion 309 is supplied to the CPU 3003 via the data bus of the connector 3013. The CPU 3003 transfers data supplied from the image memory portion 309 to the aforesaid computer interface portion 307. The computer interface portion 307 transfers data to the computer through a required interface selected from the aforesaid three types of interfaces (SCSI, RS232C and the Centronics interfaces).

A case where the core portion 310 receives information supplied from the image memory portion 309 will now be described. First, image information is transmitted from the computer to the core portion 310 via the computer interface portion 307. If the CPU 3003 of the core portion 310 discriminates that data supplied from the computer interface 307 via the data bus 3053 is data relating to the image memory portion 309, it transfers data to the image memory portion 309 via the connector 3013. Then, the image memory portion 309 transfers the 8-bit multi-value signal to the signal line 3054 via the connector 3013. The signal on the signal line 3054 is transmitted to the reader 301 via the connector 3001. Information transmitted from the image memory portion 309 to the reader 301 is transmitted to the printer 302 similarly to the aforesaid facsimile operation, so that an image is formed on the output paper sheet.

As described above, a variety of information items are supplied to the core portion 310. A method of transmitting a plurality of the information items to the printer 302 will now be described.

The core portion 310 receives data received by the facsimile portion 304 via the connector 3009, data supplied from the external storage device of the file portion 305 via the connector 3010, code information supplied from the computer 311 connected to the computer interface portion 307 via the connector 3011, data supplied from the formatter portion 308 develops data into image information via the connector 3012, and data is supplied from the image memory portion 309 via the connector 3013. In a case where a plurality of the aforesaid data items are substantially simultaneously supplied, the core portion 310 controls the output of image information to the printer 302 in accordance with three types of modes.

The first mode is a mode in which data is transmitted in accordance with the priority order of each portion. When image information supplied from the reader portion 301 is directly formed by the printer 302, that is, when copying of the original document has priority, the core portion 310 temporarily causes data supplied from the facsimile portion 304, the file portion 305, the formatter portion 308 and the image memory portion 309 to wait for a next process. When the original document has been copied, the core portion 310 receives data from each portion in accordance with the priority order.

The second mode is a mode in which data is transmitted in accordance with the inputting order regardless of the original-document copying operation.

The third mode is a mode in which output bins of the sorter 220, corresponding to the output images, are previously instructed and the order of the transmissions to the printer 302 is determined while taking the time required for the output bit to move into consideration. In a case where the first bin of the sorter 220 is arranged to receive the copy of the original document, the second bin is arranged to receive the printed output from the facsimile portion 304, the third bin is arranged to receive the printed output from the file portion 305, the fourth bin is arranged to receive the printed output from the formatter portion 308 and the fifth bin is arranged to receive the printed output from the image memory portion 309, and as well as the transference paper is arranged to be discharged to the second bin of the sorter 220, the CPU 3003 calculates a time required for the sorter 220 to move from the second bin to the fourth bin if the core portion 310 has received data from the formatter portion 308 prior to data supplied from the facsimile portion 304. If the calculated time required for the sorter 220 to move to the fourth bin is shorter than a time required to receive data from the facsimile portion 304, data supplied from the formatter portion 308 is transmitted to the printer 302 and the discharge bin of the sorter 220 is shifted. In a case where the time taken for the bin of the sorter 220 takes a time longer than the time required to receive data from the facsimile portion 304, the bin of the sorter is not moved and data supplied from the facsimile portion 304 is transmitted to the printer 302 prior to the transmission of data supplied from the formatter portion 308 to the printer 302. Then, the discharge bin of the sorter 220 is shifted.

The aforesaid three types of the modes can be set by an operation portion (omitted from illustration) of the reader 301. Also the output bins of the sorter 220 corresponding to the various outputs can be set by the operation portion.

Figure 35:
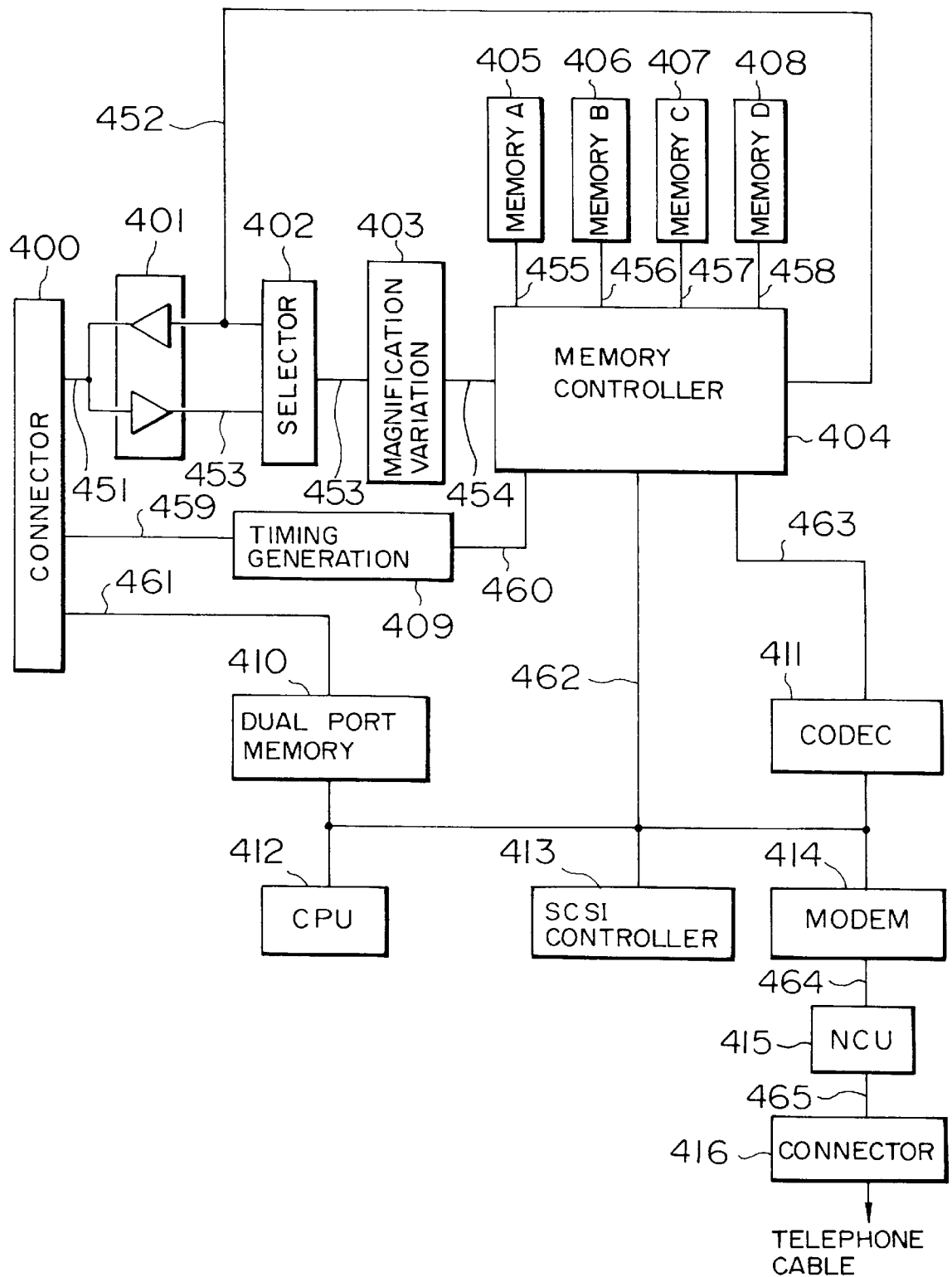
FIG. 35 is a block diagram of a facsimile portion 304.

The facsimile portion 304 will now be described with reference to FIG. 35.

The facsimile portion 304 is connected to the core portion 310 by means of a connector 400 so that the signals are transmitted/received. A binary image signal is transmitted on the signal line 451 in the bi-direction so as to be connected to a buffer 401. The buffer 401 divides the signal on the signal line 451 into an output signal from the facsimile portion 304 and an input signal 453 to be supplied to the facsimile portion 304. The signal line 452 and the signal line 453 are connected to a selector 402. The selector 402 selects the input from the signal line in accordance with an instruction issued from the CPU 412. In a case where binary information supplied from the core portion 310 is stored in any of memories A405 to D408, the selector 402 selects the signal line 453. In a case where data is transferred from a memory (any one of memories A405 to D408) to the other memory, the selector 402 selects the signal line 452. A signal on the signal line 453 of the selector 402 is supplied to a magnification-varying circuit 403 so as to be subjected to the magnification-varying process. In a case where an image signal read by the reader 301 at a resolution of 400 dpi is facsimile-transmitted, the magnification-varying circuit 403 converts the resolution to coincide with the receiving side facsimile device. An output signal from the magnification-varying circuit 403 is supplied to a memory controller 404 via a signal line 454 so as to be stored by any one of the memory A405, B406, C407 or D408 under control of the memory controller 404. The memory controller 404 has four functions comprising a mode in which data is transferred between the memory A405, B406, C407 and D408 and the CPU bus 462 in accordance with an instruction issued from the CPU 412, a mode in which data is transferred between memories A405 to D408 and a CODEC bus 463 of a CODEC 411, having encoding and decoding functions, a mode in which binary video input data on the signal line 454 is stored in any one of the memories A405 to D408 under the control of a timing generation circuit 409, and a mode in which the stored contents are read from any one of the memories A405 to D408 so as to be transmitted onto the signal line 452. Each of the memories A405, B406, C407 and D408 has a capacity of 2 Mbytes and stores an image corresponding to A4 at a resolution of 400 dpi. The timing generation circuit 409 is connected to the connector 400 by a signal line 459 and is started in response to a control signal (HSYNC, HEN, VSYNC, VEN) supplied from the core portion 310 so that signals for realizing the following two functions are generated. The first function is a function with which an image signal supplied from the core portion 310 is stored by any one of the memories A405 to D408. The second function is a function with which an image signal is read from any one of the memories A405 to D408 so as to transmit it onto the signal line 452. The CPU 1003 of the core portion 310 is connected to a dual port memory 410 via a signal line 461 and a CPU 412 of the facsimile portion 4 is connected to the same via a signal line 462. Each CPU transfers a command via the dual port memory 410. An SCSI controller 413 establishes an interface with a hard disk connected to the facsimile portion 304 shown in FIG. 31. The hard disk stores data for use at the facsimile transmission or data for use at the time of the facsimile receipt. The CODEC 411 reads image information stored by any one of the memories A405 to D408 and it performs encoding by a desired method selected from a group consisting of MH, MR and MMR methods. Then, the CODEC 411 causes the encoded image information to be stored by any one of the memories A405 to D408 as encoding information. Furthermore, the CODEC 411 reads encoding information stored in any one of the memories A405 to D408 and decodes it by a desired method selected from a group consisting of the MH, MR and the MMR methods before it is stored in any one of the memories A405 to D408 as decoding information, that is, image information. A MODEM 414 has a function of modulating encoded information supplied from the hard disk connected to the CODEC 411 or the SCSI controller 413 so as to transmit it to a telephone line. The MODEM 414 also has a function of converting information supplied from an NCU415 into decoded information so as to transfer encoding information to the hard disk connected to the CODEC 411 or the SCSI controller 413. The NCU 415 transmits/receives information to and from an exchanger directly connected to the telephone line and located in a telephone station by a predetermined procedure.

An example of the facsimile transmission will now be described. A binary image signal supplied from the reader 301 is received through the connector 400 so as to be supplied to the buffer 401 via the signal line 451. The buffer 401 transmits the signal 451 to the signal line 453 in accordance with the setting made by the CPU 412. A signal on the signal line 453 is received by the selector 402 before it reaches the magnification-varying circuit 403. The magnification-varying circuit 403 converts a resolution of 400 dpi of the reader 301 into a resolution of the facsimile transmission. An output signal from the magnification-varying circuit 403 is stored by the memory A405 by the memory controller 404. The timing at which it is stored in the memory A405 is generated by the timing generating circuit 409 in response to a timing signal 459 supplied from the reader 301. The CPU 412 connects the memories A405 and B406 of the memory controller 404 to the bus line 463 of the CODEC 411. The CODEC 411 reads image information from the memory A405 and it encodes image information so as to write encoding information on the memory B406. When the CODEC 411 encodes A4-size image information, the CPU 412 connects the memory B406 of the memory controller 404 to the CPU bus 462. The CPU 412 sequentially reads encoded information from the memory B406 so as to transfer encoded information to the MODEM 414. The MODEM 414 modulates encoded information so as to transmit it onto the telephone line via the NCU 415.

An example of the facsimile receipt will now be described. Information transmitted from the telephone line is supplied to the NCU 415. The telephone line is connected to the NCU 415 by a predetermined procedure. Information transmitted from the NCU 415 is received by the MODEM 414 where it is demodulated. The CPU 412 causes information supplied from the MODEM 414 to be stored by the memory C407 via the CPU bus 462. When information for one frame is stored by the memory C407, the CPU 412 controls the memory controller 404 so that the data line 457 of the memory C407 is connected to the signal line 463 of the CODEC 411. The CODEC 411 sequentially reads encoding information stored in the memory C407 so as to store it in the memory D408 as decoding information, that is, image information. The CPU 412 performs communication with the CPU 3003 of the core portion 310 via the dual port memory 410 so as to perform setting so as to print out an image supplied from the memory D408 to the printer 302 via the core portion 310. After setting has been completed, the CPU 412 starts the timing generating circuit 409 so that a predetermined timing signal is transmitted from the signal line 460 to the memory controller 404. The memory controller 404 reads out image information from the memory D408 in synchronization with a signal transmitted from the timing generating circuit 409 so as to transmit it to the signal line 452. The signal on signal line 452 is supplied to the buffer 401 before it is transmitted to the connector 400. Since the operations to be performed to the transmission from the connector 400 to the printer 303 have been described in the description made about the core portion 310, its description is omitted here.

Figure 36:
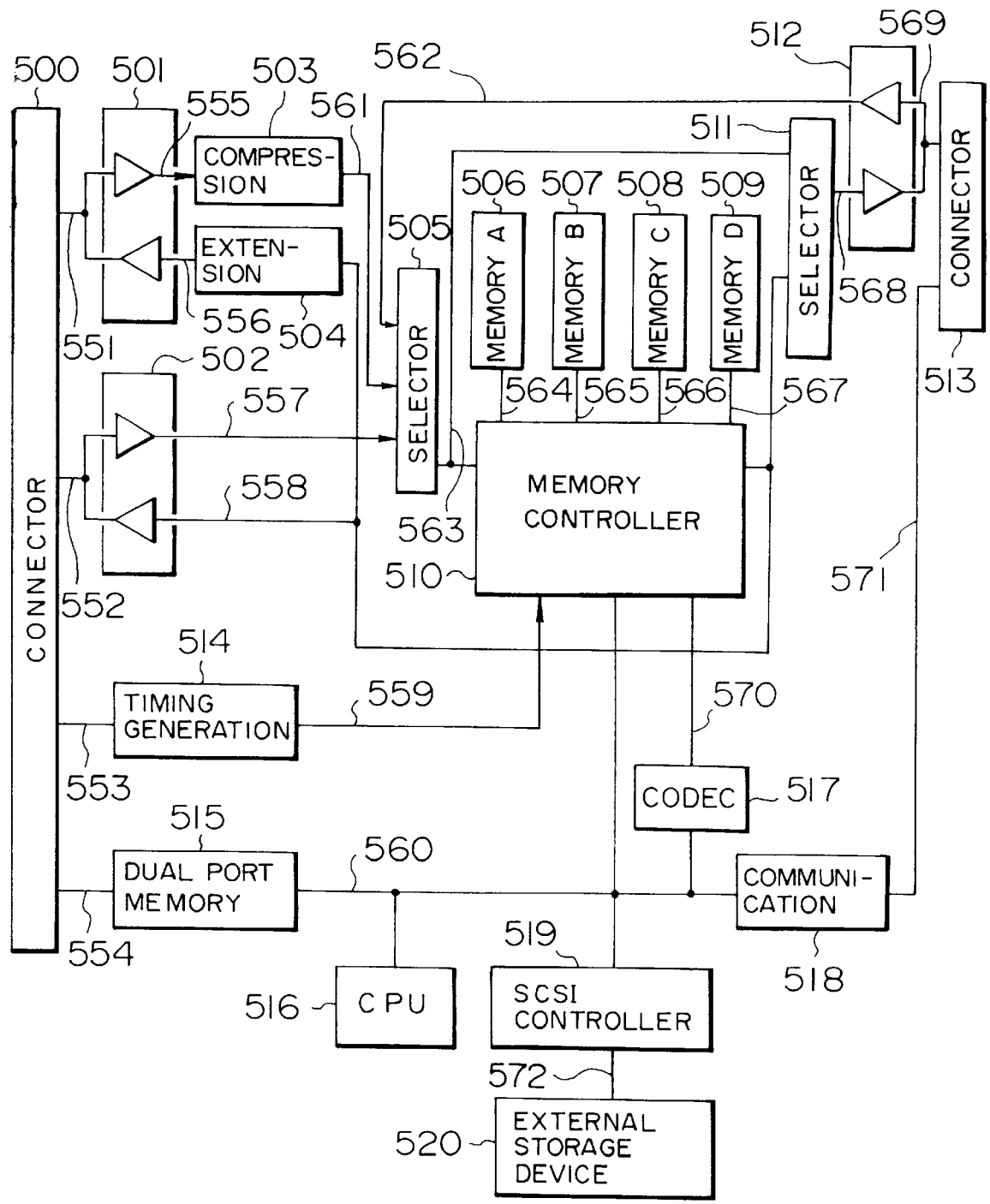
FIG. 36 is a block diagram of a file portion 305.

The file portion 305 will now be described with reference to FIG. 36. The file portion 305 is connected to the core portion 310 via the connector 500 so as to supply/receive various signals. An 8-bit multi-value image signal passes through the signal line 551 in a bidirection so as to be supplied to the buffer 501. The buffer 501 divides the signal on the signal line 551 into a multi-value output signal line 556 extending from the file portion 305 and the multi-value input signal line 555 to be connected to the file portion 305. The multi-value input signal line 555 is connected to the compression circuit 503 in which the multi-value image information is converted into binary compressed information before it is transmitted to the selector 505. The signal line 552 is a line through which a bidirectional binary image signal passes, and is connected to the buffer 502. The buffer 502 divides the bidirectional binary signal on the signal 552 into the signal line 558 extending from the file portion 305 and the signal line 557 connected to the file portion 305. The signal line 557 is connected to the selector 505. The selector 505 selects an output signal line from a group consisting of the output signal line 561, which is connected to the compression circuit 503, the output signal line 557, which is connected to the buffer 502 and the output signal line 562, which is connected to the buffer 512 so as to supply a signal to the memory controller 510. The output signal line 563 is connected to the selector 511. In a case where compressed information obtained by compressing 8-bit multi-value information supplied from the core portion 310 is stored in any one of the memories A506 to D509, the selector 505 selects the signal line 561. In a case where binary information is stored in the memory, the selector 505 selects the signal line 557. In a case where information supplied from the man-machine interface portion 306, shown in FIG. 31, is stored in the memory, the selector 505 selects the signal line 562. An output signal from the selector 505 is stored by any one of the memories A506, B507, C508 and D509 under the control of the memory controller 510. The memory controller 510 has four functions consisting of a mode in which data is transmitted/received between any one of the memories A506, B507, C508 and D509 and the CPU bus 560 in accordance with an instruction issued from the CPU 516, a mode in which data is transmitted/received between the CODEC bus 570 of the CODEC 517 for performing the encoding and decoding operations, a mode in which a signal on the signal line 563 is stored in any one of the memories A506, B507, C508 and D509 under the control of the timing generating circuit 514, a mode in which the contents memorized by any one of the memories A506, B507, C508 and D509 are read out so as to be transmitted to the signal line 558. Each of the memories A506, B507, C508 and D509 has a capacity of 2 Mbytes and stores an A4-size image at a resolution of 400 dpi. The timing generating circuit 514 is connected to the connector 500 via the signal line 553 and is started in response to a control signal (HSYNC, HEN, VSYNC and VEN) transmitted from the core portion 310 so as to generate signals for realizing the following two functions. The first function is a function with which information supplied from the core portion 310 is stored in any one of the memories A506, B507, C508 and D509, and the second function is a function with which information is read from any one of the memories A506, B507, C508 and D509 so as to be transmitted to the signal line 558. The connector 513 transmits/receives signal to and from the man-machine interface portion 306 shown in FIG. 31. Image information is supplied to the buffer 512, while commands are supplied to the communication circuit 518. The signal on the signal line 569 is a bidirectional image signal. The buffer 512 transmits image information to the signal line 562 when it receives image information supplied from the man-machine interface 306. In a case where image information is transmitted from the file portion 305 to the man-machine interface portion 306, information on the signal line 568 is transmitted via the buffer 512 and the connector 513. The CPU 3003 of the core portion 310 is connected to the dual port memory 515 via the signal line 554, while the CPU 516 of the file portion 305 is connected to the same via the signal line 560. Each CPU transmits/receives commands via the aforesaid dual port memory 515. The SCSI controller 519 establishes an interface with the external storage device 520 connected to the file portion 305 shown in FIG. 31. The external storage device 520 is specifically constituted by an optomagnetic disk or the like and acts to store data such as image information. The CODEC 517 reads image information stored by any one of the memories A506, B507, C508 and D509 so as to encode it by a desired method selected from a group consisting of the MH, MR and the MMR methods before it is stored by any one of the memories A506, B507, C508 and D509 as encoded information. Furthermore, encoded information stored by any one of the memories A506, B507, C508 and D509 is read before it is decoded by a desired method selected from a group consisting of the MH, MR and the MMR method. Then, it is stored by any one of the memories A506, B507, C508 and D509 as decoded information, that is, image information.

An example of an operation of storing file information in the external storage device 520 will now be described. An 8-bit multi-value image signal supplied from the reader 301 is supplied through the connector 500 before it is supplied to the buffer 510 via the signal line 551. The buffer 501 transmits the signal 551 to the signal line 555 in accordance with a setting made by the CPU 516. The signal of the signal line 555 is supplied to the compression circuit 503 in which it is converted into binary compressed information 561. The compressed information 561 is supplied to the selector 505 before it reaches the memory controller 510. The signal of the signal line 563 is supplied to the memory controller 510 and is supplied to the man-machine interface portion 306 via the selector 511, the buffer 512 and the connector 513. The memory controller 510 causes the timing generating circuit 559 to generate the timing signal 559 in response to the signal 553, transmitted from the core portion 310. The memory controller 510 stores the compressed signal 563 in the memory A506 in response to the aforesaid signal. The CPU 516 connects the memory A506 and the memory B507 of the memory controller 510 to the bus line 570 of the CODEC 517. The CODEC 517 reads out compressed information from the memory A506 so as to encode it by the MR method before the CODEC 517 writes encoded information to the memory B507. When the CODEC 517 has completed the encoding operation, the CPU 516 connects the memory B507, of the memory controller 510, to the CPU bus 560. The CPU 516 sequentially reads encoded information from the memory B507 so as to transfer them to the SCSI controller 519. The SCSI controller 519 stores the encoded information 572 to the external storage device 520.

An example of taking information from the external storage device 520 so as to be transmitted to the printer 302 will now be described. When an instruction to retrieve/print information is supplied to the CPU 516 from the man-machine interface portion 306, the CPU 516 receives encoded information from the external storage device 520 via the SCSI controller 519, the encoded information being then transferred to the memory C508. The memory controller 510, at this time, connects the CPU bus 560 to the bus 566 of the memory C508 in accordance with an instruction issued from the CPU 516. When the transference of the encoded information to the memory C508 has been completed, the CPU 516 controls the memory controller 510 so that the memories C508 and D509 connect to the bus 570 of the CODEC 517. The CODEC 517 reads encoded information supplied from the memory C508 so as to sequentially decode them before the CODEC 517 transfers it to the memory D509. The CPU 516 performs communication with the CPU 3003 of the core portion 310 via the dual port memory 515, so as to set the factors required to print out an image by transferring data from the memory D509 to the printer 302 via the core portion 310. After the setting has been completed, the CPU 516 starts the timing generating circuit 514 so as to transmit a predetermined timing signal from the signal line 559 to the memory controller 510. The memory controller 510 reads out decoding information from the memory D509 in synchronization with a signal transmitted from the timing generating circuit 514 so as to transmit it to the signal line 558. The signal line 558 supplies it to an expansion circuit 504 in which the decoding information is expanded so as to be converted into image information. An output signal 556 from the expansion circuit 504 is supplied to the buffer 501 before it is transmitted to the connector 500 via the signal line 551. Since the operations to be performed to outputting from the connector 500 to the printer 303 have been described in the description about the core portion 310, their descriptions are omitted here.

Figure 37:
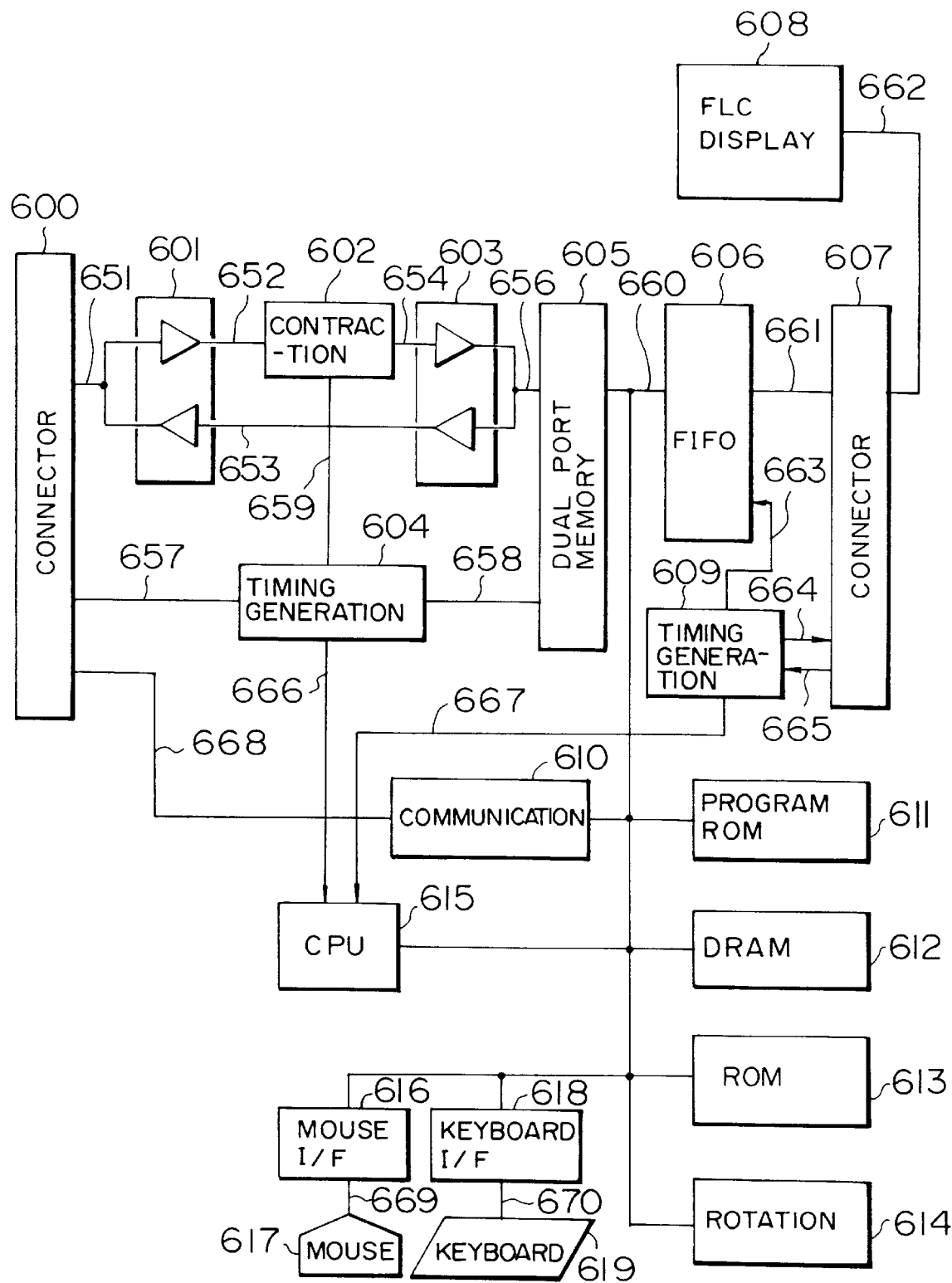
FIG. 37 is a block diagram of a man-machine interface portion 306.

The man-machine interface portion 306 will now be described with reference to FIG. 37. The description will now be made about a case where image information supplied from the file portion 305 is received and displayed. A connector 600 is connected to the connector 513 of the file portion 305. A CPU 615 performs communication with the CPU 516 of the file portion 305 by means of a communication circuit 610 via a CPU bus 660 so that an image input mode is set. A bidirectional image signal 651 supplied from the connector 600 and is separated into a one-directional signal by a buffer 601. A signal supplied from the file portion 305 is made to be a one-directional signal 652 by the buffer 601 before it is supplied to a contraction circuit 602. The contraction circuit 602 contracts the input image signal to coincide with the size of a display made on an FLC display (Ferroelectric Liquid Crystal Display) 608. An output signal from the contraction circuit 602 passes through a buffer 603 before it is supplied to a dual port memory 605. Writing to the dual port memory 605 is performed in response to a signal 658 supplied from a timing generating circuit 604. The timing generation circuit 604 is started in response to a timing signal 657 supplied from the file portion 305. When image information for one line has been written to the dual port memory 605, a signal 666 generated by the timing generating circuit 604 causes a DMA (Direct Memory Access) request to be issued to the CPU 615. The CPU 615 transmits image information to a DRAM (Dynamic Random Access Memory) 612 from the dual port memory 605 via the CPU bus 660 by means of a DMAC (Direct Memory Access Controller ) included therein. By repeating the aforesaid operation, image information for one frame is stored in the DRAM 612. The FLC display 608 is connected to the connector 607 by a cable 662 so as to cause an image request signal (hereinafter called "FHSYNC") 665 to be received by the timing generating circuit 609. The timing generating circuit 609 transmits a DMA request signal 667 to the CPU 615 when it receives the FHSYNC 665. The CPU 615 starts the DMAC, included therein, when the CPU 615 has received the DMA request signal 667 so as to DMA-transmit a line address and image information for one line to be displayed on the FLC display 608 to an FIFO 606 from the DRAM 612 via the CPU bus 660. Then, the timing generating circuit 609 transmits a timing signal 663 so as to read image information for one line from the FIFO 606, the image information being then transferred to the FLC display 608 via the connector 607. The FLC display 608 determines the image display position from the line address to be displayed, and it displays image information for one line on the FLC display 608. By repeating the aforesaid operation, image information for one frame is displayed on the entire surface of the FLC display 608.

An example of transferring image information in the man-machine interface portion 306 to the file portion 305 will now be described. The CPU 615 performs communication with the CPU 516 of the file portion 305 via the communication circuit 610 so as to set an image output mode. Image information in the man-machine interface portion 306 is stored in the DRAM 612 and therefore the CPU 615 transfers image information for one line from the DRAM 612 to the dual port memory 605 when it receives a DMA request signal 666 from the timing generating circuit 604. Then, the CPU 615 reads image information 656 from the dual port memory 605 in response to a reading timing signal 658 supplied from the timing generating circuit 604. An output signal 656 supplied from the dual port 605 causes an image signal 651 to be transmitted to the connector 600 via the buffers 603 and 601. Since the operations to be performed in the file portion 305 are similarly performed to those in the aforesaid case, their descriptions are omitted here.

A keyboard I/F 618 and a mouse I/F 616 perform communication with a keyboard 619 and a mouse 617 with which operational instructions are performed with respect to the man-machine interface portion 306.

Figure 38:
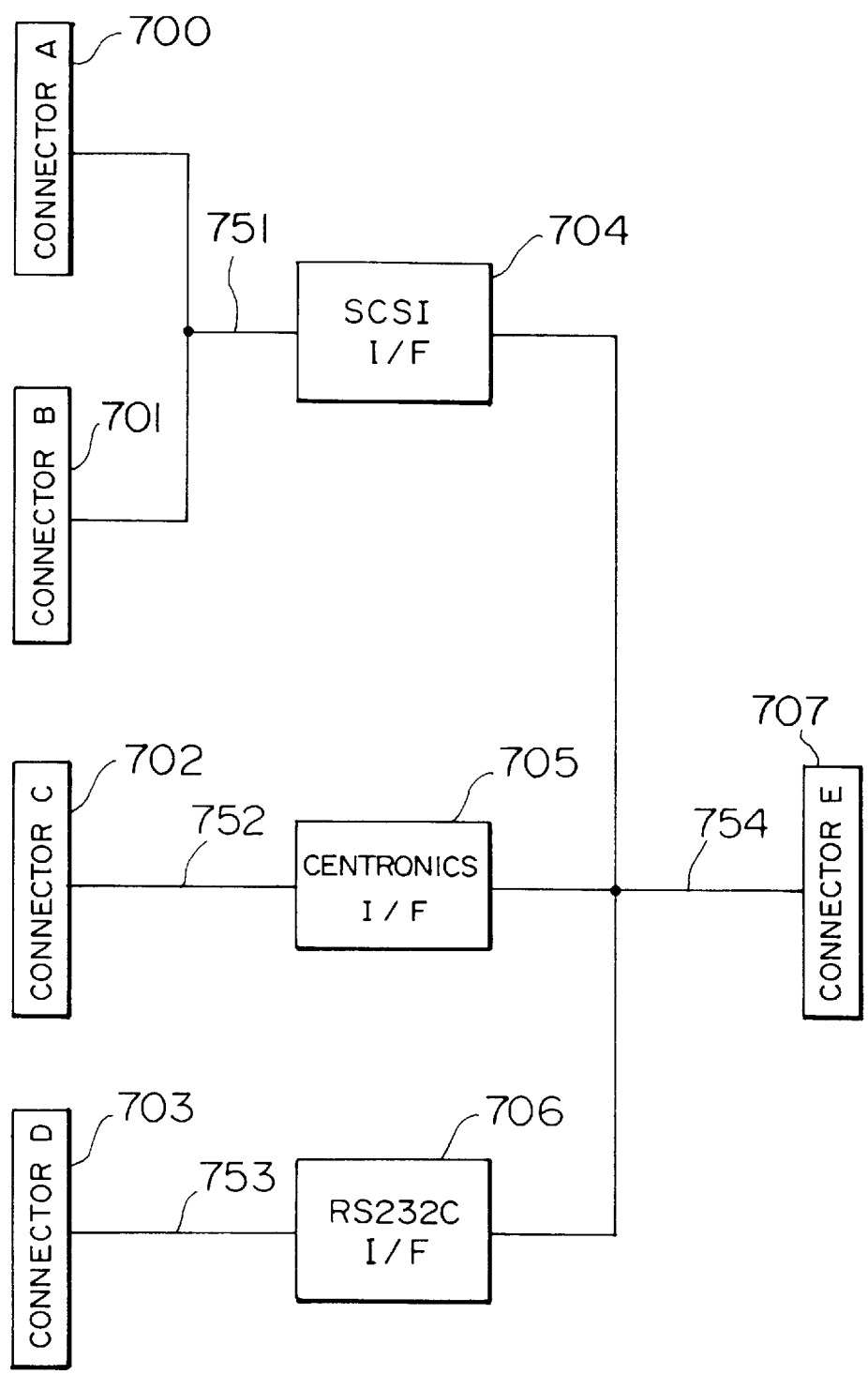
FIG. 38 is a block diagram of a computer interface portion 307.

The computer interface portion 307 will now be described with reference to FIG. 38. A connector A700 and a connector B701 are connectors for the SCSI interface. A connector C702 is a connector for the Centronics interface. A connector D703 is a connector for the RS232C interface. A connector E707 is a connector for establishing a connection with the core portion 310.

The SCSI interface has two connectors (the connectors A700 and B701) and it is used when a device having a plurality of SCSI interfaces is connected in such a manner that the connectors A700 and B701 are used to establish a cascade connection. When external device 303 and a computer are connected to each other, the connector A700 and the computer are connected to each other by means of a cable, a terminator is connected to the connector B701 or the connector B701 and the computer are connected to each other by means of a cable, and a terminator is connected to the connector A700. Information received through the connector A700 or B701 is supplied to an SCSI I/F 704 via a signal line 751. The SCSI I/F 704 performs a procedure in accordance with the protocol of the SCSI and then it transmits a signal to the connector E707 via a signal line 754. The connector E707 is connected to the CPU bus 3053 of the core portion 310. The CPU 3003 of the core portion 310 receives information from the SCSI I/F connectors (the connectors A700 and B701) supplied from the CPU 3003. In a case where data supplied from the CPU 3003, of the core portion 310, is transmitted to the SCSI connectors (the connectors A700 and B701), the procedure is arranged in the opposite manner.

The Centronics interface is connected to the connector C702 so that a signal is supplied to the Centronics I/F 705 via the signal line 752. The Centronics I/F 705 receives data in accordance with a predetermined protocol sequence so as to transmit a signal to the connector E707 via the signal line 754. The connector E707 is connected to the CPU bus 3053 of the core portion 310. The CPU 3003 of the core portion 310 receives information supplied from the CPU bus 3053 to the Centronics I/F connectors (the connectors C702).

The RS232C interface is connected to the connector D703 so that a signal is supplied to the RS232C I/F 706 via a signal line 753. The RS232C I/F 706 receives data in accordance with a predetermined protocol sequence so that a signal is transmitted to the connector E707 via a signal line 754. The connector E707 is connected to the CPU bus 3053 of the core portion 310. The CPU 3003 of the core portion 310 receives information supplied from the CPU bus 3053 to the RS232C I/F connector (the connector D703). In a case where data supplied from the CPU 3003 of the core portion 310 is transmitted to the RS232C I/F connector (the connector D703), the procedure is arranged in the opposite manner.

Figure 39:
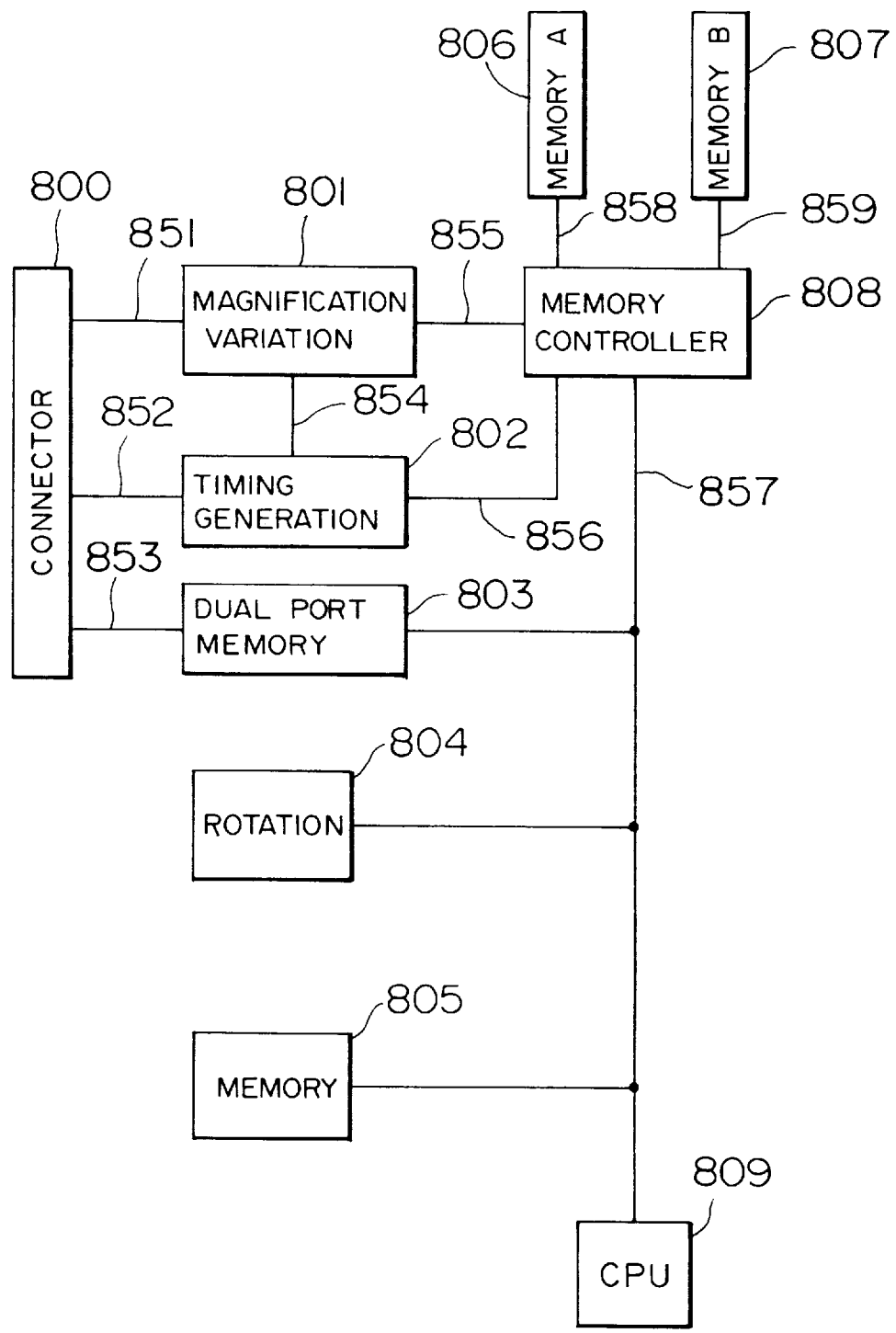
FIG. 39 is a block diagram of a formatter portion 308.

The formatter portion 308 will now be described with reference with FIG. 39.

Data supplied from the aforesaid computer interface portion 307 is discriminated by the core portion 310. If subject data relates to the formatter portion 308, the CPU 3003 of the core portion 310, transmits data from the computer to a dual port memory 803 via the connector 3012 of the core portion 310 and a connector 800 of the formatter portion 309. A CPU 809 of the formatter portion 308 receives code data supplied from the computer via the dual port memory 803. The CPU 809 sequentially develops the aforesaid code data into image data so as to transmit image data to the memory A806 or B807 via the memory controller 808. Each of the memories A806 and B807 has a capacity of 2 Mbytes and one memory (the memory A806 or B807) is capable of treating A4 size at a resolution of 400 dpi. In a case where A3 size is treated at the resolution of 400 dpi, the memories A806 and B807 are cascade-connected to each other so as to develop the image data. The control of the aforesaid memory is performed by a memory controller 808 in accordance with an instruction issued from the CPU 809. If the character or the figure must be rotated at the time of developing image data, the rotation circuit 804 is used to rotate the image data before the image data is transmitted to the memory A806 or B807. After the image data has been developed in the memory A806 or memory B807, the CPU 809 controls the memory controller 808 so as to connect a data bus line 858 of the memory A806 or a data bus line 859 of the memory B807 to an output line 855 of the memory controller 808. Then, the CPU 809 performs communication with the CPU 3003, of the core portion 310, via the dual port memory 803 so as to set a mode in which image information is transmitted from the memory A806 or the memory B807. The CPU 3003, of the core portion 310, uses the communication function included in the CPU 122 of the reader 301 via the communication line 3002 in the core portion 310 to set a print output mode in the CPU 122. The CPU 3003 of the core portion 310 starts a timing generating circuit 802 via the connector 3012 and the connector 800 of the formatter portion 308. The timing generating circuit 802 generates and transmits a timing signal with which image information is read from the memory A806 or B807 to the memory controller 808 in response to a signal supplied from the core portion 310. Image information supplied from the memory A806 or B807 passes through the signal lines 858 and 855 before it is received by the magnification-varying circuit 801. The magnification-varying circuit 801 performs the magnification-varying operation in accordance with the instruction issued from the CPU 809 and it transmits image information to the core portion 310 via the signal line 851 and the connector 800. Since the operations to be performed to the output from the core portion 310 to the printer 302 have been described in the description made about the core portion 310, their descriptions are omitted here.

Figure 40:
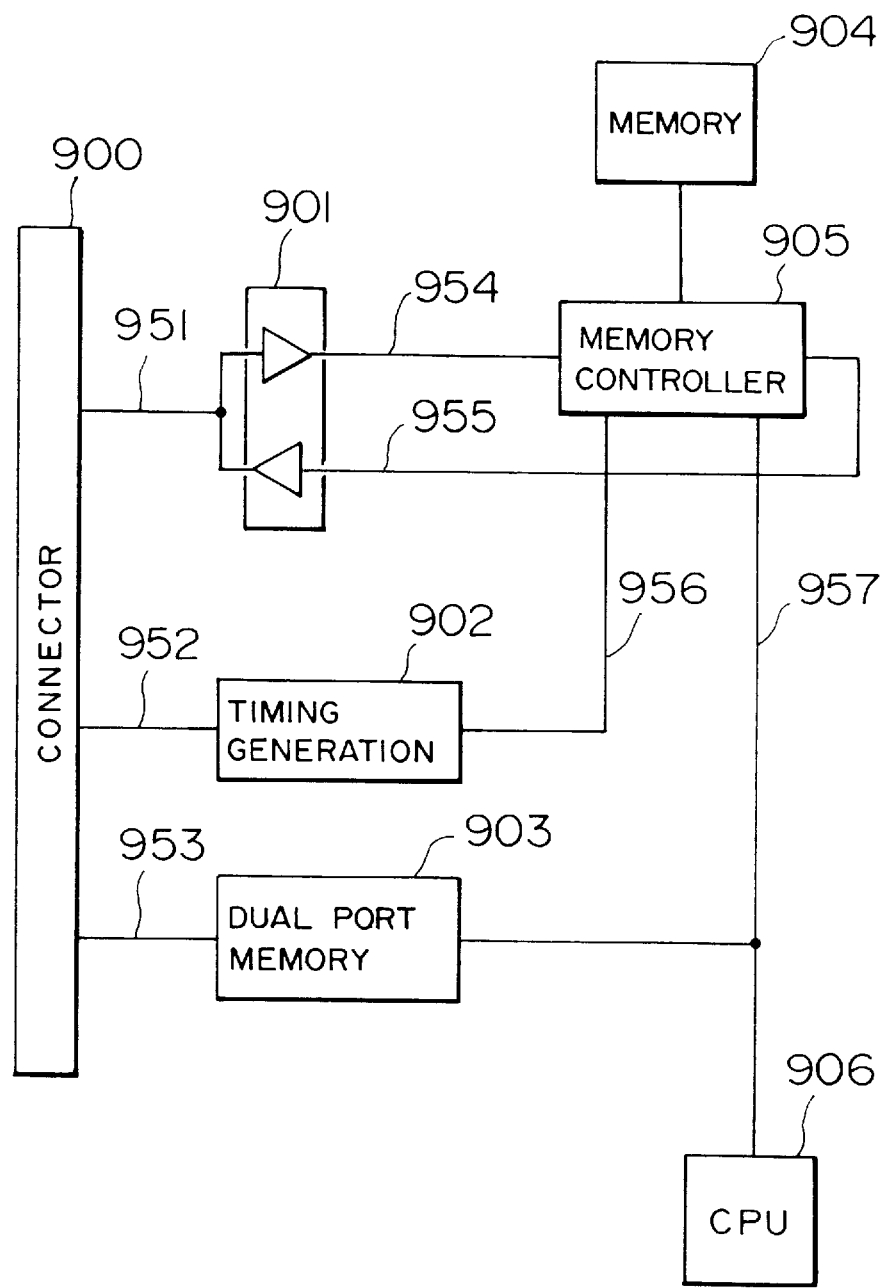
FIG. 40 is a block diagram of an image memory portion 309.

The image memory portion 309 will now be described with reference to FIG. 40.

The image memory portion 309 is connected to the core portion 310 by a connector 900 so as to supply/receive various signals. A signal 951 is a bidirectional 8-bit multi-value image signal and is supplied to a buffer 901. The buffer 901 divides the bidirectional signal 951 into a multi-value output signal 955 from the image memory portion 309 and a multi-value input signal 954 to be supplied to the image memory portion 309. The multi-value input signal 954 is stored by a memory 904 under the control of a memory controller 905. The memory controller 905 has three functions consisting of a mode in which data is supplied/received between a memory 904 and a CPU bus 957 in accordance with an instruction issued from a CPU 906, a mode in which a signal of a signal line 954 is stored in a memory 904 under control of a timing generating circuit 902, and a mode in which the contents stored by the memory 904 are read so as to be transmitted to a signal line 955. The memory 904 has a capacity of 32 Mbytes and is capable of storing an image equivalent to A3 size at a resolution of 400 dpi and 256 gradations. The timing generating circuit 902 is connected to the connector 900 by means of a signal line 952 and is started in response to a control signal (HSYNC, HEN, VSYNC and VEN) supplied from the core portion 310 so as to generate signals for realizing two functions. The first function is a function with which information supplied from the core portion 310 is stored in the memory 904 and the second function is a function in which information is read from the memory 904 so as to be transmitted to the signal line 955. The CPU 3003 of the core portion 310 is connected to a dual port memory 903 via a signal line 953 and a CPU 906 of the image memory portion 309 is connected to the same via a signal line 957. Each CPU supplies/receives a command via the dual port memory 903.

An example of storing image information in the image memory portion 309 and transferring the aforesaid information to the computer will now be described. An 8-bit multi-value image signal supplied from the reader 301 is received through the connector 900 before it is received by the buffer 901 via the signal line 951. The buffer 901 transmits the signal 951 to the signal line 954 in accordance with a setting made by the CPU 906. The memory controller 905 causes the timing generating circuit 902 to generate a timing signal 956 in response to a signal 952 supplied from the core portion 310, the timing signal 956 being used to store a signal on the signal line 954 in the memory 904. The CPU 906 connects the memory 904 of the memory controller 905 to the CPU bus 957. The CPU 906 sequentially reads image information from the memory 904 so as to transmit image information to the dual port memory 903. The CPU 3003 of the core portion 310, reads image information in the dual port memory 903 of the image memory portion 309 via the signal line 953 and the connector 900, the image information being transferred to the computer interface portion 307. Since operation of transferring information from the computer interface portion 307 to the computer has been described above, it is omitted here.

An example of transmitting image information transmitted from the computer to the printer 2 will now be described. Image information transmitted from the computer is supplied to the core portion 310 via the computer interface portion 307. The CPU 3003, of the core portion 310 transfers image information to the dual port memory 903, of the image memory portion 309, via the CPU bus 3053 and the connector 3013.

At this time, the CPU 906 controls the memory controller 905 so as to connect the CPU bus 957 to the bus of the memory 904. The CPU 906 transfers image information from the dual port memory 903 to the memory 904 via the memory controller 905. After transference of image information to the memory 904 has been completed, the CPU 906 controls the memory controller 905 so as to connect the data line of the memory 904 to the signal 955. The CPU 906 performs communication with the CPU 3003, of the core portion 310, via the dual port memory 903 so as to perform the setting required to print out an image from the memory 904 to the printer 302 via the core portion 310. After setting has been completed, the CPU 906 starts the timing the generating circuit 902 so as to transmit a predetermined timing signal from the signal line 956 to the memory controller 905. The memory controller 905 reads image information from the memory 904 in synchronization with a signal transmitted from the timing generating circuit 902 so as to transmit image information to the signal line 955. The signal line 955 is connected to the buffer 901 so that image information is transmitted to the connector 900 via the signal line 951. Since the operation of transferring information from the connector 900 to the printer 3 has been described in the description made about the core portion 310, it is omitted from the description.

As described above, even if a plurality of image information generating means arbitrarily generate image information, recording can be efficiently performed in such a manner that sorting can be easily performed.

Another embodiment will now be described.

Figure 41:
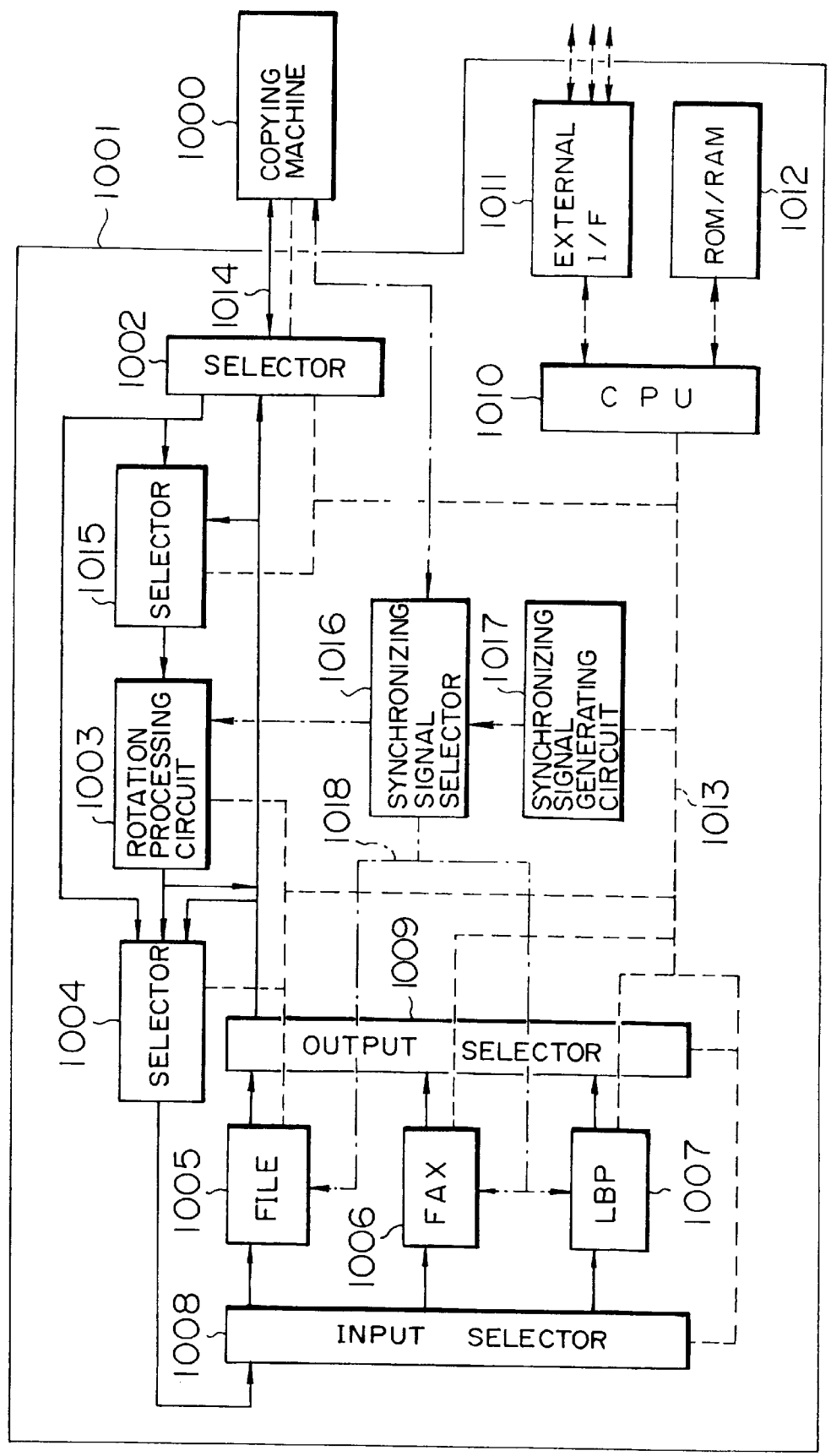
FIG. 41 is a schematic block diagram which illustrates the structure of the image forming apparatus.

FIG. 41 is a schematic block diagram which illustrates the structure of this embodiment of the image forming apparatus.

Referring to FIG. 41, reference numeral 1000 represents a digital-type copying machine which is an image input/output portion common to each of the function portions. Reference numeral 1001 represents an external device including a plurality of function portions to be described later. The external device 1001 has a selector 1002, which selects an operation of taking image data from the copying machine 1000 to the external device 1001 or an operation of transmitting image data supplied from the external device 1001 to the coying machine 1000. Reference numeral 1003 represents a rotation processing circuit for subjecting image data to the rotation process if necessary. Reference numeral 1004 represents a selector for selecting image data from that supplied from the selector 1002, that supplied from the rotation processing circuit 1003 or that supplied from an output selector 1009 to be described later.

Reference numeral 1008 represents an input selector for selecting the output of image data from the selector 1004 to a file function portion 1005, to a facsimile (FAX) function portion 1006, to a laser beam printer (LBP) function portion 1007, or to a plurality of the circuit portions. Reference numeral 1005 represents a file function portion for filing image data supplied through the input selector 1008 and transmitting filed image data to the output selector 1009. Furthermore, the file function portion 1005 includes a drive device portion 24 of the storage means and the external display portion 22 shown in FIG. 1. Reference numeral 1006 represents a facsimile function portion for compressing and transmitting image data supplied from the input selector 1008 or extending and transmitting compressed image data to the output selector 1009. Reference numeral 1007 represents an LBP circuit portion for developing image data supplied through the input selector 1008 into an inside printing memory and transmitting the developed image data to the output selector 1009 in accordance with a print control command such as a page description language. Reference numeral 1009 represents an output selector for selecting image data from that supplied from the file function portion 1005, that supplied from the facsimile function portion 1006 or that supplied from the LBP function portion 1007.

Reference numeral 1010 represents a CPU for communicating with a CPU (omitted from illustration), which is a control mechanism included in each copying machine 1000, file function portion 1005, facsimile function portion 1006 and LBP function portion 1007, or for setting each of the selectors 1002, 1004, 1008 and 1009 for controlling the flow of image data, or for communicating with a host computer (omitted from illustration) via an external interface circuit 1011, or for controlling the external device 1001. Reference numeral 1012 represents a ROM/RAM, which stores a program for controlling the CPU 1010 and a work memory. Reference numeral 1013 represents a CPU bus, 1014 represents an image data line, 1015 represents a selector for selecting image data to be supplied to the rotation processing circuit 1003, 1016 represents a selector for selecting a synchronizing signal for the image transference, 1017 represents a circuit for generating the synchronizing signal, 1018 represents a synchronizing signal for transferring an image including a reference clock for each pixel for transferring image data, a horizontal synchronizing signal and a vertical synchronizing signal and the like.

The basic operation of the aforesaid copying machine 1000, which is the image input/output portion common to each function portion is operated as described with reference to FIG. 1.

First, the synchronizing signal 1018 for transferring the image will now be described. When image data is transferred from the copying machine 1000, the CPU 1010 issues an instruction to the synchronizing signal selector 1016 to select the synchronizing signal transmitted from the copying machine 1000. In accordance with the aforesaid instruction, the synchronizing signal selector 1016 transfers the synchronizing signal 1018, supplied from the copying machine 1000, to a block of the external device 1001 which requires it. When the image transference is performed in only the external device 1001 or when image data is transferred from the external device 1001 to the copying machine 1000, the CPU 1010 instructs the synchronizing signal selector 1016 to select the synchronizing signal to be transmitted from the synchronizing signal generating circuit 1017. In accordance with the aforesaid instruction, the synchronizing signal selector 1016 transfers the signal 1018, supplied from the synchronizing signal generating circuit 1017, to a block of the external device 1001 that requires the signal 1018 or the copying machine 1000. The description will be hereinafter made about the image transference in such a manner that the synchronizing signal is omitted from the description.

A case where an original document is filed will now be described. First, a desired original document is placed on an original-document retainer 1 and then various factors relating to filing are set by the operation portion 35 shown in FIG. 2. When a copy start key of the operation portion 35 is then depressed, the contents of setting are transmitted from the copying machine 1000 to the CPU 1010 via the communication line 1013 and the selector 1002. The data about setting is also transmitted from the CPU 1010 to the file function portion 1005 through the communication line 1013. In accordance with the supplied set data, the file function portion 1005 sets factors in accordance with the aforesaid data and notifies that preparation has been completed to the CPU 1010. On the other hand, the CPU 1010, upon receiving the notification of the completion of the preparation, controls the selector 1002 so as to make image data pass from the copying machine 1000 to the rotation processing circuit 1003. Furthermore, the CPU 1010 controls the selector 1004 and the input selector 1008 causing image data to pass from the rotation processing circuit 1003 to the file function portion 1005 via the selector 1004 and the input selector 1005.

When a sequential image data route has been determined, the CPU 1010 transmits a signal denoting the completion of the preparation to the copying machine 1000. The copying machine 1000, upon receiving the signal denoting the completion of the preparation, turns on the lamp 3 of the scanner unit 4 and as well as starts the basic operation of the copying machine so arranged that the scanner unit 4 is moved to irradiate the original document with light. Then, the image signal supplied from the reader shown in FIG. 2 is, as described above, subjected to the image processing operation supplied from the copying machine 1000 to the selector 1002 via the image data line 1014. It is then supplied to the file function portion 1005 along the aforesaid image data passage. If the complete rotation of the image data is required, the image data is subjected to the rotation control process by the rotation processing circuit 1003. If it is not required, the rotation processing circuit portion 1003 does not perform any operation and image data is transmitted as it is.

Then, the file function portion 1005 converts the image data into a structure which is adapted to the format of the disk and records. When reading has been completed, a reading completion signal is transmitted from the file function portion 1005 to the CPU 1010. The CPU 1010, upon receiving the reading completion signal, causes the selector 1002 to disconnect the image data line connected to the copying machine 1000. Furthermore, the CPU 1010 transmits a reading completion signal to the copying machine 1000, so that the copying machine is restored to the original state.

In a case where the original document is transmitted to the facsimile device, the same operations as those performed in the case of the filing operation are performed except for a fact that image data is supplied to the facsimile function portion 1006 in place of the file function portion 1005.

A case where the filed original document is printed will now be described. After setting for the various printing operations has been performed (similar to the aforesaid filing operation) the copy start key is depressed, so that the aforesaid setting is transmitted from the copying machine 1000 to the CPU 1010 via the communication line 1013 and the selector 1002. The set data is similarly transmitted from the CPU 1010 to the file function portion 1005 via the communication line 1013. In accordance with the transmitted set data, the file function portion 1005 performs setting in accordance with the aforesaid data and notifies the CPU 1010 that the preparation has been completed. The CPU 1010, upon receiving the preparation completion signal, controls the output selector 1009 so as to cause image data to pass from the file function portion 1005 to the rotation processing circuit 1003. Furthermore, the CPU 1010 shuts the selector 1004 and controls the selector 1002 so as to cause the image data to pass from the rotation processing circuit 1003 to the copying machine 1000 via the selector 1002.

After the sequential image data route has been determined, the CPU 1010 transmits an image output preparation completion signal to the copying machine 1000. The copying machine 1000, upon receiving the image output preparation completion signal, starts the printing operation. Furthermore, image data is supplied to the image signal control circuit 32 shown in FIG. 2 before it is supplied to the printer 33, so that it is printed by the aforesaid operation. If complete rotation of the image data is required at this time, the rotation processing circuit 1003 controls the rotation. If it is not required, the rotation processing circuit portion 1003 does no operation and the image data is transmitted as it is. When printing has been completed, a printing completion signal is transmitted from the copying machine 1000 to the CPU 1010. The CPU 1010, upon receiving the printing completion signal, causes the selector 1002 to disconnect the image data line 1014 connected to the copying machine 1000. The CPU 1010 transmits the printing completion signal to the file function portion 1005, so that the file function portion is restored to the original state.

An operation performed when the image transmitted from the host computer is transmitted will now be described. When the aforesaid print control command has been supplied from the host computer, it is supplied to the LBP function portion 1007 via the external interface 1011 and the CPU 1010. The LBP function portion 1007, upon receiving the print control command, develops the image data in a memory (omitted from illustration) in the LBP function portion 1007 in accordance with the printer control command system. After the development has been completed, the CPU in the LBP function portion 1007 issues an image data output requirement to the CPU 1010. The ensuing process is performed similarly to the case in which the filed original document is printed out.

Also, in a case where image data supplied from another facsimile device is printed, the same operations are performed as those performed in a case where the output from the file function portion 1005 is printed except for a fact that image data is transmitted from the facsimile function portion 1006 in place of the file function portion 1005.

A case where the filed original document is transmitted to another facsimile device will now be described. After the setting required for various files and the facsimile transmission has been completed, the copy start key is depressed, so that each setting is transmitted from the copying machine 1000 to the CPU 1010 via the communication line 1013 and the selector 1002. The aforesaid set data is similarly transmitted from the CPU 1010 to the file function portion 1005 and the facsimile function portion 1006 through the communication line 1013. In accordance with the supplied set data, the file function portion 1005 and the facsimile function portion 1006 perform setting in accordance with the aforesaid data, and then transmits a preparation completion signal to the CPU 1010. The CPU 1010, upon receiving the preparation completion signal, controls the output selector 1009 so as to cause image data to pass from the file function portion 1005 to the rotation processing circuit 1003. Furthermore, the CPU 1010 controls the input selector 1008 so as to cause the image data to pass from the rotation processing circuit 1003 to the facsimile function portion 1006 via the selector 1004.

After the sequential image data route has been determined, the CPU 1010 transmits an image output preparation completion signal to the file function portion 1005. The CPU 1010, upon receiving the image output preparation completion signal, starts the image data transmission operation. If the complete rotation of image data is required at this time, the rotation processing circuit 1003 performs the rotation control. If it is not required, the rotation processing circuit portion 1003 does not perform any operation and the image data is transmitted as it is. When the transmission has been then completed, the file function portion 1005 transmits a transmission completion signal to the CPU 1010. The CPU 1010, upon receiving the transmission completion signal, causes the output selector 1009 to disconnect the image data line 1014, and it transmits a transmission completion signal to the facsimile function portion 1006, so that the facsimile function portion 1006 is restored to the original state.

Also, where image data received from another facsimile device is filed, where data transmitted from the host computer is filed, and where data supplied from the host computer is transmitted to another facsimile device, similar processes are performed except for the flow of the image data.

Figure 42:
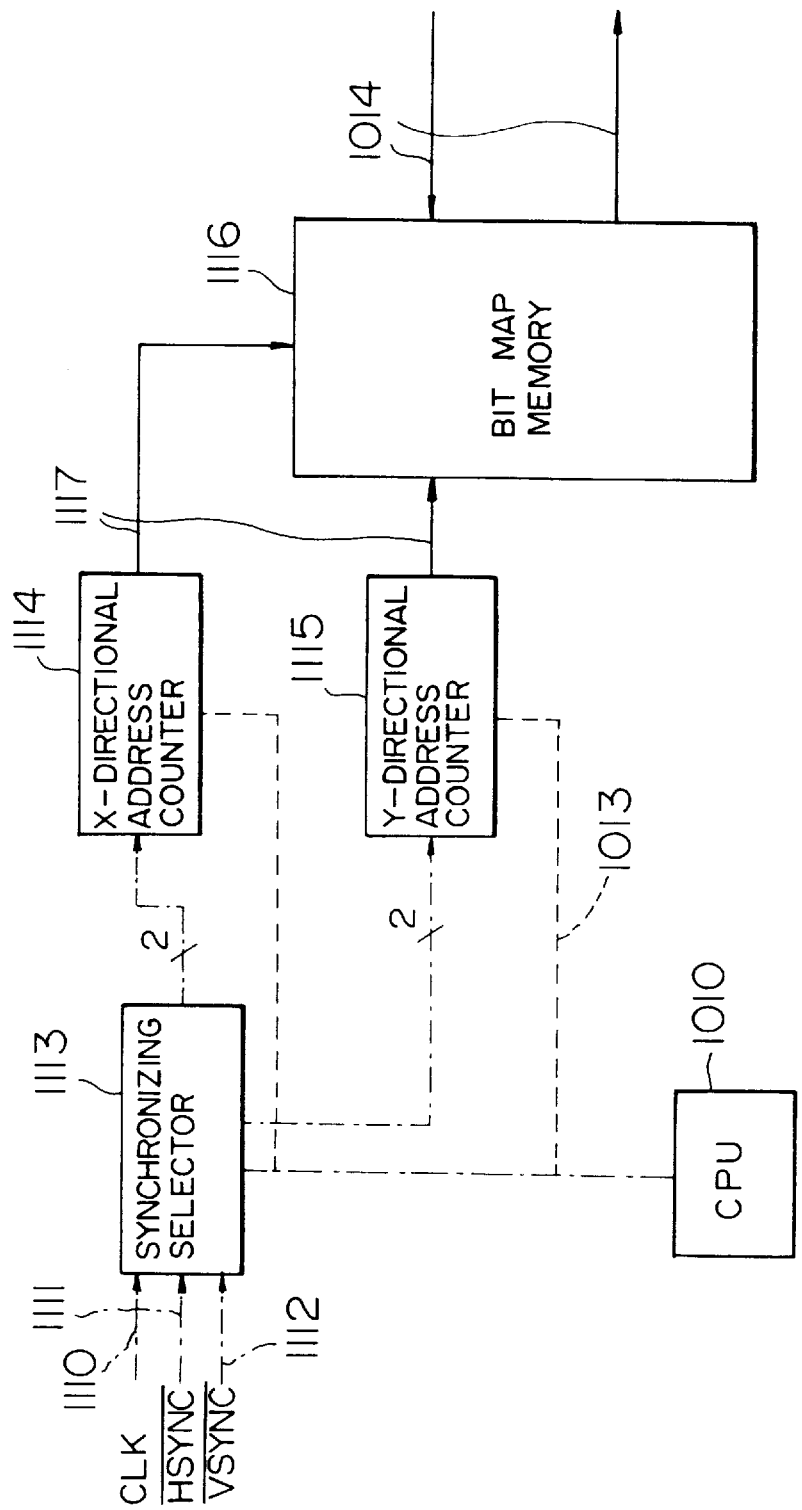
FIG. 42 illustrates the detailed structure of a rotation processing circuit.

A detailed structure of the aforesaid rotation processing circuit 1003 will now be described with reference to FIG. 42.

First, a case where image data is supplied to the rotation processing circuit 1003 via the image data line 1014 will now be described. The CPU 1010 instructs a synchronizing signal selector 1113 to cause a reference clock signal 1110 and a horizontal synchronizing signal 1111 to flow to an X-directional address counter 1114. Furthermore, it instructs the synchronizing signal selector 1113 to cause the horizontal synchronizing signal 1111 and a vertical synchronizing signal 1112 to flow to a Y-directional address counter 1115. The X-directional address counter 1114 controls the lower address bus 1117, while the Y-directional address counter 1115 controls the upper address bus 1117. Each address counter increases or decreases the instructed address with respect to a bit map memory 1116 in accordance with the two synchronizing signals. The bit map memory 1116 can be accessed via the aforesaid two address counters only by the image data supplied from the image data line 1014, the bit map memory 1116 being formed into an exclusive memory for the rotation process.

When the synchronizing signal has been selected as described above, the X-directional address counter 1114 increases (decreases) the count of the address in accordance with the reference clock 1110 so as to store image data supplied from the image data line 1014 in the bit map memory 1116 for each pixel. When the horizontal synchronizing signal 1111 is supplied at this time, the address, which has been transmitted from the X-directional address counter 1114, is cleared. Furthermore, the count of the address, which has been transmitted from the Y-directional address counter 1115, increases (decreases) and the count of the address for one horizontal line is increased (decreased).

Figure 43:
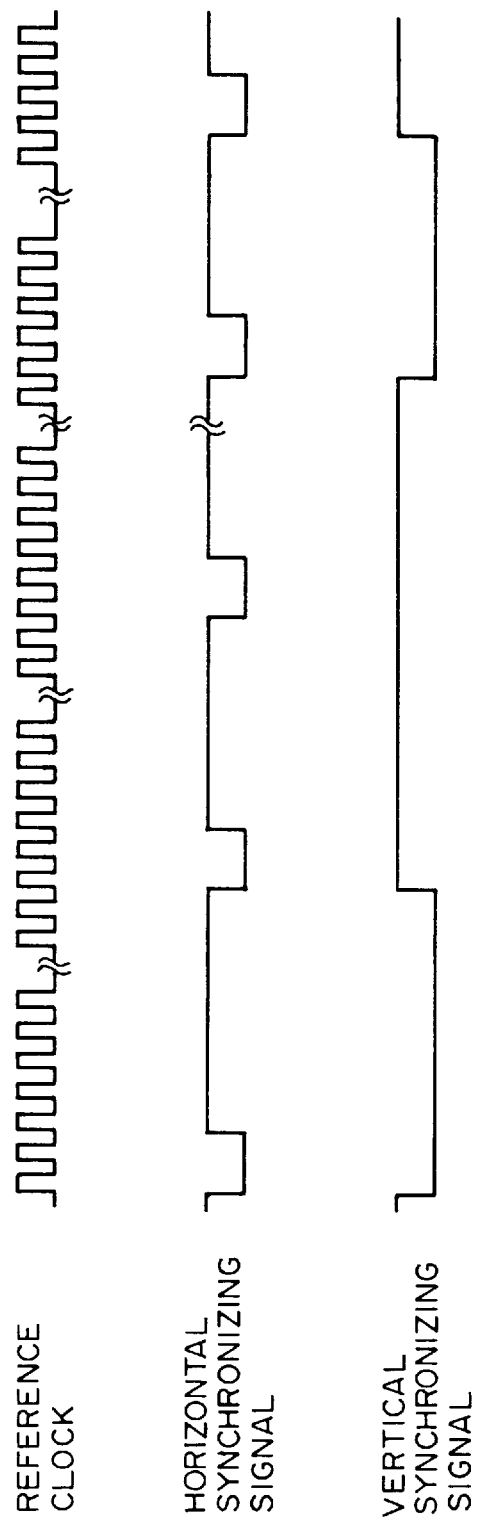
FIG. 43 is a timing chart of a synchronizing signal.

Incidentally, the vertical synchronizing signal 1112 is a signal for clearing the Y-directional address counter 1115. FIG. 43 is a timing chart, which illustrates the relationship between the aforesaid synchronizing signals.

In order to take the image data stored in the bit map memory 1116 while rotating the image data in response to the aforesaid synchronizing signal, the synchronizing signals to be supplied to the aforesaid two counters are interchanged. By taking the image data from the image data line 1014 in response to the interchanged synchronizing signals, the thus stored image data can be taken in perpendicular directions. As described above, the rotation processing function is effective to unify the directions of image data for each function.

The input/output control mechanism according to this embodiment will now be described with reference to flow charts shown in FIGS. 44 to 46.

Figure 44:
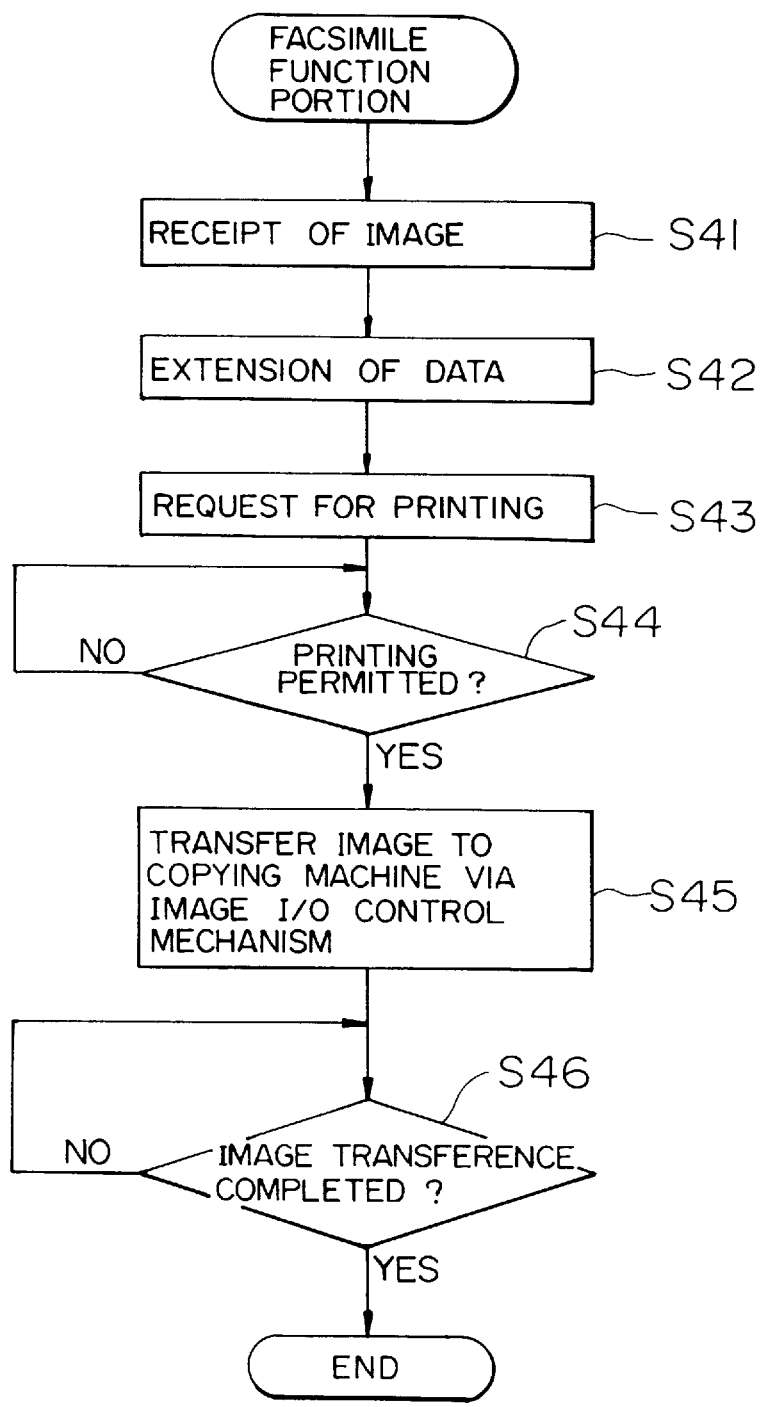
FIGS. 44, 45 and 46 are flow charts which illustrate a first-come first-served control.
Figure 45:
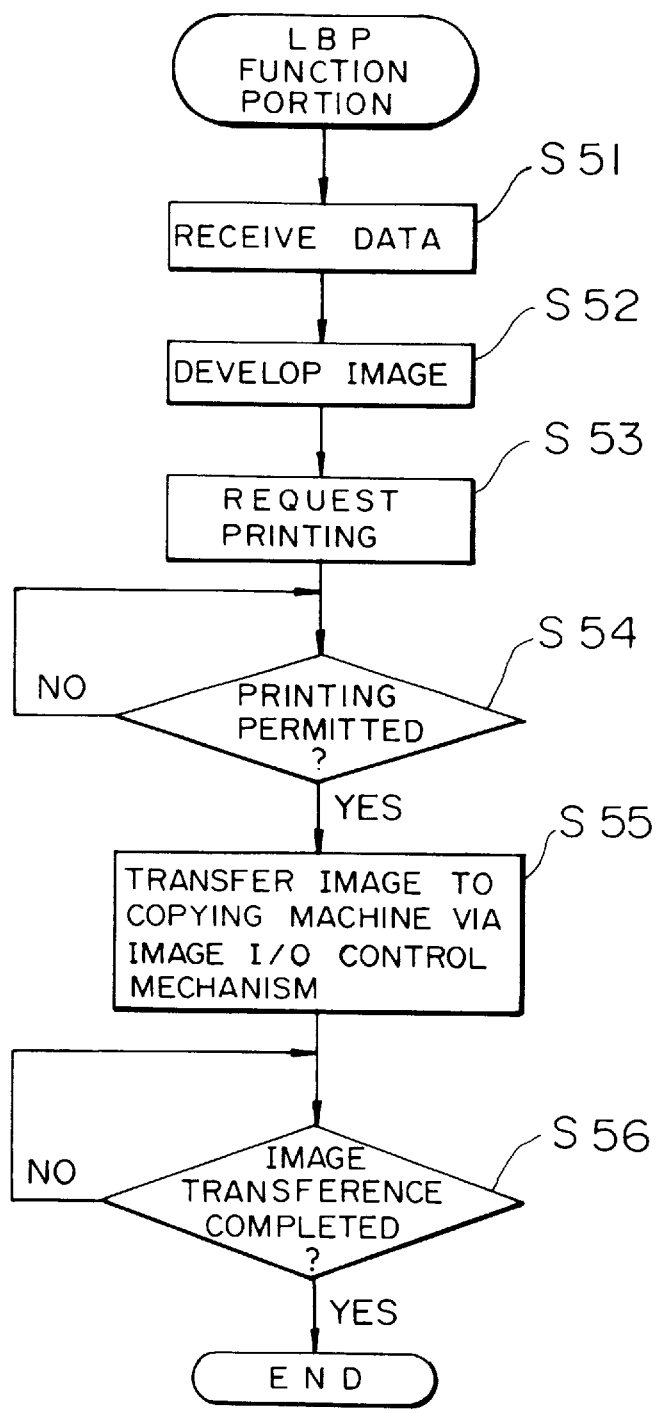
Figure 46:
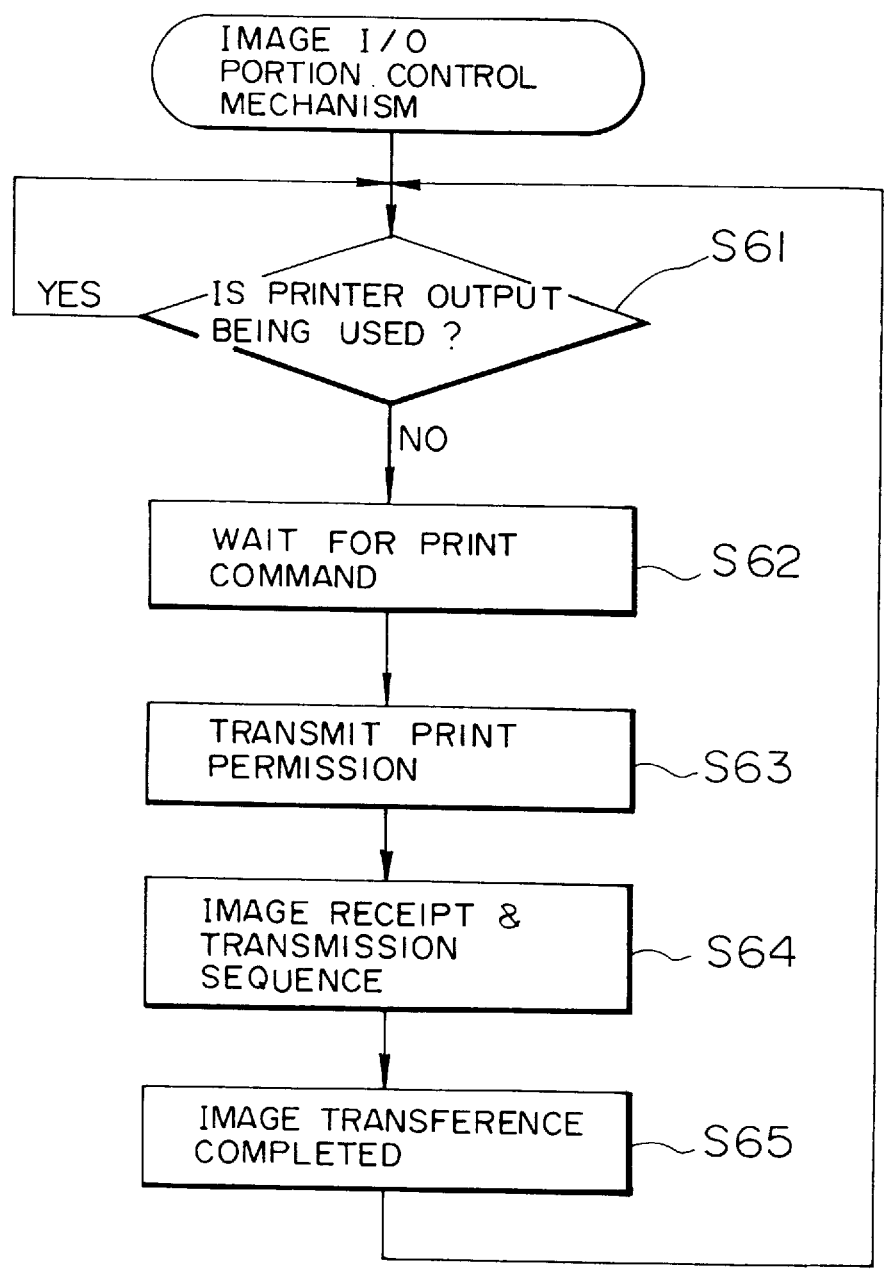

FIGS. 44 to 46 are flow charts that illustrate the operation of the CPU, which is a mechanism for controlling each function portion, to be performed when a requirement of utilizing the printer portion 33 of the copying machine 1000 is made from the facsimile function portion 1006 and the LBP function portion 1007.

When the facsimile function portion 1006 receives data from outside (step S41), the CPU of the facsimile function portion 1006 extends supplied data into image data (step S42). Then, it transmits a print command to the CPU of the input/output control mechanism portion (step S43). The input/output control mechanism portion discriminates as to whether or not the printer is being used (step S61). If it is not being used, the printer is waiting for the print command (step S62). Therefore, the command is immediately received and print permission is transmitted to the facsimile function portion 1006 (step S63), and shifting to the image transference sequence is performed (step S64). As a result, the facsimile function portion 1006 is given the print permission and transfers image data to the input/output mechanism portion (step S45). When the transference operation has been completed (step S46), the process is completed here.

In a case where the CPU of the LBP function portion 1007 has received data from the host computer (step S51), it has developed it into image data (step S52) and has similarly received the print command (step S53), it is caused to wait for in the input/output control mechanism portion until the image transference from the facsimile function portion 1006 is completed if the aforesaid command can be received (NO of step S54).

Hence, the input and output are controlled in accordance with the function portion which has first issued the input/output command. By performing the aforesaid control, the output order can be maintained systematically.

Figure 47:
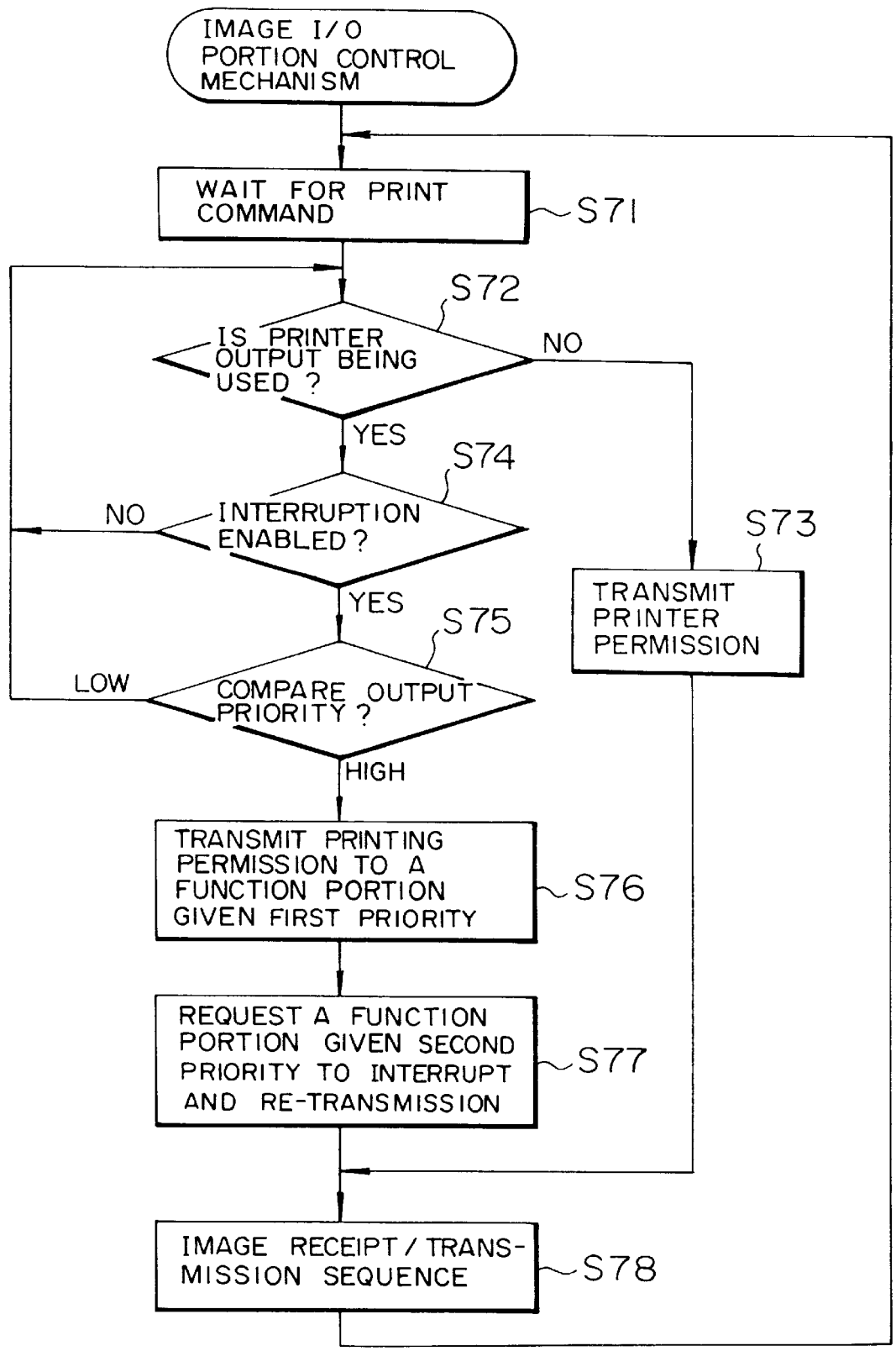
FIG. 47 is a flow chart which illustrates a priority order control.

A case where each function portion has a priority degree will now be described with reference to flow charts shown in FIGS. 44, 45 and 47. Incidentally, since it is impossible to cause the sender to wait, the facsimile function portion 1006 has the highest priority.

First, a printer control command is transmitted to the LBP function portion 1007 from a host computer or the like (step S51). The LBP function portion 1007 develops the image in accordance with the aforesaid command (step S52) and issues a print command to the input/output control mechanism portion (step S53). When the input/output control mechanism portion has received the print command (step S71), a confirmation that the printer is not being used is confirmed (step S72). Then, a print permission is transmitted to the LBP function portion (step S73) and the flow is shifted to the image transference sequence (step S78). Then, the flow returns to the print command waiting state (step S71) in which a new print command can be received.

After the facsimile function portion 1006 has received data (step S41) and the image data has been extended (step S42), the CPU of the facsimile function portion 1006 issues a print command (step S43). The CPU of the input/output control mechanism portion receives the aforesaid command as described above and confirms that the printer is being used (step S74). Furthermore, it discriminates as to whether or not the printer, which is being used, can be interrupted (step S73). The aforesaid discrimination is made by performing a communication with the CPU 30, which controls the copying machine 1000, to confirm the state of image data transmitted from the LBP function portion 1007.

If the image has been transferred onto the output paper sheet or if a latent image has been formed on the photosensitive member 11, a discrimination is made that the interruption cannot be performed and waiting for the completion of the printing operation is performed. If the interruption can be performed, because the latent image has not been started or the like, the output sequence is stopped temporarily and the output priority order is subjected to a comparison (step S75). Since the required function portion (that is, the facsimile function portion 1000) has higher priority order here, the sequence for transmitting image data supplied from the facsimile function portion 1006 is actuated (step S76) and a notification is issued to the LBP function portion 1007 to again transfer image data which had been interrupted (step S77).

As described above, the output having the higher priority order can be executed as soon as possible. In particular, an arrangement where the higher priority order is given preference will realize a satisfactory effect because the sender of a facsimile function portion 1006 or the like cannot wait, and data cannot be received depending upon the state of the receiver data holding device.

Another embodiment will now be described with reference to the drawings.

Although the aforesaid embodiments are arranged in such a manner that a control mechanism for performing a control for commonly possessing a unit is disposed between the body of the copying machine and each function portion, a similar effect can be obtained from a structure so arranged that each function portion and the CPU, of the body of the copying machine, perform direct communication. By employing the aforesaid structure, the number of the required CPUs can be decreased and the communication between CPUs can be eliminated. In this case, when the CPU of the copying machine side transmits data to the printer, it is necessary to selectively control each function portion and each CPU of the function portion must inquire and discriminate the state of the use of the CPU of the copying machine.

Figure 48:
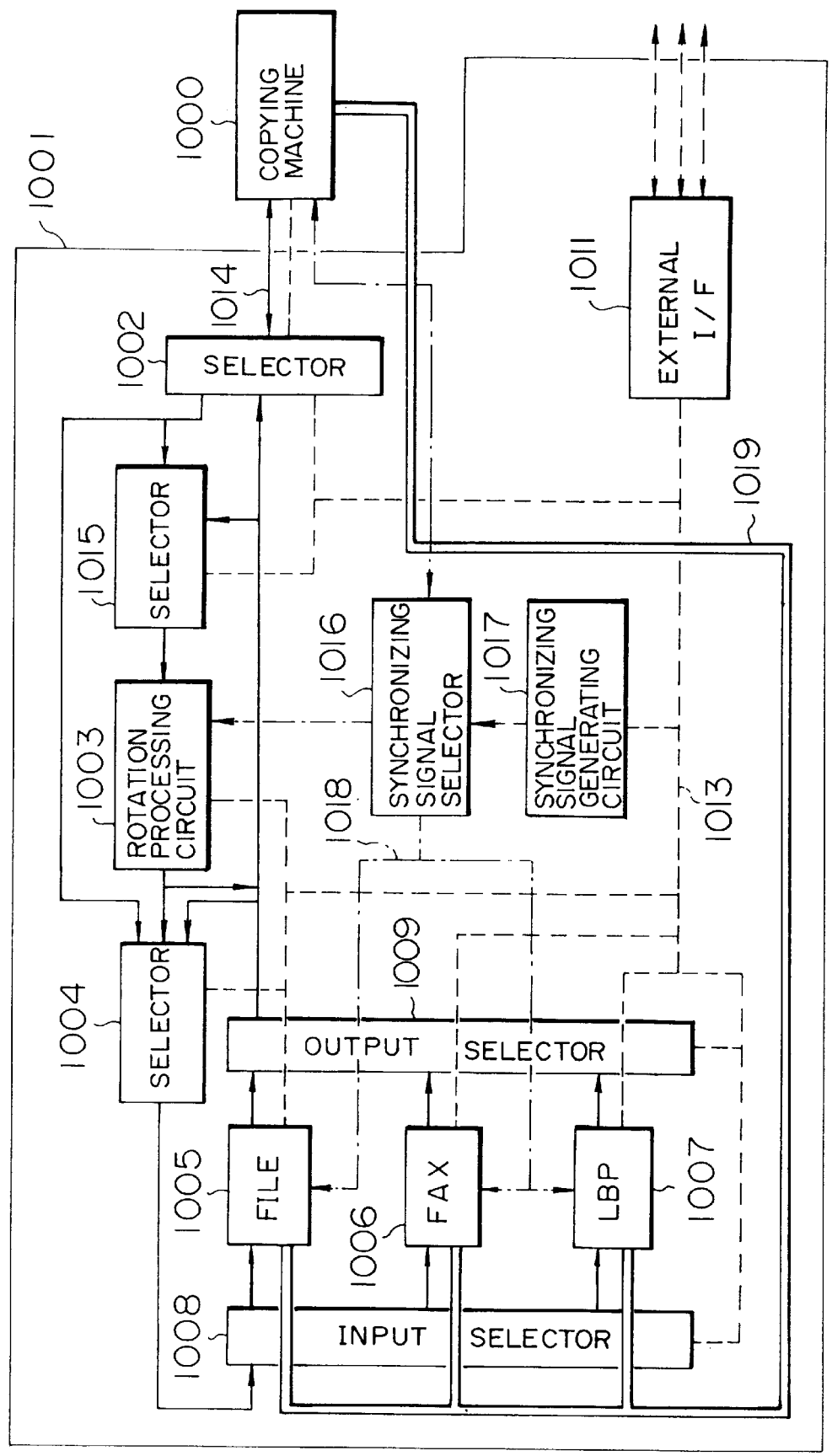
FIG. 48 is a schematic block diagram which illustrates the structure of the image forming apparatus.

FIG. 48 is a block diagram which schematically illustrates the structure of the image forming apparatus according to this embodiment. As shown in FIG. 48, reference numeral 1019 represents a communication line with which the CPU of each function portion and the CPU of the body of the copying machine directly communicate with each other. According to this embodiment, each selector and rotation circuit portion shown in the block diagram are controlled by the CPU of each function portion for transmitting the image.

As described above, the image forming apparatus, which uses the common image input/output means, is so arranged that control at the time of using the image input/output means is established, so that output can be systematically performed in accordance with the output order. Furthermore, by giving the priority degree for each function portion at the time of using the image input/output means, the output, which must be made as soon as possible, can be transmitted first.

Incidentally, the present invention may be applied to a system constituted by a plurality of devices or an apparatus having only one device. Furthermore, the present invention may, of course, be applied to a case where a program is supplied to the system or the apparatus to obtain a similar effect.

As described above, the unit (input/output portion) which is commonly used between a plurality of functions can be smoothly controlled.

Another embodiment will now be described.

Figure 49:
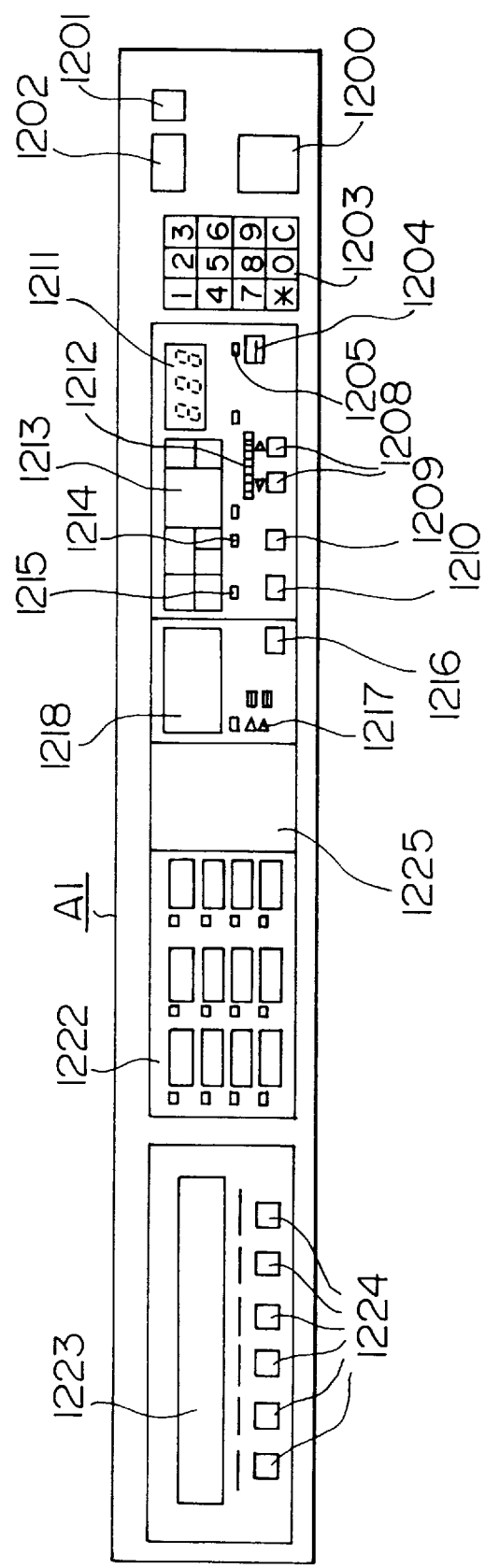
FIG. 49 illustrates the operation portion of the apparatus.

FIG. 49 illustrates the structure of an operation portion A1. Referring to FIG. 49, reference numeral 1200 represents a copy start key with which a copying start is instructed, 1202 represents a copy stop key with which a copy stop is instructed, 1201 represents a reset key for restoring the copy mode to the standard state, 1203 represents a setting key group having a ten key group consisting of 0 to 9, a C-key for clearing set number of copying sheets, and a *-key for use to input numerical data such as the trimming region or the like.

Reference numeral 1208 represents a density key for setting the density of copying and result of setting is displayed on a display portion 1212. Reference numerals 1204 and 1205 respectively represent a key for turning on/off an original-document position coordinate detection function and its display. Reference numeral 1211 represents a portion for displaying the number of sheets to be copied, 1213 represents an error message display portion, and 1209 and 1214 respectively represent a key for turning on/off the automatic density adjustment function and its display. Reference numerals 1210 and 1215 respectively represent a key for turning on/off a dither processing function for reading an original document image of a half tone such as a photograph and its display. Reference numeral 1216 represents a key for controlling the paper supply and automatic paper selection functions. A display 1217 displays the paper supply stage and display 1218 display the size of the paper. Reference numeral 1222 represents an operation display portion having a preset key for presetting and calling the copy mode and its display. Reference numeral 1223 represents a soft key for selecting a desired mode for copy modes constituted by 32 digits of 5×7 dot matrix. Reference numeral 1225 represents a key for setting the output priority to be described later.

Figure 50:
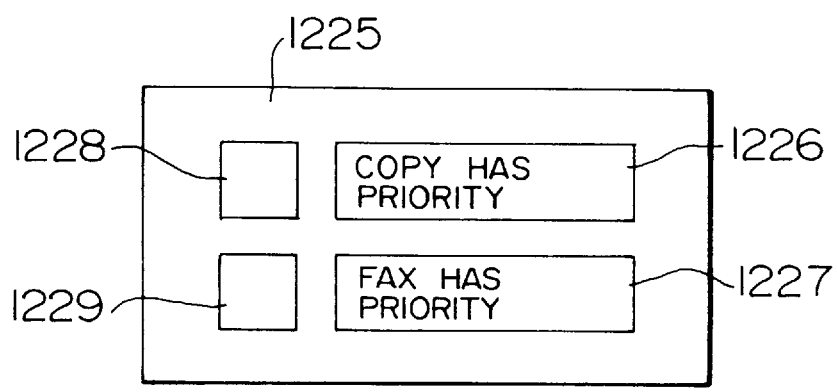
FIG. 50 illustrates a priority mode setting operation means.

FIG. 50 illustrates the key group 1225 shown in FIG. 49. Reference numerals 1226 and 1227 respectively represent a key with which the copying operation is given the priority and a key with which the facsimile operation is given the priority. Reference numerals 1228 and 1229 represent monitors for monitoring the state of the operation of each of the keys 1226 and 1227. When the copying operation is given priority by using the key 1226, the copying operation is continued even if the facsimile data is received during the copying operation. After the copying operation has been completed, recorded facsimile data is transmitted. On the contrary, in a case where the facsimile operation is given priority by using the key 1227, the copying operation is interrupted if a facsimile transmission is received during the copying operation and the facsimile data is recorded and output. After recording and outputting of the facsimile data have been completed, the copying operation is resumed.

Figure 51:
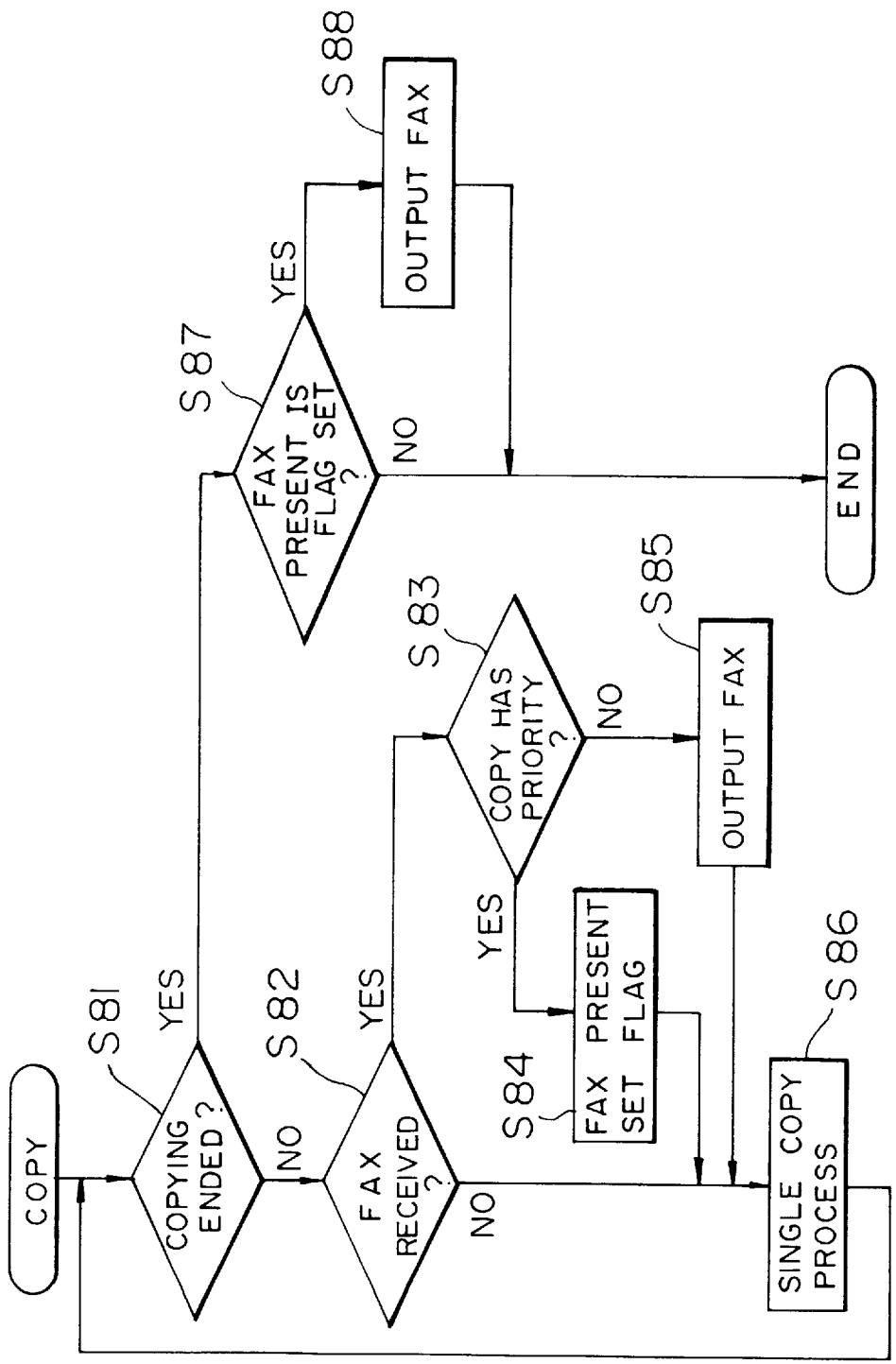
FIG. 51 is a flow chart which illustrates the control order of copy and facsimile record outputs.

FIG. 51 illustrates the control process of the copying operation to be performed by the main control portion of the apparatus. Referring to FIG. 51, the copying operation is performed in accordance with a loop constituted by steps S81, S82 and S86. In step S81, a discrimination is made as to whether or not all of the instructed copying operations have been completed. If they have not been completed, a discrimination is made in step S82 as to whether or not the facsimile receipt operation is being performed by the facsimile communication portion. If there is no facsimile receipt, one sheet of the original document is copied in step S86 and the flow returns to step S81.

If the facsimile receipt is detected in step S82, the flow proceeds to step S83 in which the states of the operations of the keys 1226 and 1227 shown in FIG. 50 are examined so as to discriminate that the copying operation has the priority or the facsimile operation has the same. In a case where the copying operation is given priority, a flag or the like indicating that there is the facsimile received image is set in step S84. In a case where the facsimile operation is given priority, the copying operation is interrupted and facsimile received image is recorded and output in step S85.

When the completion of copying has been confirmed in step S81, a discrimination is made in step S87 as to whether or not the flag has been set in step S84. If there is, the facsimile received image is recorded and output in step S88.

According to the aforesaid embodiment, the setting can be so performed that the copying operation or the facsimile operation has the priority. In a case where the facsimile operation is given higher priority, the facsimile received image can be recorded prior to the copying operation even if the copying operation is being performed.

The flow chart shown in FIG. 51 is arranged on the basis that the priority mode has been previously set before the copying operation is performed. However, a flow chart shown in FIG. 52 is arranged in such a manner that, if the facsimile receipt is made during the copying operation, it is notified to the user and the priority mode is determined at that time.

Figure 52:
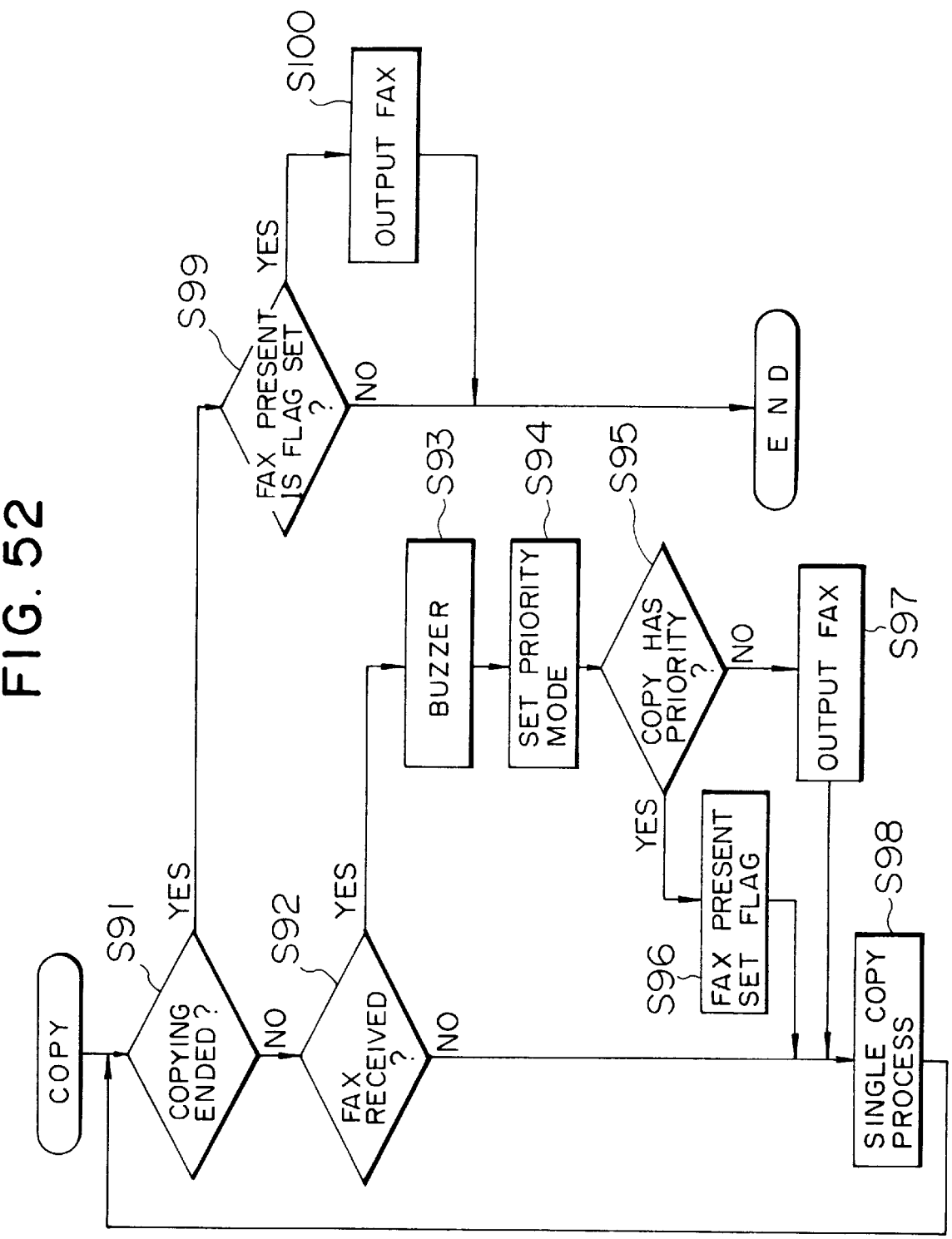
FIG. 52 is a flow chart which illustrates the control order of copy and facsimile record outputs.

Steps S91, S92, S98 shown in FIG. 52 correspond to steps S81, 82 and 86 shown in FIG. 51. Steps S99 and S100 correspond to steps S87 and S88. Steps S95 to S97 correspond to steps S83 to S85 shown in FIG. 51. Steps S93 and S94 are different from FIG. 51 in which a buzzer is actuated if the facsimile receipt is detected to notify the user that the receipt is made and, in step S94, the priority mode is determined. The priority mode can be determined by using the keys 1226 and 1227 shown in FIG. 50.

As described above, if a facsimile receipt is made during the copying operation, the user is able to give the priority to the copying operation or the facsimile operation. If the priority mode is not set in step S94, it might be feasible to employ an arrangement so made that waiting for a predetermined time is performed and the priority mode of the facsimile operation or the copying operation is selected in a default manner.

Figure 53:
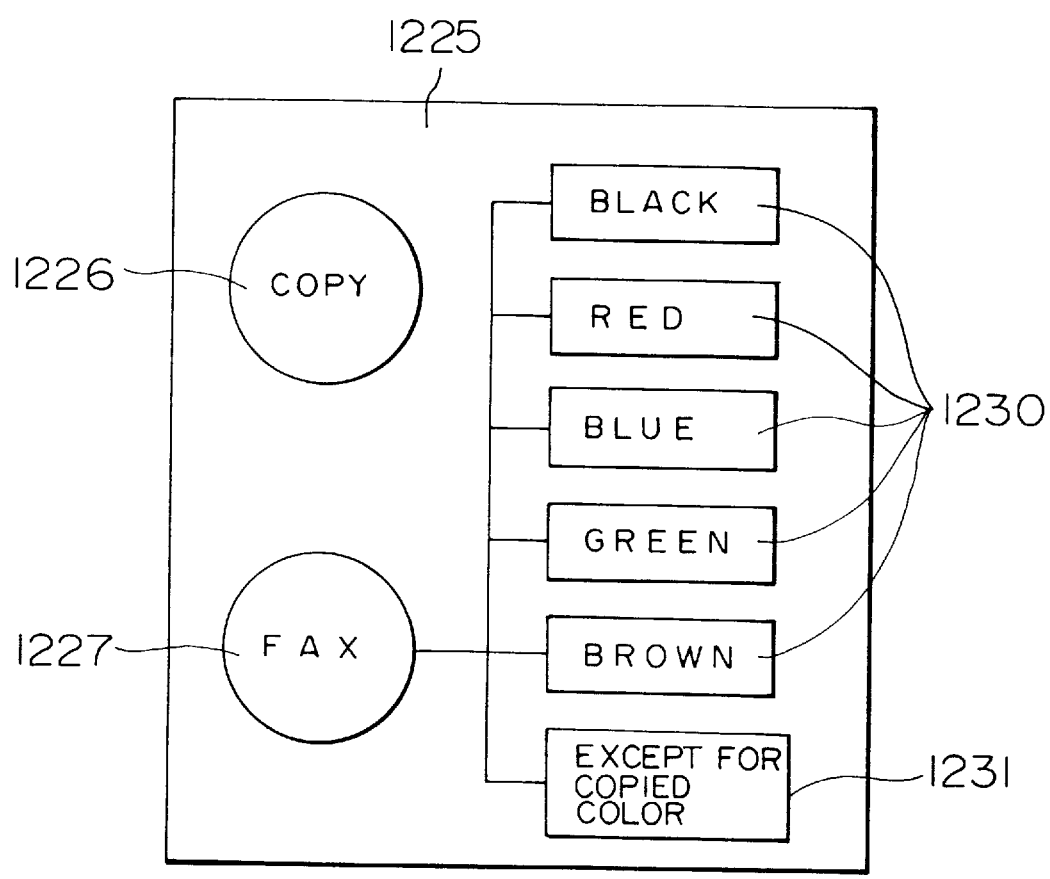
FIG. 53 illustrates the priority mode setting operation means.

FIG. 53 illustrates a modification of the priority mode setting means shown in FIG. 49. According to this modification, color is determined in a case where the key 1226 or 1227 is used to give the priority to the copying operation or the facsimile operation. Keys 1230 are used to set black, red, blue, green and brown for use to record and output facsimile data. Keys 1231 are used to automatically select a color except for the colors which are being used in the copying operation.

Figure 54:
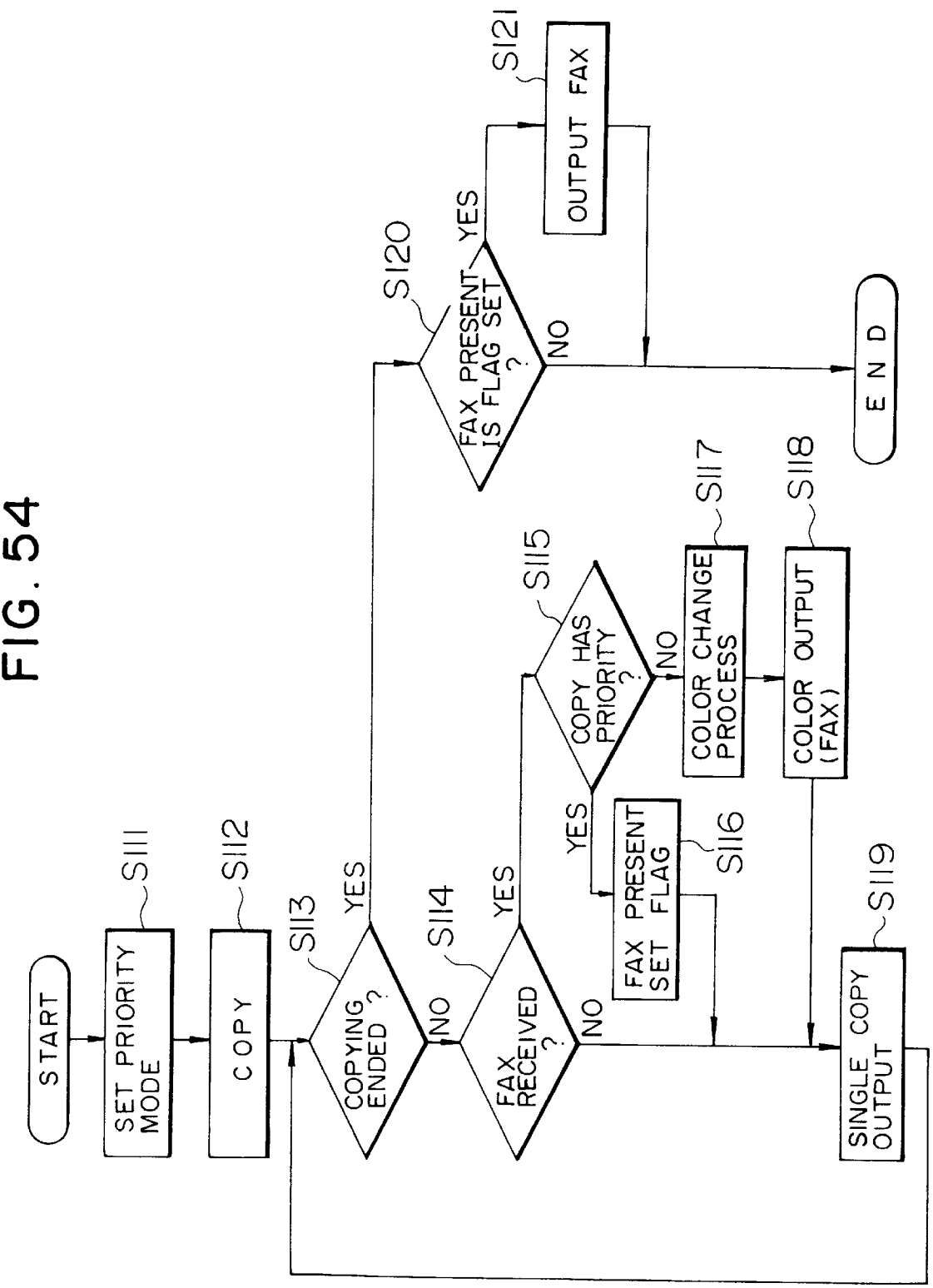
FIG. 54 is a flow chart which illustrates the control order of copy and facsimile record outputs.

FIG. 54 illustrates the control sequence in a case where the structure shown in FIG. 53 is used. The basic structure of the control is substantially the same as that of the aforesaid flow chart except for steps S111 and S112 and a process ensuing step S115 to be performed when the facsimile receipt is made. In step S111, the key 1226 or 1227 shown in FIG. 53 is used to determine whether the copying operation or the facsimile operation is given priority. According to this embodiment, the keys 1230 and 1231 are used to determine the color for use to record data in each mode.

In a case where the facsimile receipt is made during the copying operation, a discrimination is made in step S115 as to whether or not the copying operation is given priority. If it is negated and the facsimile receipt is given priority, the recording color is changed in step S117, and the facsimile received image is, in step S118, recorded in the color determined by using the keys 1230 and 1231. The other control operations are performed in the same manner as those to be performed according to the aforesaid embodiment.

According to the aforesaid control, in a case where the facsimile receipt is given priority and its image is recorded and output during the copying operation, the facsimile image and the copied image can be easily distinguished even if the discharged recording sheets have been mixed with one another.

Figure 55:
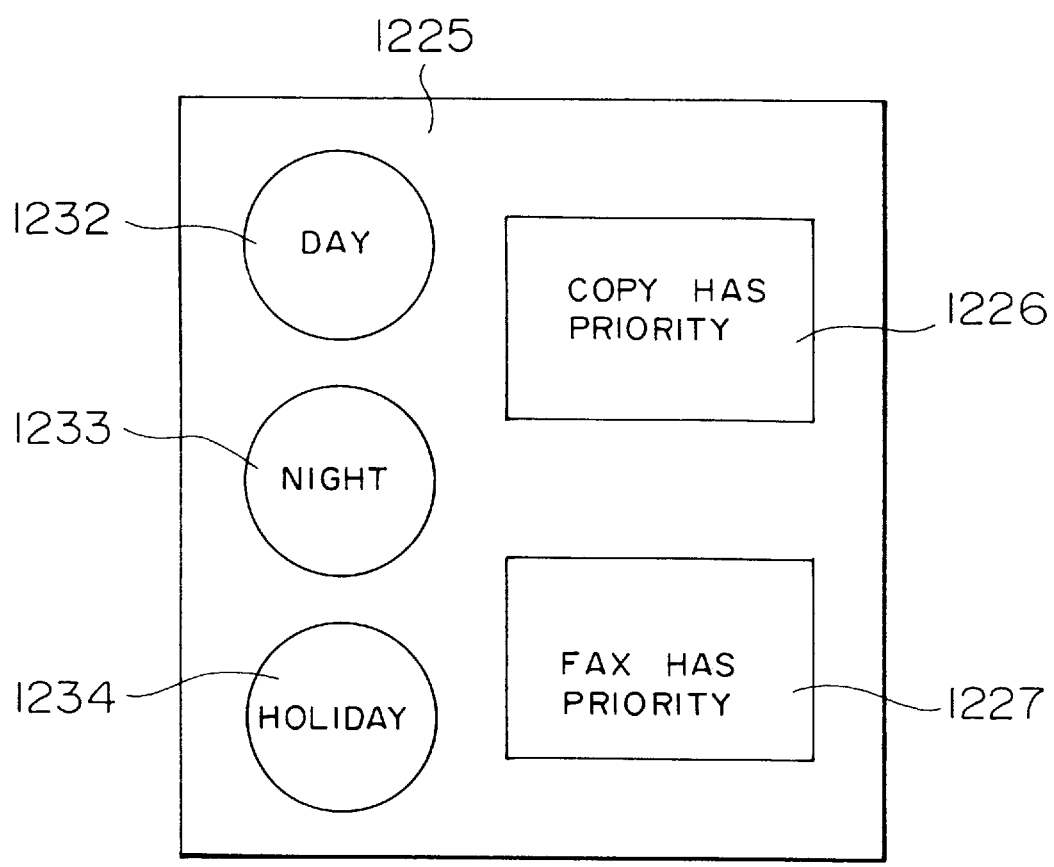
FIG. 55 illustrates the priority mode setting operation means.

FIG. 55 illustrates a modification to the priority mode setting means. According to this embodiment, the priority modes given to the copying operation and the facsimile operation are automatically set for a time period.

Referring to FIG. 55, keys 1232 and 1233 are used to set the priority mode in specific times, while a key 1234 is used to set the priority mode in a specific day. Furthermore, by using the key 1234, the priority mode is made valid on the determined day or the same can be invalid on the determined day. The ten keys 1203 consisting of 0 to 9 is used to input the time. Furthermore, keys 1226 and 1227 are used to select a desired priority mode. The key 1234 is able to set the date and the day of a week to select the date or the day of a week on which the priority mode is made valid.

Figure 56:
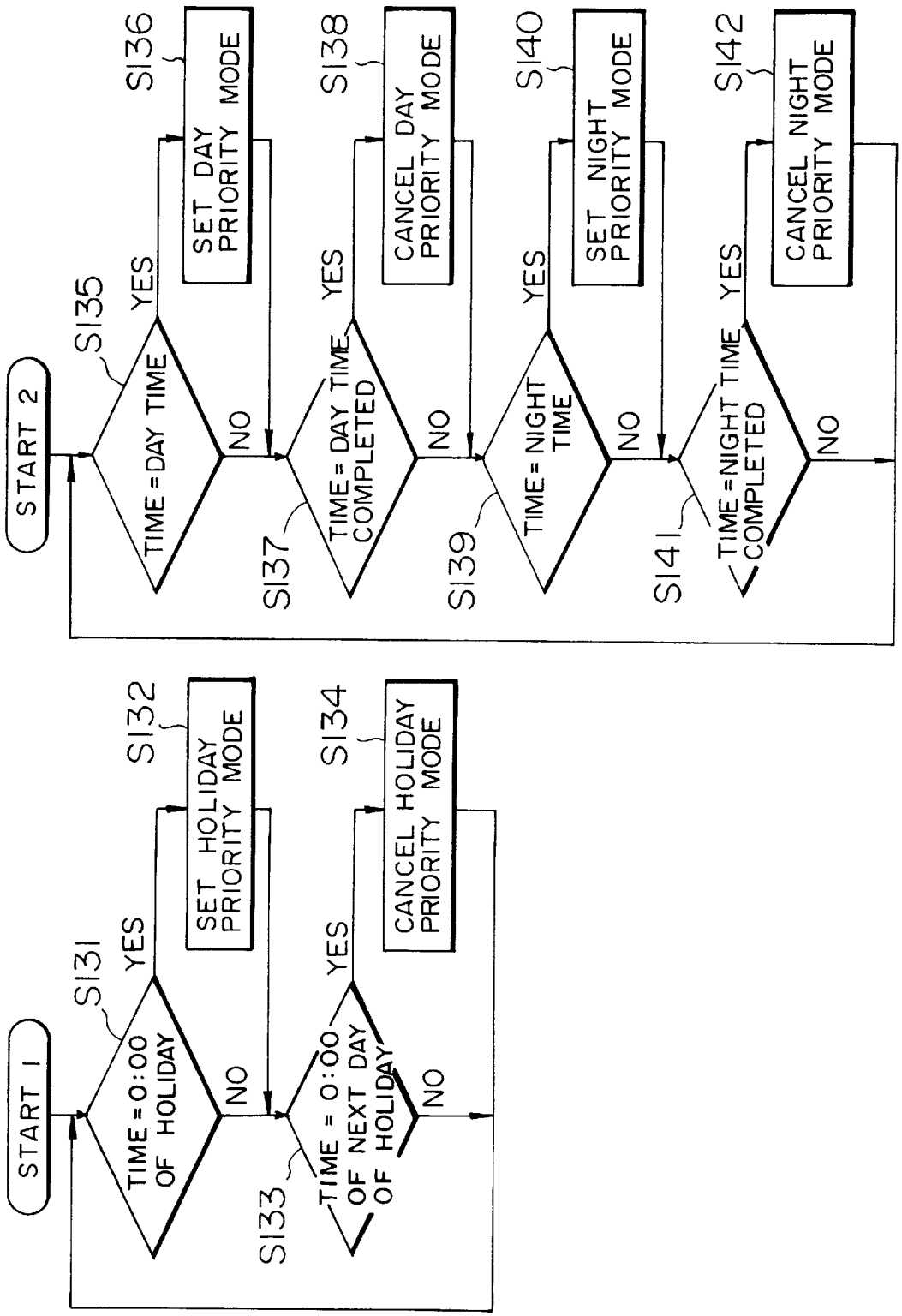
FIG. 56 is a flow chart which illustrates the control order of copy and facsimile record outputs.

FIG. 56 is a flow chart which illustrates the operation of this embodiment. In accordance with the result of the discrimination made in step S131 as to whether or not it is twelve o'clock on a holiday, a holiday priority mode is set in step S132. Step S133 is a discrimination branch of the completion of the holiday for cancelling the holiday priority mode in step S134.

Steps S135 to S142 are included in a flow chart for setting and cancelling a day priority mode or night priority mode in each night time and day time.

The priority mode is automatically changed over depending on the fact that the present time belongs to the night time period or the day time period. Furthermore, the night and the day time period setting mode is changed in accordance with whether or not the subject day is a holiday. As a result, the setting of the priority to be given to the copying operation or the facsimile operation can be automatically set in accordance with the state of the finishing time.

Figure 57:
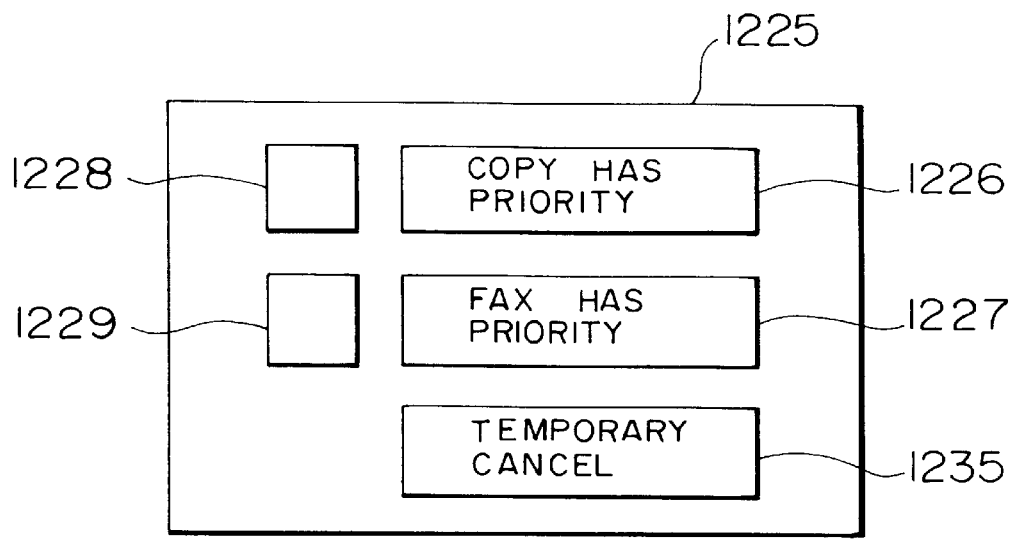
FIG. 57 illustrates the priority mode setting operation means.

FIG. 57 illustrates a structure for temporarily cancelling the priority mode. Keys 1226 and 1227 shown in FIG. 57 are priority mode setting keys which are the same as those shown in FIG. 50. Reference numerals 1228 and 1229 represent LEDs for monitoring depressing of the keys 1226 and 1227. Reference numeral 1235 represents a key for temporarily cancelling the priority mode. In a case where copying must be performed during the facsimile receipt, the aforesaid key is set to start the copying operation.

Figure 58:
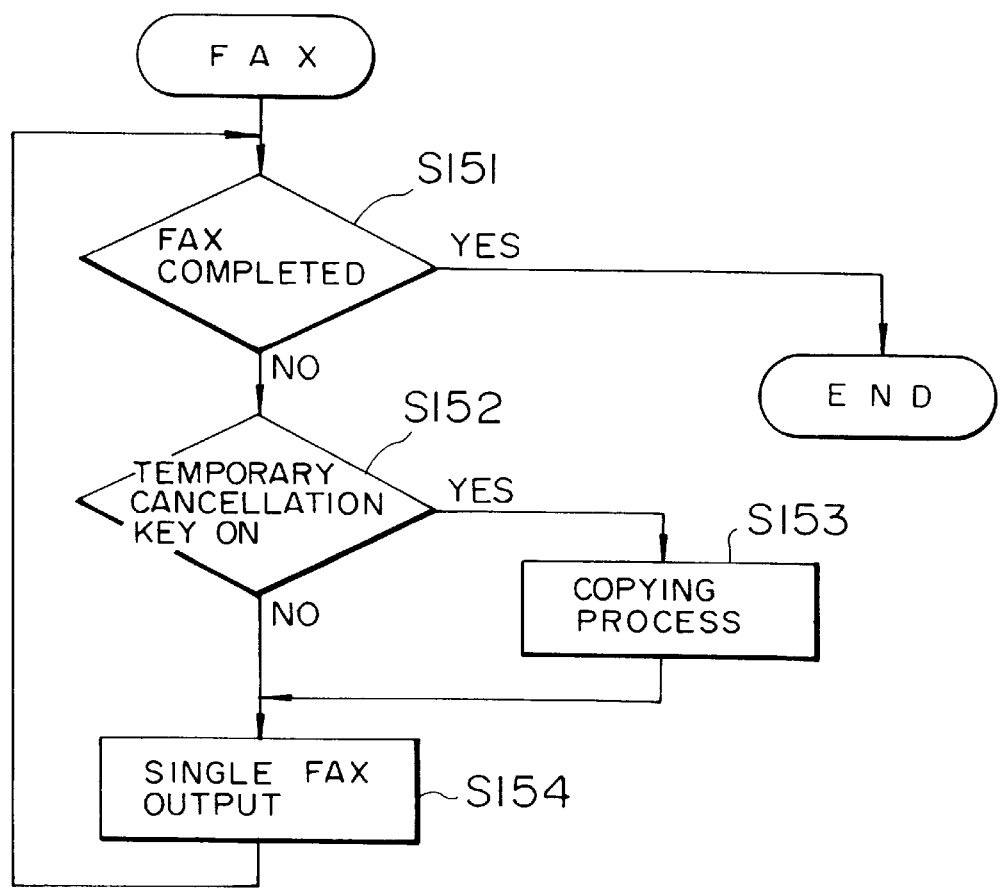
FIG. 58 is a flow chart which illustrates the control order of copy and facsimile record outputs.

FIG. 58 illustrates a control adapted to the structure shown in FIG. 57 and arranged to cancel the set facsimile priority mode during the facsimile receipt. The fact of whether or not the facsimile receipt is being made is discriminated in step S151. If the receipt is being made, the state of the temporarily cancelling key 1235 is examined. The receipt operation may be notified by a display to the user who is performing the copying work.

If the temporarily cancelling key 1235 is turned on in step S152, the copying process is permitted in step S153. After the aforesaid copying operation has been completed, the facsimile communication is performed in step S154. If the temporarily cancelling key 1235 is turned off, the facsimile receipt and output processes in step S154 are given priority and are resumed.

According to the structure shown in FIGS. 57 and 58, in a case where the facsimile operation during the copying operation is given priority, a facsimile receipt is made and the user must perform the copying operation, the copying operation can be performed, and then the facsimile output is resumed after the copying operation has been completed.

The structure of the present invention is not, of course, limited to the structure of the image input route or the output route.

As described above, the structure of an image processing apparatus having a plurality of routes into which image data is supplied and arranged to receive, from each input route, image data to be subjected to the asynchronous output process is so arranged to be provided with the control means for giving priority to the output process of image data supplied through a plurality of the image input routes. Therefore, an image processing apparatus can be operated with freedom because the use is able to set the priority of the output process of image data supplied through a plurality of image input routes.

The present invention is not limited to the electrophtographic recording apparatus. For example, it can be applied to an ink jet type, a thermal transfer type or a thermosensitive recording apparatus.

Except as otherwise disclosed herein, the various components shown in outline or in block form in the figures are individually well known and a description of their internal construction and operation is not necessary to the making or using of this invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image recording apparatus comprising:
   a plurality of input means for inputting image information;
   selection means for selecting one of said input means;
   recording means for recording an image in accordance with the image information input from said input means selected by said selection means on a recording member; and
   requesting means for requesting an operator to set a priority of selection by said selection means in response to one of said input means starting inputting of image information while said recording means is recording an image in accordance with the image information from another of said input means.

2. An image recording apparatus comprising:
   a plurality of input means for inputting image information;
   selection means for selecting one of said input means in accordance with a predetermined priority;
   recording means for recording an image in accordance with the image information from said input means selected by said selection means on a recording member; and
   changing means for changing the priority of said selection means in accordance with at least one of time and day.

3. An image recording apparatus comprising:
   a plurality of input means for inputting image information from a respective plurality of different types of image information generating devices including at least one non-facsimile type image information generating device;
   recording means for recording an image in accordance with the image information input by an input means of said plurality of input means on a recording member in a predetermined color; and
   control means for changing the color in accordance with the type of image information generating device.

4. An image recording apparatus comprising:
   a plurality of input means for inputting image information;
   recording means for selecting one of said input means and recording an image in accordance with the image information from said selected input means on a recording member;
   storing means for temporarily storing the recording member recorded by said recording means so as to again convey the recording member to said recording means;
   a discharge portion for discharging the recording member recorded by said recording means from said image recording apparatus; and
   conveyance means for selectively conveying the recording member to one of said storing means and said discharge portion in accordance with said selected input means.

5. An image recording apparatus according to claim 4, wherein said recording means comprises means for changing inputting from one of said input means to another of said input means when the recording member, on which the image in accordance with the image information input by one of said input means has been recorded, is conveyed to said storing means.

6. An image recording apparatus according to claim 4, wherein said recording means comprises means for preventing changing inputting from one of said input means to another of said input means when the recording member, on which the image in accordance with the image information input by one of said input means has been recorded, is conveyed to said discharge portion through said recording means from said storing means.

7. An image recording apparatus according to claim 4, wherein said conveyance means conveys the recording member on which the image in accordance with the image information input by another of said input means has been recorded, to said storing means when the recording member, on which an image in accordance with the image information input by one of said input means has been recorded, is conveyed to said discharge portion in such a manner that the recording member does not pass through said storing means.

8. An image recording apparatus according to claim 7, wherein said conveyance means conveys the recording member stored in said storing means to said discharge portion after all recording operations have been completed.

9. An image recording apparatus comprising:
   a plurality of input means for inputting image information, each of said input means inputting a different type of image information supplied from a respective plurality of different types of image information generating devices;
   identifying means for identifying the type of image information generating device; and
   recording means for recording at least one of (i) an image in accordance with the image information supplied from the image information generating device, and (ii) a mark indicating the type of image information generating device, identified by said identifying means, on a recording member.

10. An image recording apparatus according to claim 9, wherein said recording means records (i) the image in accordance with the image information supplied from the information generating device, and (ii) the mark indicating the type of image information generating device, on the same recording member.

11. An image recording apparatus according to claim 1, wherein said requesting means comprises a buzzer.

12. An image recording apparatus according to claim 1, wherein said requesting means requests an operator in accordance with an occurrence of inputting of an image through a telephone circuit while said recording means is recording an image inputted from a scanner.

13. An image recording method comprising the steps of:
    inputting image information from a plurality of input means;
    selecting one of the input means;
    recording an image on a recording member in accordance with the image information input from the selected input means; and
    requesting an operator to set a priority of selection in said selecting step in response to one of the input means starting inputting of image information while recording, in said recording step, of an image in accordance with the image information from another of the input means.

14. An image recording method according to claim 13, wherein said requesting step comprises a step of activating a buzzer.

15. An image recording method according to claim 13, wherein said requesting step comprising a step of requesting an operator in accordance with an occurrence of inputting of an image through a telephone circuit in said inputting step while recording, in said recording step, of an image inputted from a scanner.

16. An image recording method comprising the steps of:

inputting image information from a plurality of input means;

selecting one of the input means in accordance with a predetermined priority;

recording an image on a recording member in accordance with the image information from the selected input means; and changing the priority of said selecting step in accordance with at least one of time and day.

17. An image recording method comprising the steps of:

inputting image information from a plurality of input means from a respective plurality of different types of image information generating devices including at least one non-facsimile type image information generating device;

recording an image on a recording member in accordance with the image information input by an input means of the plurality of input means in a predetermined color; and changing the color in accordance with the type of image information generating device.

18. An image recording method comprising the steps of:

inputting image information from a plurality of input means;

selecting one of the input means and recording, by a recording means, an image in accordance with the image information from the selected input means on a recording member;

temporarily storing the recording member recorded in said recording step in storing means so as to again convey the recording member to the recording means;

discharging the recording member recorded by the recording means from an image recording apparatus by a discharge portion; and selectively conveying the recording member to one of the storing means and the discharge portion in accordance with the selected input means.

19. An image recording method according to claim 18, wherein said recording step comprises a step of changing inputting from one of the input means to another of the input means when the recording member, on which the image in accordance with the image information input by one of the input means has been recorded, is conveyed to the storing means.

20. An image recording method according to claim 18, wherein said recording step comprises a step of preventing changing inputting from one of the input means to another of the input means when the recording member, on which the image in accordance with the image information input by one of the input means has been recorded, is conveyed to the discharge portion through the recording means from the storing means.

21. An image recording method according to claim 18, wherein said conveying step comprises a step of conveying the recording member on which the image in accordance with the image information input by another of the input means has been recorded, to the storing means when the recording member, on which an image in accordance with the image information input by one of the input means has been recorded, is conveyed to the discharge portion in such a manner that the recording member does not pass through the storing means.

22. An image recording method according to claim 21, wherein said conveying step further comprises a step of conveying the recording member stored in the storing means to the discharge portion after all recording operations have been completed.

23. An image recording method comprising the steps of:

inputting image information from a plurality of input means, each of the input means inputting a different type of image information supplied from a respective plurality of different types of image information generating devices;

identifying the type of image information generating device that generated the input image information; and recording on a recording member at least one of (i) an image in accordance with the image information supplied from the image information generating device, and (ii) a mark indicating the type of image information generating device, identified in said identifying step.

24. An image recording method according to claim 23, wherein said recording step comprises a step of recording (i) the image in accordance with the image information supplied from the information generating device, and (ii) the mark indicating the type of image information generating device, on the same recording member.

25. An image recording apparatus comprising:

a plurality of first input means for inputting image information;

setting means for setting an order of priority of said first input means arbitrarily; selection means for selecting one of said first input means in accordance with the order of priority set by said setting means;

recording means for recording on a recording member an image in accordance with the image information input from said first input means selected by said selection means;

second input means for inputting an instruction from an operator; and control means for controlling said selection means so as to interrupt recording an image from the first input means which is selected and to record an image from another first input means, regardless of said set order of priority, in accordance with that instruction input from said second input means, wherein the order of priority set by said setting means is maintained even if the instruction is input from said second input means.

26. An image recording apparatus according to claim 25, wherein said selection means selects one input means at the time of copy mode, and selects another input means at the time of facsimile mode.

27. An image recording apparatus comprising:

setting means for setting an order of priority of a plurality of functions arbitrarily;

selection means for selecting one of the plurality of functions in accordance with the order of priority set by said setting means;

recording means for recording an image by the function selected by said selection means;

input means for inputting an instruction from an operator; and control means for controlling said selection means so as to interrupt the function in operation and to operate another function, regardless of the order of priority set by said setting means, in accordance with that instruction input from said input means, wherein the order of priority set by said setting means is maintained even if the instruction is input from said input means.

28. An image recording apparatus according to claim 27, wherein said plurality of functions include copy function and facsimile function.

29. An image recording method comprising:

selecting one of first input means in accordance with a set order of priority;

inputting image information to the selected one of the plurality of first input means;

recording on a recording member an image in accordance with the image information input from said selected one of the first input means;

inputting an instruction from an operator to a second input means; and controlling said selection step so as to interrupt recording an image from the first input means which is selected and to record an image from another first input means, regardless of the set order of priority, in accordance that instruction is input from said second input means, wherein the order of priority set in said selecting step is maintained even if the instruction is input from said second input means.

30. An image recording method according to claim 29, wherein the selection step selects one input means at the time of copy mode and selects another input means at the time of facsimile mode.

31. An image recording method comprising:

setting an order of priority of a plurality of functions arbitrarily;

selecting one of the plurality of functions in accordance with the order of priority set;

recording an image by the function selected by said selection means;

inputting an instruction from an operator; and controlling the selection of one of the plurality of functions so as to interrupt the function in operation and to operate another function, regardless of the order of priority set, in accordance with that instruction input, wherein the order of priority set is maintained even if instruction is input.

32. An image recording method according to claim 31, wherein said plurality of functions include copy function and facsimile function.

33. An image recording apparatus according to claim 25, wherein said control means control so as to resume the interrupted recording after recording an image from the other first input means is finished.

34. An image recording apparatus according to claim 27, wherein said control means control so as to resume the interrupted function after the other function is finished.

35. An image recording method according to claim 29, further comprising:

a step for controlling so as to resume the interrupted recording after recording an image from the other first input means is finished.

36. An image recording method according to claim 31, further comprising:

a step for controlling so as to resume the interrupted function after the other function is finished.

* * * * *

UNITED STATES PATENT AND TRADEMARK OFFICE
CERTIFICATE OF CORRECTION

PATENT NO. : 5,815,280

DATED : September 29, 1998

INVENTOR(S) : HIROSHI OHMURA, ET AL.

It is certified that error appears in the above-identified patent and that said Letters Patent is hereby corrected as shown below:

COLUMN 3,
Line 32, "will be" should read --will--.

COLUMN 11,
Line 60, "four" should read --fourth--.

COLUMN 16,
Line 43, "triming" should read --trimming--; and
Line 57, "triming" should read --trimming--.

COLUMN 31,
Line 21, "coying" should read --copying--.

COLUMN 37,
Line 66, "display" (second occurrence) should read --displays--.

COLUMN 44,
Line 33, "arbitrarily; selection" should read --arbitrarily; ¶ selection--.

COLUMN 45,
Line 24, "accordance" should read --accordance with--; and
Line 25, "is input" should read --input--.

UNITED STATES PATENT AND TRADEMARK OFFICE
CERTIFICATE OF CORRECTION

PATENT NO. : 5,815,280

DATED : September 29, 1998

INVENTOR(S) : HIROSHI OHMURA, ET AL.

It is certified that error appears in the above-identified patent and that said Letters Patent is hereby corrected as shown below:

COLUMN 46,
Line 18, "control" should read --controls--; and
Line 22, "control" should read --controls--.

Signed and Sealed this

Sixteenth Day of November, 1999

Attest:

Attesting Officer

Q. TODD DICKINSON

Acting Commissioner of Patents and Trademarks